(12) United States Patent
Konishi et al.

(10) Patent No.: US 9,519,120 B2
(45) Date of Patent: Dec. 13, 2016

(54) LENS BARREL

(71) Applicant: Panasonic Intellectual Property Management Co., Ltd., Osaka (JP)

(72) Inventors: Akio Konishi, Hyogo (JP); Tetsuya Uno, Osaka (JP); Fumio Shinano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/696,419

(22) Filed: Apr. 25, 2015

(65) Prior Publication Data

US 2015/0226932 A1    Aug. 13, 2015

Related U.S. Application Data

(63) Continuation of application No. 14/447,791, filed on Jul. 31, 2014, now Pat. No. 9,046,744, which is a (Continued)

(30) Foreign Application Priority Data

Feb. 2, 2012 (JP) ................................. 2012-021397

(51) Int. Cl.
*G02B 27/64* (2006.01)
*G02B 7/02* (2006.01)
(Continued)

(52) U.S. Cl.
CPC .............. *G02B 7/021* (2013.01); *G02B 7/022* (2013.01); *G02B 7/023* (2013.01); *G02B 7/026* (2013.01);
(Continued)

(58) Field of Classification Search
CPC ......... G02B 7/021; G02B 7/022; G02B 7/023; G02B 7/026; G02B 7/04; G02B 7/08;G02B 7/102; G02B 17/08; G02B 27/646; G03B 3/00; G03B 3/10; G03B 5/00; G03B 17/00; G03B 17/04; G03B 2205/007; G03B 2205/0015; G03B 2205/0069; G03B 2205/0092; H04N 5/00; H04N 5/225; H04N 5/2253; H04N 5/2254; H04N 5/23212; H04N 5/2352
(Continued)

(56) References Cited

U.S. PATENT DOCUMENTS 5,486,889 A    1/1996    Shintani
5,614,973 A    3/1997    Azegami
(Continued)

FOREIGN PATENT DOCUMENTS

JP    63-138320 A    6/1988
JP    05-090416    12/1993
(Continued)

OTHER PUBLICATIONS

Office Actiion issued on Aug. 27, 2015 for Co-Pending U.S. Appl. No. 14/448,112.
(Continued)

*Primary Examiner* — Loha Ben
(74) *Attorney, Agent, or Firm* — Renner, Otto, Boisselle & Sklar, LLP

(57) ABSTRACT

A lens barrel includes a support frame and a retracting lens frame. The support frame includes a main body portion, a first linking portion and a second linking portion. The first region is configured to dispose the second lens in the imaging enabled state. The second region is formed continuously with the first region. The first linking portion links the second region on one side of the main body portion in the optical axis direction. The second linking portion links the second region on the other side of the main body portion in
(Continued)

the optical axis direction. The retracting lens frame is disposed between the first linking portion and the second linking portion in a housed state.

10 Claims, 33 Drawing Sheets

Related U.S. Application Data continuation of application No. PCT/JP2013/000586, filed on Feb. 1, 2013.

(51) Int. Cl.

| | | |
|---|---|---|
| *G02B 7/10* | (2006.01) | |
| *G02B 7/08* | (2006.01) | |
| *G03B 5/00* | (2006.01) | |
| *G03B 17/04* | (2006.01) | |
| *G02B 7/12* | (2006.01) | |
| *G03B 13/34* | (2006.01) | |
| *G03B 17/56* | (2006.01) | |
| *G03B 3/10* | (2006.01) | |

(52) U.S. Cl.
CPC . *G02B 7/08* (2013.01); *G02B 7/10* (2013.01); *G02B 7/102* (2013.01); *G02B 7/12* (2013.01); *G02B 27/646* (2013.01); *G03B 5/00* (2013.01); *G03B 13/34* (2013.01); *G03B 17/04* (2013.01); *G03B 17/565* (2013.01); *G03B 3/10* (2013.01); *G03B 2205/0007* (2013.01); *G03B 2205/0069* (2013.01); *G03B 2205/0092* (2013.01)

(58) Field of Classification Search
USPC .............. 359/813, 819, 817, 822, 823, 827, 359/694–704; 396/72–75, 79, 344, 396/348–350, 459; 348/240.99, 335, 348/340, 373
See application file for complete search history.

(56) References Cited

U.S. PATENT DOCUMENTS

| | | | |
|---|---|---|---|
| 5,668,670 A | 9/1997 | Nakayama | |
| 6,008,954 A | 12/1999 | Shintani | |
| 6,018,426 A | 1/2000 | Funahashi | |
| 6,959,148 B2 * | 10/2005 | Nomura | G02B 7/022 |
| | | | 359/699 |
| 7,088,523 B2 | 8/2006 | Hamasaki et al. | |
| 7,102,831 B2 | 9/2006 | Omiya et al. | |
| 7,194,203 B2 | 3/2007 | Omiya et al. | |
| 7,265,913 B2 | 9/2007 | Nagai et al. | |
| 7,338,219 B2 | 3/2008 | Ishizuka et al. | |
| 7,372,638 B2 | 5/2008 | Yoshii | |
| 7,454,129 B2 | 11/2008 | Fukai | |
| 7,455,465 B2 | 11/2008 | Nuno et al. | |
| 7,477,308 B2 | 1/2009 | Omiya et al. | |
| 7,492,536 B2 | 2/2009 | Nagai et al. | |
| 7,507,040 B2 | 3/2009 | Nomura et al. | |
| 7,515,182 B2 | 4/2009 | Omiya et al. | |
| 7,515,195 B2 | 4/2009 | Endo et al. | |
| 7,527,438 B2 | 5/2009 | Nomura et al. | |
| 7,536,091 B2 | 5/2009 | Nomura | |
| 7,551,376 B2 | 6/2009 | Koyama | |
| 7,689,110 B2 | 3/2010 | Yumiki et al. | |
| 7,744,294 B2 * | 6/2010 | Tsurukawa | G02B 7/102 |
| | | | 348/335 |
| 7,746,584 B2 | 6/2010 | Honsho et al. | |
| 7,753,598 B2 | 7/2010 | Ishizuka | |
| 7,755,855 B2 | 7/2010 | Shimazaki et al. | |
| 7,773,871 B2 | 8/2010 | Ishizuka | |
| 7,777,976 B2 | 8/2010 | Nomura et al. | |
| 7,780,362 B2 | 8/2010 | Nomura et al. | |
| 7,860,383 B2 | 12/2010 | Nomura et al. | |
| 7,864,241 B2 | 1/2011 | Iwasaki | |
| 7,872,683 B2 | 1/2011 | Iwasaki | |
| 7,920,345 B2 | 4/2011 | Honsho et al. | |
| 8,041,204 B2 | 10/2011 | Nomura | |
| 8,090,249 B2 | 1/2012 | Suzuka | |
| 8,218,255 B2 | 7/2012 | Katano | |
| 8,228,619 B2 | 7/2012 | Koyama | |
| 8,351,775 B2 | 1/2013 | Nagae | |
| 8,396,358 B2 | 3/2013 | Suzuka | |
| 8,422,152 B2 | 4/2013 | Onishi | |
| 8,432,477 B2 | 4/2013 | Honsho et al. | |
| 8,441,742 B2 | 5/2013 | Koyama | |
| 8,451,544 B2 | 5/2013 | Suzuki | |
| 8,472,127 B2 | 6/2013 | Onishi | |
| 8,498,528 B2 | 7/2013 | Suzuka | |
| 8,665,535 B2 | 3/2014 | Shinano et al. | |
| 8,730,600 B2 * | 5/2014 | Iwasaki | G02B 7/08 |
| | | | 359/827 |
| 8,773,762 B2 | 7/2014 | Suzuka | |
| 8,776,615 B2 | 7/2014 | Kempainen et al. | |
| 9,116,283 B2 | 8/2015 | Konishi | |
| 9,411,125 B2 * | 8/2016 | Shinano | G02B 7/10 |
| 2005/0207748 A1 | 9/2005 | Ishizuka et al. | |
| 2006/0034001 A1 | 2/2006 | Nagai et al. | |
| 2006/0034604 A1 | 2/2006 | Nomura et al. | |
| 2006/0092526 A1 | 5/2006 | Hamasaki et al. | |
| 2007/0253689 A1 | 11/2007 | Nagai et al. | |
| 2008/0180812 A1 | 7/2008 | Honsho et al. | |
| 2009/0207509 A1 | 8/2009 | Nomura et al. | |
| 2009/0231709 A1 | 9/2009 | Nomura et al. | |
| 2010/0067896 A1 | 3/2010 | Murakami | |
| 2010/0142939 A1 | 6/2010 | Honsho et al. | |
| 2011/0001872 A1 | 1/2011 | Honsho et al. | |
| 2011/0013897 A1 | 1/2011 | Nagae | |
| 2011/0019290 A1 | 1/2011 | Shinano et al. | |
| 2011/0026143 A1 | 2/2011 | Katano | |
| 2011/0032627 A1 | 2/2011 | Koyama | |
| 2011/0141566 A1 | 6/2011 | Suzuka | |
| 2012/0045198 A1 | 2/2012 | Miyoshi et al. | |
| 2012/0070138 A1 | 3/2012 | Onishi | |
| 2012/0257286 A1 | 10/2012 | Koyama | |
| 2013/0215316 A1 | 8/2013 | Honsho et al. | |
| 2014/0340751 A1 | 11/2014 | Konishi et al. | |
| 2014/0340754 A1 | 11/2014 | Uno et al. | |
| 2014/0340772 A1 * | 11/2014 | Shinano | G03B 17/04 |
| | | | 359/823 |

FOREIGN PATENT DOCUMENTS

| | | |
|---|---|---|
| JP | 06-034865 A | 2/1994 |
| JP | 06-051178 | 2/1994 |
| JP | 08-152659 A | 6/1996 |
| JP | 10-003103 A | 1/1998 |
| JP | 11-160606 A | 6/1999 |
| JP | 2000-292848 | 10/2000 |
| JP | 2001-042189 | 2/2001 |
| JP | 2003-315861 A | 11/2003 |
| JP | 2004-233916 A | 8/2004 |
| JP | 2005-172953 A | 6/2005 |
| JP | 2005-227597 A | 8/2005 |
| JP | 2005-266345 A | 9/2005 |
| JP | 2006-053444 | 2/2006 |
| JP | 2006-053445 | 2/2006 |
| JP | 2006-058455 A | 3/2006 |
| JP | 2006-126537 A | 5/2006 |
| JP | 2006-330657 A | 12/2006 |
| JP | 2007-163961 A | 6/2007 |
| JP | 2007-178751 | 7/2007 |
| JP | 2007-199320 | 8/2007 |
| JP | 2007-206210 A | 8/2007 |
| JP | 2008-015387 A | 1/2008 |
| JP | 2008-046504 A | 2/2008 |
| JP | 2008-139802 | 6/2008 |
| JP | 2008-158288 A | 7/2008 |
| JP | 2008-185786 A | 8/2008 |
| JP | 2009-157245 A | 7/2009 |
| JP | 2009-216881 A | 9/2009 |

(56) References Cited

FOREIGN PATENT DOCUMENTS

| JP | 2009-217243 A | 9/2009 |
|---|---|---|
| JP | 2009-244874 A | 10/2009 |
| JP | 2009-251063 | 10/2009 |
| JP | 2009-251064 A | 10/2009 |
| JP | 2010-026163 A | 2/2010 |
| JP | 2010-164695 A | 7/2010 |
| JP | 2010-217511 A | 9/2010 |
| JP | 2011-013613 B | 1/2011 |
| JP | 2011-022234 A | 2/2011 |
| JP | 2011-033667 A | 2/2011 |
| JP | 2011-039090 A | 2/2011 |
| JP | 2011-039527 A | 2/2011 |
| JP | 2011-048346 A | 3/2011 |
| JP | 2001-235670 | 8/2011 |
| JP | 2011-150132 A | 8/2011 |
| JP | 2011-154204 | 8/2011 |
| JP | 2011-158592 A | 8/2011 |
| JP | 2011-170262 A | 9/2011 |
| JP | 2011-209348 A | 10/2011 |
| JP | 2011-209652 A | 10/2011 |
| JP | 2011-215389 | 10/2011 |
| JP | 2012-018325 A | 1/2012 |

OTHER PUBLICATIONS

Office Action issued on Dec. 22, 2015 for Co-Pending U.S. Appl. No. 14/447,871.
International Search Report for corresponding International Application No. PCT/JP2013/000586 mailed May 7, 2013.
International Search Report for related International Application No. PCT/JP2013/000592 mailed Mar. 5, 2013.
International Search Report for related International Application No. PCT/JP2013/000588 mailed May 7, 2013.
International Search Report for related International Application No. PCT/JP2013/000589 mailed May 7, 2013.
International Search Report for related International Application No. PCT/JP2013/000595 mailed May 7, 2013.
International Search Report for related International Application No. PCT/JP2012/008448 mailed Feb. 12, 2013.
International Search Report for related International Application No. PCT/JP2013/000594 mailed Mar. 12, 2013.
Co-pending U.S. Appl. No. 14/447,744, filed Jul. 31, 2014.
Co-pending U.S. Appl. No. 14/447,791, filed Jul. 31, 2014.
Co-pending U.S. Appl. No. 14/447,871, filed Jul. 31, 2014.
Co-pending U.S. Appl. No. 14/447,843, filed Jul. 31, 2014.
Co-pending U.S. Appl. No. 14/447,907, filed Jul. 31, 2014.
Co-pending U.S. Appl. No. 14/448,069, filed Jul. 31, 2014.
Co-pending U.S. Appl. No. 14/448,112, filed Jul. 31, 2014.
Notice of Allowance issued on Jan. 21, 2015 for U.S. Appl. No. 14/447,843.
Office Action issued on Feb. 20, 2015 for U.S. Appl. No. 14/447,907.
Office Action issued on Mar. 12, 2015 for Co-Pending U.S. Appl. No. 14/448,112.
Notice of Allowance issued on Mar. 30, 2015 for Co-Pending U.S. Appl. No. 14/688,250.
Office Action mailed May 26, 2015 for co-pending U.S. Appl. No. 14/448,069.
Office Action mailed Jul. 27, 2016 for co-pending U.S. Appl. No. 14/448,112.
Office Action mailed May 9, 2016 for co-pending U.S. Appl. No. 14/447,871.
Office Action mailed Sep. 22, 2016 for co-pending U.S. Appl. No. 14/447,871.

* cited by examiner

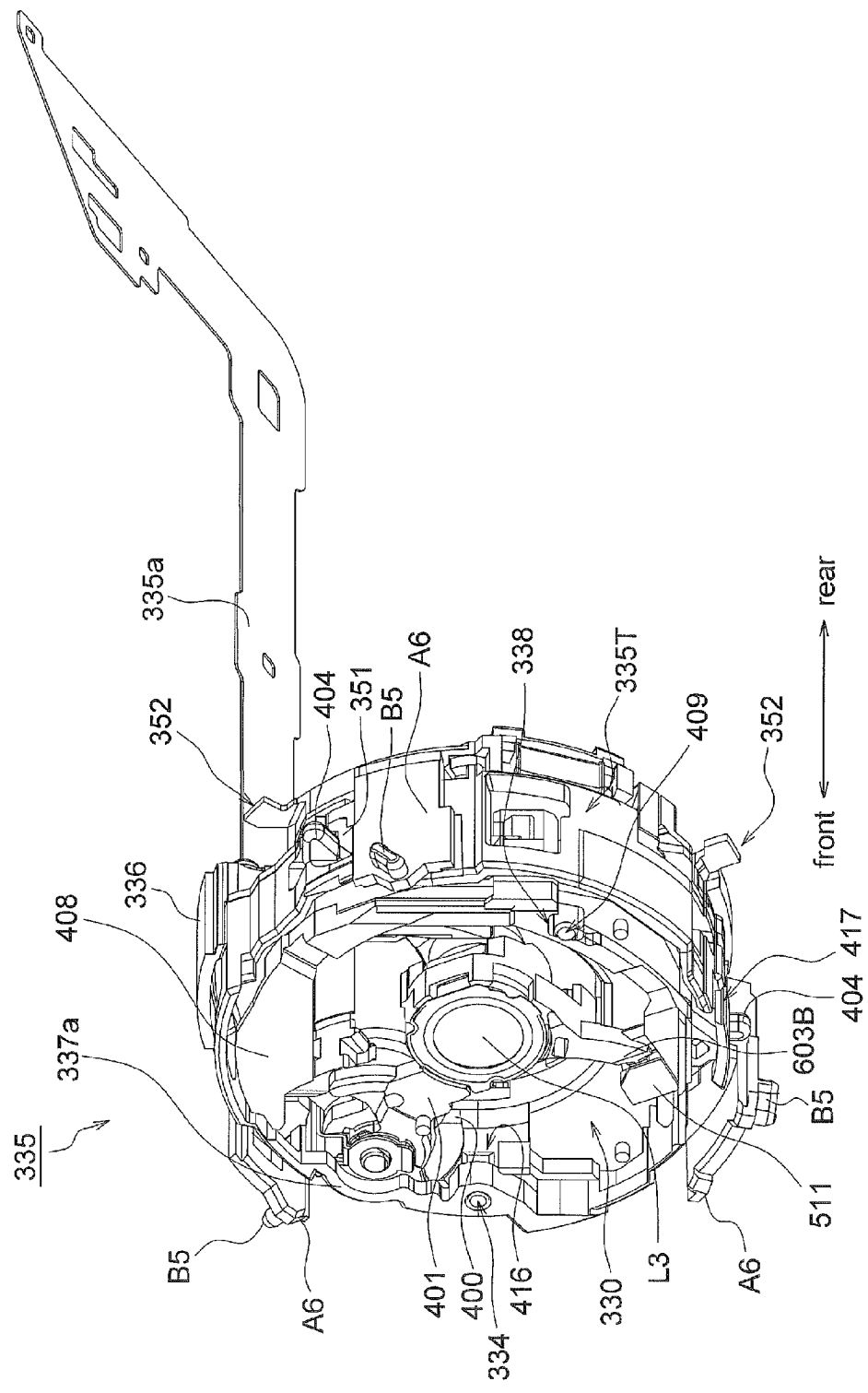

LENS BARREL

CROSS-REFERENCE TO RELATED APPLICATIONS

This is a continuation application of U.S. application Ser. No. 14/447,791 filed on Jul. 31, 2014, now U.S. Pat. No. 9,046,744 issued on Jun. 2, 2015, which is a continuation application of International Application PCT/JP2013/000586, with an international filing date of Feb. 1, 2013 which claims priority to Japanese Patent Application No. 2012-021397 filed on Feb. 2, 2012. The entire disclosures of International Application PCT/JP2013/000586 and Japanese Patent Application No. 2012-021397 are hereby incorporated herein by reference.

BACKGROUND

Technical Field

The technology disclosed herein relates to a lens barrel equipped with an optical system.

Background Information

A lens barrel in which a second stage that supports a third lens group is able to retract with respect to a first stage has been disclosed in the past (see Japanese Laid-Open Patent Application 2011-215389).

With prior art, the second stage that supports the third lens group is supported retractably with respect to the first stage. An opening is provided to the first stage, and in the imaging state, the third lens group of the second stage is disposed in this opening. Also, since the third lens group of the second stage moves from the imaging state to the retracted state, the movement path of the third lens group is ensured by the first stage. More precisely, the movement path of the third lens group is ensured by the outer peripheral part of the first stage. An offset light blocking wall is formed on the first stage so as to link the outer peripheral part of the first stage corresponding to the movement path of the third lens group. However, if the outer peripheral part of the first stage corresponding to the movement path of the third lens group is merely linked in an offset state by the offset light blocking wall, there is the risk that the strength of the first stage, that is, the strength of the lens barrel, is not adequate.

The technology disclosed herein was conceived in light of the above problem, and it is an object of the present technology to increase the strength of a lens barrel.

SUMMARY

The lens barrel disclosed herein comprises a first lens having a first optical axis, a second lens including a second optical axis, and a retracting lens frame. The retracting lens frame is configured to support the second lens. The retracting lens frame is configured to move with respect to the support frame such that the second optical axis changes from a position on the first optical axis to a position outside the first optical axis during a transition period between an imaging enabled state and a housed state.

The support frame includes a main body portion, a first linking portion, and a second linking portion. The main body portion includes a first region and a second region. The first region is configured to dispose the second lens on the first optical axis in the imaging enabled state. The second region is configured to dispose the second lens in the housed state. The second region is formed continuously with the first region. The first linking portion is provided to the main body portion on one side of the second region in the first optical axis direction. The second linking portion is provided to the main body portion on the other side of the second region in the first optical axis direction. At least part of the retracting lens frame is disposed between the first linking portion and the second linking portion in the housed state.

The technology disclosed herein provides a lens barrel with increased strength.

BRIEF DESCRIPTION OF THE DRAWINGS

Referring now to the attached drawings, which form a part of this original disclosure:

FIG. 13A is an oblique view of a shutter frame.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Next, an embodiment of the present technology will be described through reference to the drawings. In the description of the drawings that follows, portions that are the same or similar will be numbered the same or similarly. The drawings are merely schematic representations, however, and the proportions of the various dimensions and so forth may be different from those in actuality. Therefore, the specific dimensions and so forth should be determined by referring to the following description. Also, the mutual dimensional relations and proportions among the drawings may, of course, vary in some portions.

In the following embodiment, a digital camera will be described as an example of an imaging device. In the following description, assuming that the digital camera is in its landscape orientation, the subject side will be referred to as the "front," the opposite side from the subject as the "rear," the vertically upper side as "upper," the vertically lower side as "lower," the right side when facing the subject as "right," and the left side when facing the subject as "left." "Landscape orientation" is a kind of orientation of a digital camera, and when an image is captured in landscape orientation, the long-side direction of a rectangular image that is wider than it is tall substantially coincides with the horizontal direction within the image.

Configuration of Digital Camera 1

Figure 1:
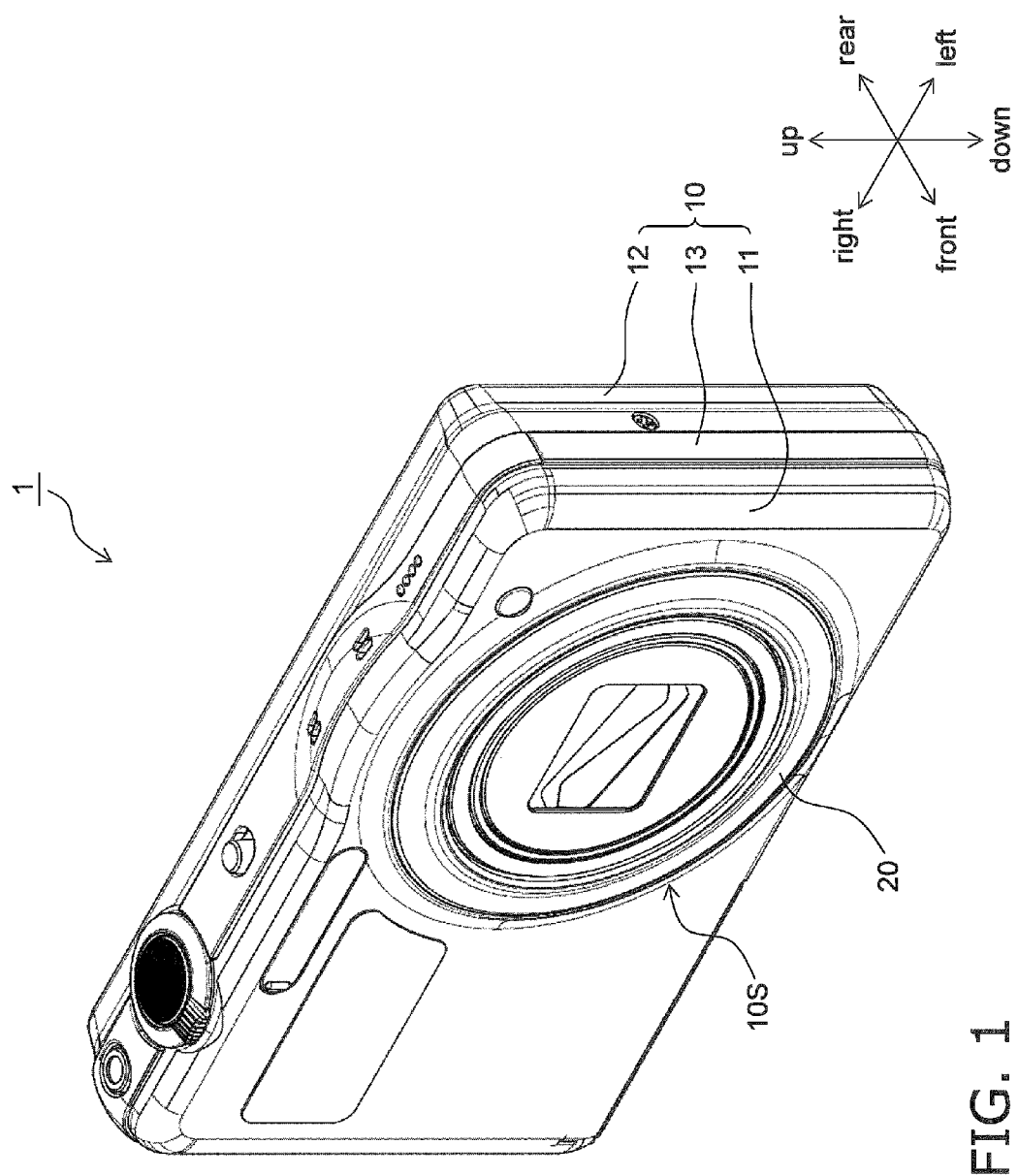
FIG. 1 is an oblique view of a digital camera.
Figure 2:
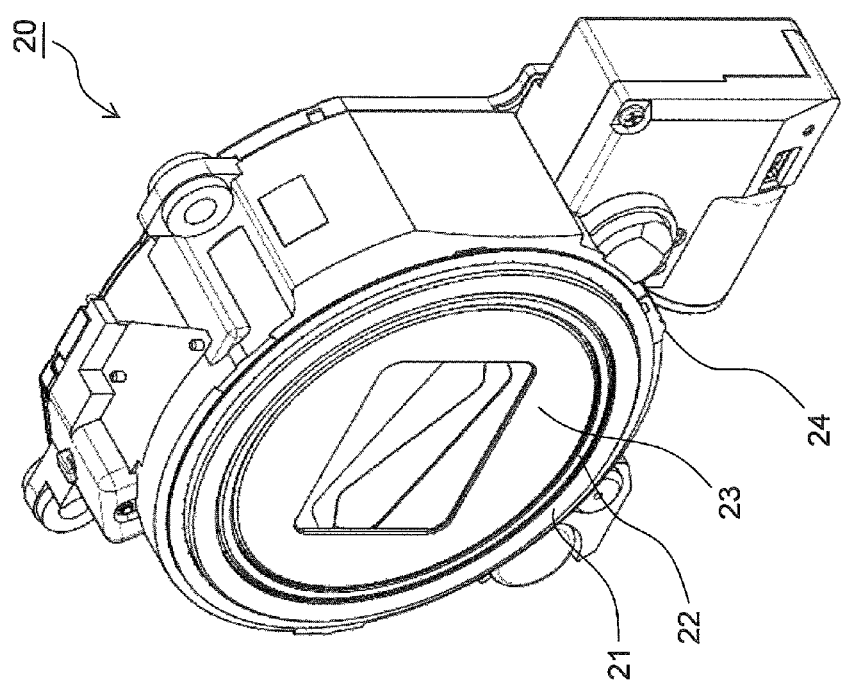
FIG. 2 is an oblique view of a lens barrel.

The configuration of the digital camera 1 will now be described through reference to the drawings. FIG. 1 is an oblique view of the digital camera 1. FIG. 2 is an oblique view of a lens barrel 20.

As shown in FIG. 1, the digital camera 1 comprises a housing 10 and the lens barrel 20.

The housing 10 is made up of a front panel 11, a rear panel 12, and a side panel 13. An opening 10S is formed in the front panel 11.

The lens barrel 20 comprises a three-stage retractable zoom mechanism. The lens barrel 20 is housed in the housing 10 when not being used for imaging, and is deployed forward from the opening 10S during imaging. More specifically, as shown in FIG. 2, the lens barrel 20 has a first movable lens barrel portion 21, a second movable lens barrel portion 22, a third movable lens barrel portion 23, and a stationary lens barrel 24.

The first movable lens barrel portion 21 can be deployed with respect to the stationary lens barrel 24. The second movable lens barrel portion 22 can be deployed with respect to the first movable lens barrel 21. The third movable lens barrel portion 23 can be deployed with respect to the second movable lens barrel 22. The stationary lens barrel 24 is fixed inside the housing 10. When the lens barrel 20 is deployed, the third movable lens barrel portion 23 is located the farthest forward of the first to third movable lens barrel portions 21 to 23.

Detailed Configuration of Lens Barrel 20

Figure 3:
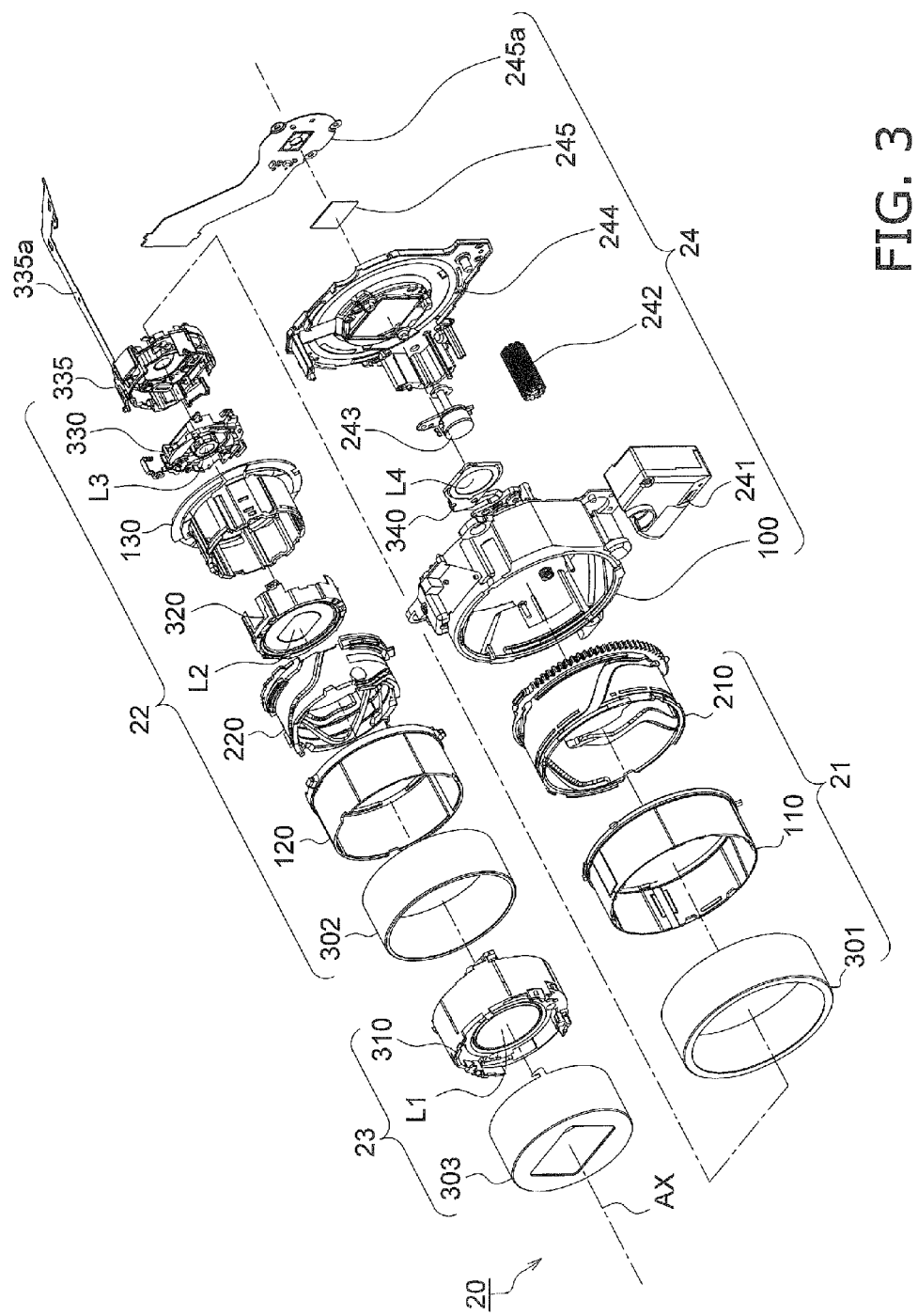
FIG. 3 is an exploded oblique view of a lens barrel.

Next, the detailed configuration of the lens barrel 20 will be described through reference to the drawings. FIG. 3 is an exploded oblique view of the lens barrel 20.

The first to third movable lens barrel portions 21 to 23 of the lens barrel 20 are deployed from the stationary lens barrel 24 along the optical axis AX of the optical system. The optical system includes first to fourth lens groups L1 to L4. In the following description, a direction parallel to the optical axis AX shall be referred to as the "optical axis direction," a direction perpendicular to the optical axis direction as the "radial direction," and a direction that goes in a circle around the optical axis AX as the "peripheral direction." The optical axis AX substantially coincides with the axis of the frames that make up the lens barrel 20.

In this embodiment, the term "rectilinear frame" means a frame that moves in the optical axis direction, without rotating in the peripheral direction. A "rotary frame" means a frame that rotates in the peripheral direction. The term "rotary frame" encompasses the meaning of both a frame that moves in the optical axis direction and a frame that does not move in the optical axis direction. The term "rectilinear groove" means a groove provided along the optical axis direction. A "rectilinear groove" is provided to both rectilinear and rotary frames.

The term "rectilinear" means moving in the optical axis direction, and not rotating in the peripheral direction. The term "rotary" means rotating in the peripheral direction. The term "rotary" is used in the meaning of both moving in the optical axis direction and not moving in the optical axis direction. The term "move" is a concept that also encompasses moving in the optical axis direction while rotating in the peripheral direction.

The term "bayonet" or "bayonet mechanism" means a mechanism in which frames having a "bayonet protrusion" and a "bayonet groove" provided in the peripheral direction are rotatably engaged, and a mechanism in which these frames are integrally engaged in the optical axis direction.

1. First Movable Lens Barrel Component 21

The first movable lens barrel portion 21 has a first rectilinear frame 110, a first rotary frame 210, and a first cosmetic frame 301. The first rectilinear frame 110 is a cylindrical plastic member disposed on the inside in the radial direction of a stationary frame 100 (discussed below). The first rotary frame 210 is a cylindrical plastic member disposed on the inside in the radial direction of the first rectilinear frame 110. The first cosmetic frame 301 is a cylindrical sheet metal member that covers the outer periphery of the first rectilinear frame 110.

2. Second Movable Lens Barrel Component 22

The second movable lens barrel portion 22 has a second rectilinear frame 120, a second rotary frame 220, a third rectilinear frame 130, a second lens group frame 320, a second lens group L2, a third lens group frame 330, a third lens group L3, a shutter frame 335, and a second cosmetic frame 302.

The second rectilinear frame 120 is a cylindrical plastic member disposed on the inside in the radial direction of the first rotary frame 210. The second rotary frame 220 is a cylindrical plastic member disposed on the inside in the radial direction of the second rectilinear frame 120.

The third rectilinear frame 130 is a cylindrical plastic member disposed on the inside in the radial direction of the second rotary frame 220. The second lens group frame 320 is disposed on the inside in the radial direction of the third rectilinear frame 130, and supports the second lens group L2. The third lens group frame 330 is housed in the shutter frame 335, and supports the third lens group L3 used for image blur correction. The third lens group frame 330 is supported pivotably in the radial direction by the shutter frame 335, and constitutes an image blur correction mechanism along with the third lens group L3.

The shutter frame 335 is disposed on the inside in the radial direction of the third rectilinear frame 130, and has a built-in shutter mechanism. The shutter frame 335 supports the third lens group frame 330 pivotably in the radial direction. A control-use flexible wire 335a is connected to the shutter frame 335.

The control-use flexible wire 335a is disposed along the inner peripheral face of the stationary frame 100, and is connected to a control device (not shown). The control-use flexible wire 335a transmits drive power and control signals to the shutter mechanism and the image blur correction mechanism (discussed below). The second cosmetic frame 302 is a cylindrical sheet metal member that covers the outer periphery of the second rectilinear frame 120.

3. Third Movable Lens Barrel Component 23

The third movable lens barrel portion 23 has a first lens group frame 310, a first lens group L1, and a third cosmetic frame 303.

The first lens group frame 310 is disposed between the second rectilinear frame 120 and the second rotary frame 220. The first lens group frame 310 supports the first lens group L1, which is used to bring light into the lens barrel 20. The third cosmetic frame 303 is a cylindrical sheet metal member that covers the outer periphery of the first lens group frame 310.

4. Stationary Lens Barrel 24

The stationary lens barrel 24 has the stationary frame 100, a fourth lens group frame 340, a fourth lens group L4, a zoom motor 241, a zoom gear 242, a focus motor 243, a master flange 244, an imaging element 245, and an imaging element flexible wire 245a.

The stationary frame 100 is a cylindrical plastic member disposed on the outside in the radial direction of the first rotary frame 210 and the first rectilinear frame 110. The fourth lens group frame 340 is attached to the master flange 244, and is driven in the optical axis direction by the focus motor 243. The fourth lens group frame 340 supports the fourth lens group L4, which is used for focal adjustment.

The zoom motor 241 is a drive source that is used to deploy the first to third movable lens barrel portions 21 to 23, and is attached to the side face of the stationary frame 100. The zoom gear 242 transmits the drive force of the zoom motor 241 to the first rotary frame 210. The front end of the zoom gear 242 is supported by the stationary frame 100, and the rear end of the zoom gear 242 is supported by the master flange 244. The focus motor 243 is a drive source that is used to drive the fourth lens group frame 340 in the optical axis direction, and is attached to the master flange 244. The master flange 244 is a flat plastic member that covers the rear of the stationary frame 100. The imaging element 245 is fitted into the center of the master flange 244. In a state in which the imaging element flexible wire 245a and the imaging element 245 have been electrically connected, the imaging element flexible wire 245a is affixed to the rear face of the master flange 244. The imaging element flexible wire 245a is connected to a control device (not shown), and transmits signals from the imaging element 245.

Configuration of Frames

The frames that make up the lens barrel 20 will now be described through reference to the drawings. More specifically, the configurations of the stationary frame 100, the first rectilinear frame 110, the first rotary frame 210, the second rectilinear frame 120, the second rotary frame 220, the third rectilinear frame 130, the first lens group frame 310, the second lens group frame 320, the third lens group frame 330, and the shutter frame 335 will be described in order, after which we will describe how the frames are engaged with each other.

1. Configuration of Stationary Frame 100

Figure 4:
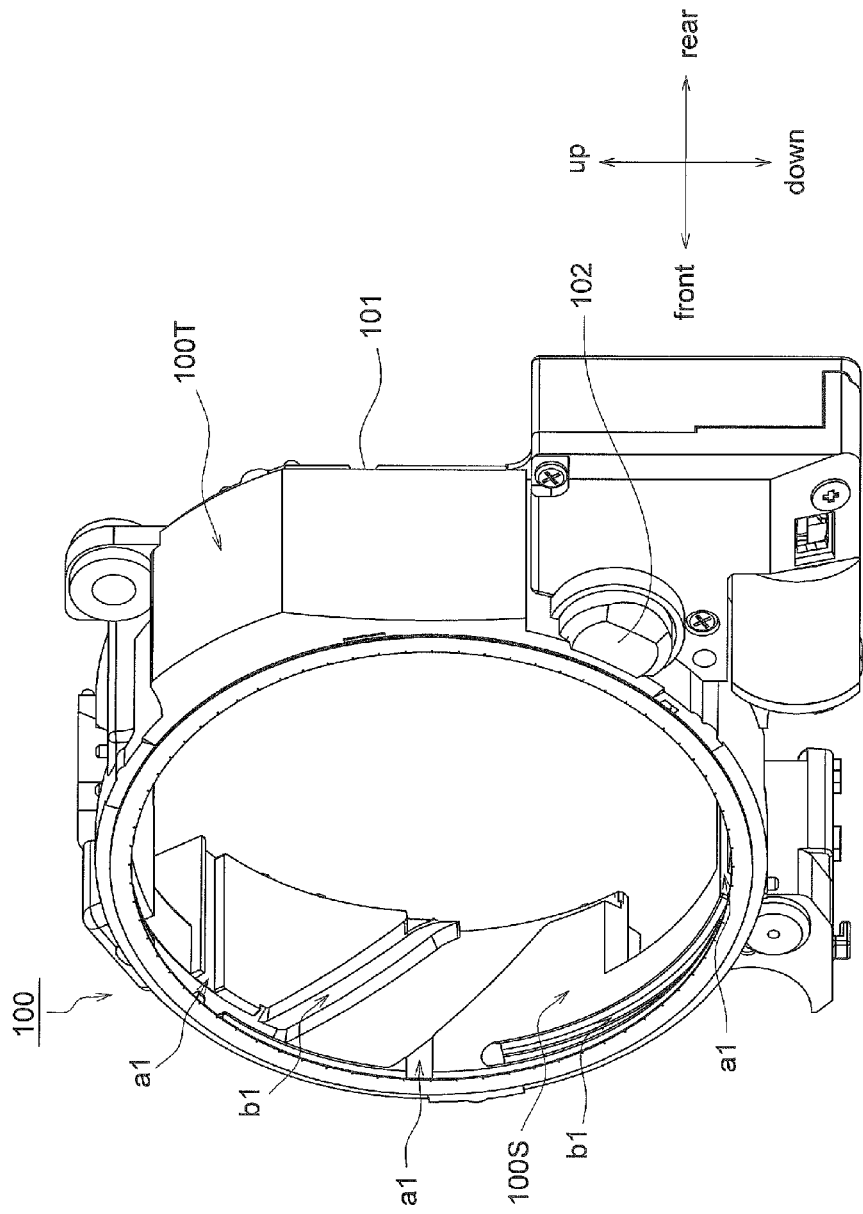
FIG. 4 is an oblique view of a stationary frame.

FIG. 4 is an oblique view of the stationary frame 100. The stationary frame 100 has a stationary frame main body 101 and a zoom gear support 102.

The stationary frame main body 101 is formed in a cylindrical shape, and has an inner peripheral face 100S and an outer peripheral face 100T.

The zoom gear support 102 is provided so as to protrude from the outer peripheral face 100T. The zoom gear support 102 rotatably supports the front end of the zoom gear 242. In this embodiment, the zoom gear support 102 is covered by the front panel 11, so it is not exposed on the outside of the housing 10 (see FIG. 1). The teeth of the zoom gear 242 protrude on the inside of the stationary frame main body 101.

The stationary frame 100 has five rectilinear grooves a1 and three cam grooves b1. In FIG. 4, however, only three rectilinear grooves a1 and two cam grooves b1 are shown.

The five rectilinear grooves a1 are formed in the inner peripheral face 100S in the optical axis direction, and are suitably spaced apart in the peripheral direction.

The three cam grooves b1 are formed in the inner peripheral face 100S so as to intersect the optical axis direction.

2. Configuration of First Rectilinear Frame 110

Figure 5:
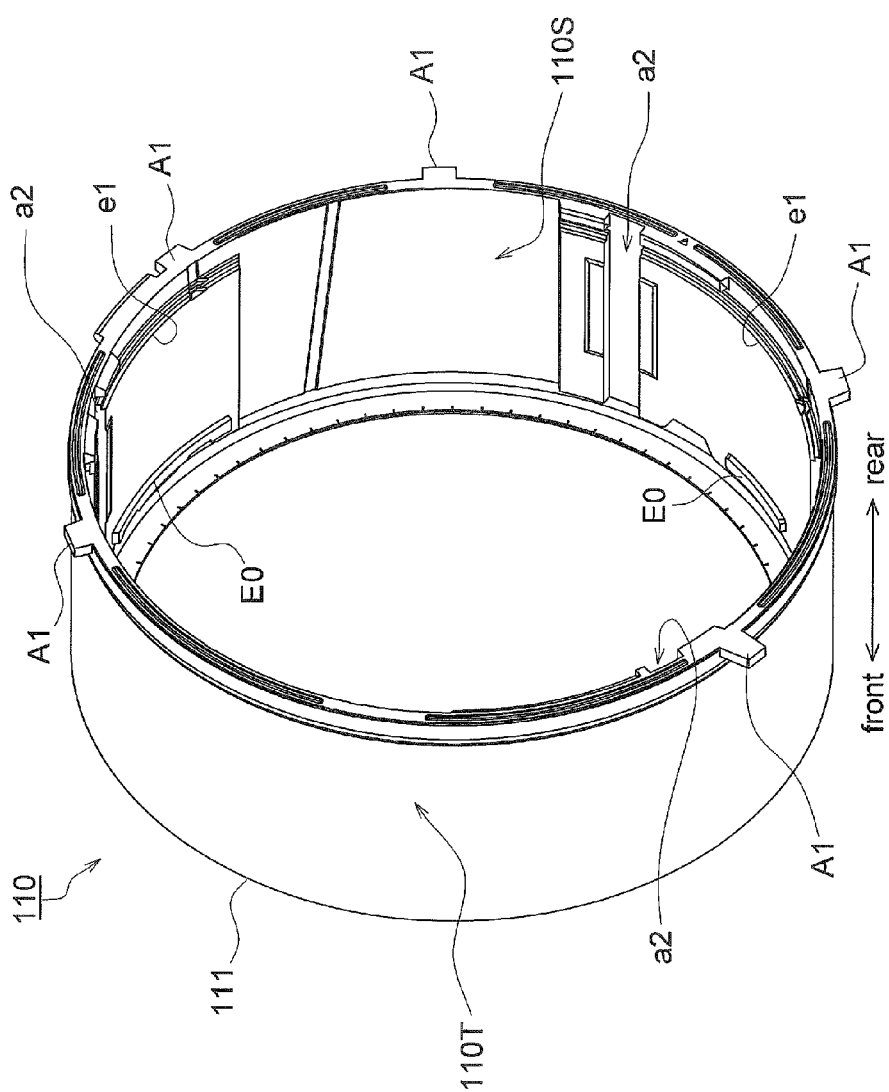
FIG. 5 is an oblique view of a first rectilinear frame.

FIG. 5 is an oblique view of the first rectilinear frame 110. The first rectilinear frame 110 has a first rectilinear frame main body 111, five rectilinear protrusions A1, three rectilinear grooves a2, a bayonet groove e1, and a bayonet protrusion E0.

The rectilinear frame main body 111 is formed in a cylindrical shape, and has an inner peripheral face 110S and an outer peripheral face 110T.

The five rectilinear protrusions A1 are provided at the rear end of the outer peripheral face 110T. The five rectilinear protrusions A1 are engaged with the five rectilinear grooves a1 of the stationary frame 100.

The three rectilinear grooves a2 are formed in the inner peripheral face 110S in the optical axis direction.

The bayonet groove e1 is formed in an arc shape in the peripheral direction at the rear end of the inner peripheral face 110S. The bayonet groove e1 intersects the three rectilinear grooves a2.

The bayonet protrusion E0 is disposed at the front end of the inner peripheral face 110S. The bayonet protrusion E0 is formed in an arc shape in the peripheral direction. In this embodiment, a plurality of bayonet protrusions E0 are provided in the peripheral direction.

3. Configuration of First Rotary Frame 210

Figure 6:
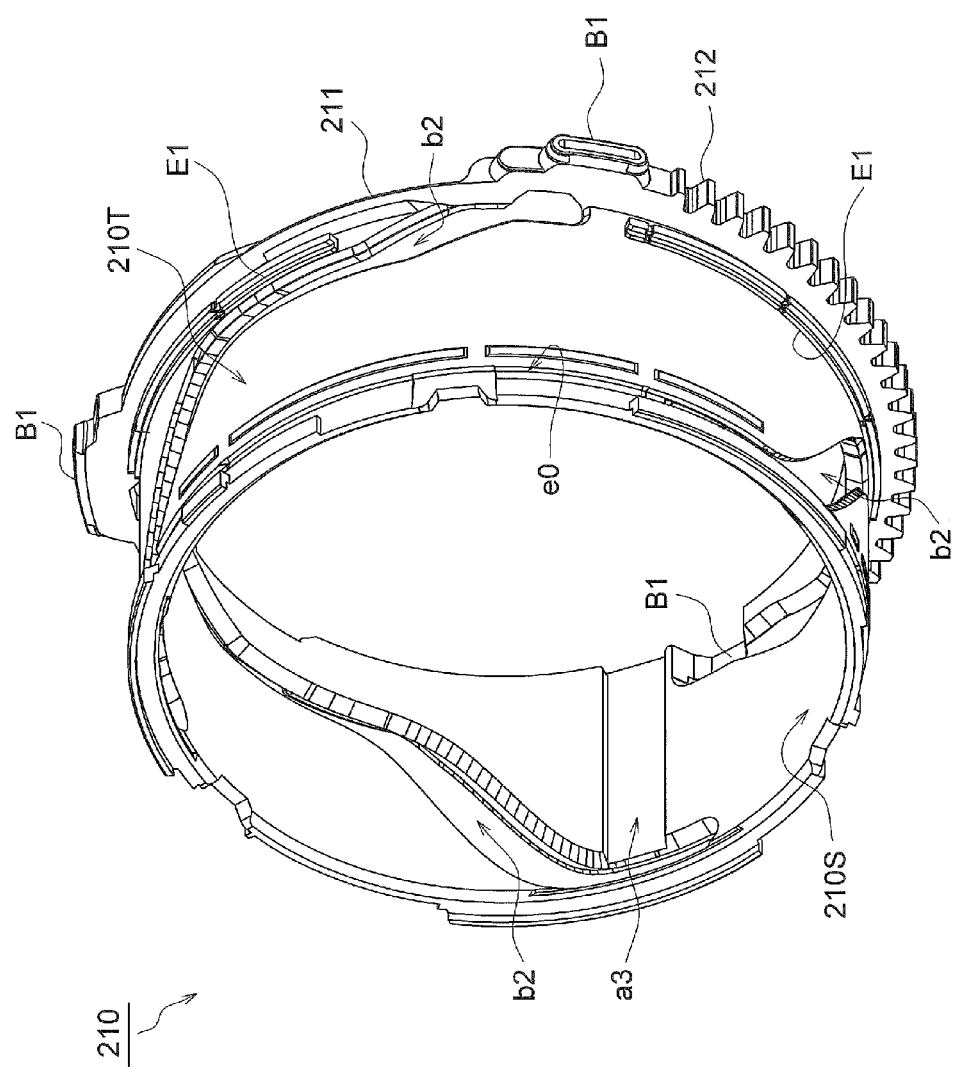
FIG. 6 is an oblique view of a first rotary frame.

FIG. 6 is an oblique view of the first rotary frame 210. The first rotary frame 210 has a first rotary frame main body 211 and a gear portion 212.

The first rotary frame main body 211 is formed in a cylindrical shape, and has an inner peripheral face 210S and an outer peripheral face 210T.

The gear portion 212 is provided to the rear end of the outer peripheral face 210T, and is formed in the peripheral direction. When the gear portion 212 meshes with the zoom gear 242, the first rotary frame 210 is rotated in the peripheral direction by the drive force of the zoom motor 241. Although not depicted, the gear portion 212 is disposed further to the rear than the rectilinear protrusions A1 of the first rectilinear frame 110.

The first rotary frame 210 has three cam followers B1, three bayonet protrusions E1, three cam grooves b2, a bayonet groove e0, and three rectilinear grooves a3. In FIG. 6, however, only one of the rectilinear grooves a3 is shown.

The three cam followers B1 are provided to the rear end of the outer peripheral face 210T. Two of the three cam followers B1 are disposed at the both ends of the gear portion 212. The three cam followers B1 engages with the cam grooves b1 of the stationary frame 100.

The bayonet protrusions E1 are formed in the peripheral direction at the rear end of the outer peripheral face 210T. The bayonet protrusions E1 are disposed in front of the gear portion 212. The bayonet protrusions E1 engages with the bayonet groove e1 of the first rectilinear frame 110. In this embodiment, the bayonet protrusions E1 and the bayonet groove e1 constitute a bayonet mechanism for rotatably engaging the first rotary frame 210 with the first rectilinear frame 110, and integrally engaging these in the optical axis direction.

The three cam grooves b2 pass through the first rotary frame main body 211 from the inner peripheral face 210S to the outer peripheral face 210T.

The bayonet groove e0 is formed at the front end of the outer peripheral face 210T. The bayonet groove e0 is formed in an arc shape in the peripheral direction. The bayonet groove e0 intersects the three cam grooves b2. The bayonet protrusion E0 engages with the bayonet groove e0.

The three rectilinear grooves a3 are formed in the inner peripheral face 210S in the optical axis direction. Two of the three rectilinear grooves a3 are close together, and are formed away from the other one in a range from 1200 to 180°.

4. Configuration of Second Rectilinear Frame 120

Figure 7:
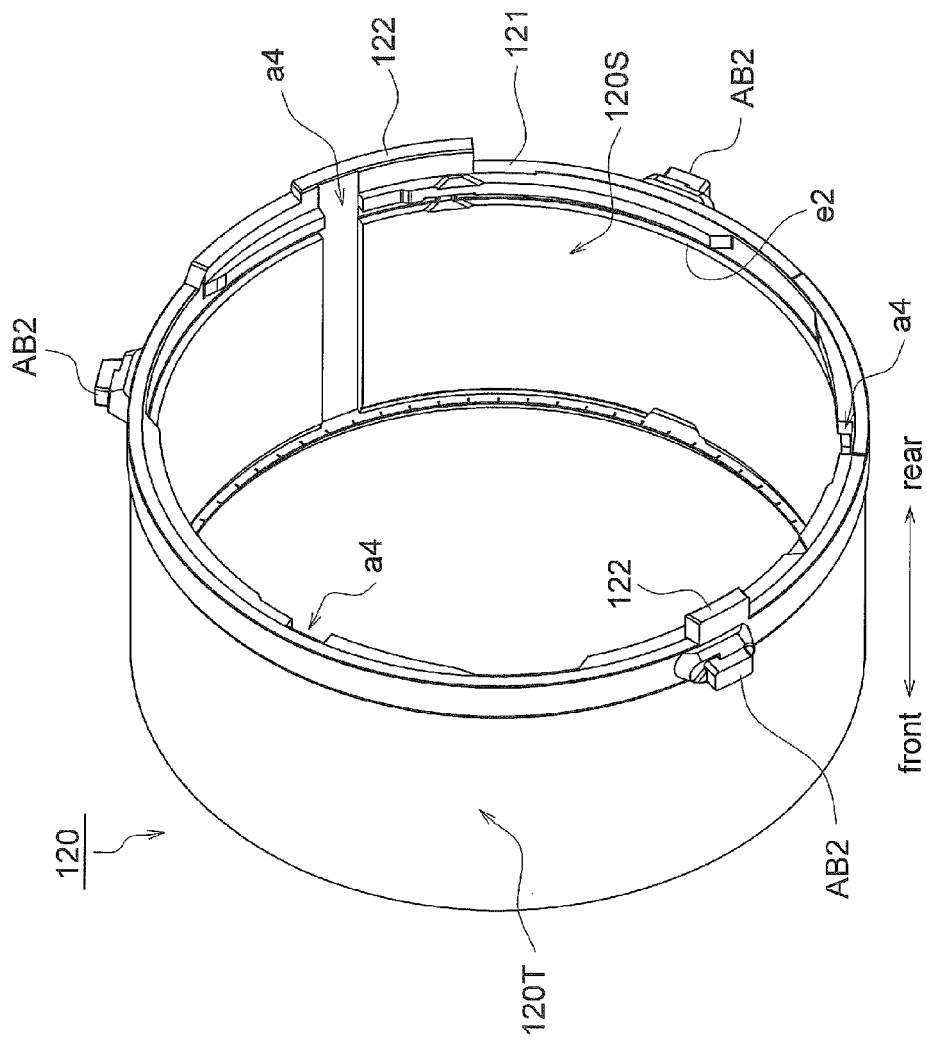
FIG. 7 is an oblique view of a second rectilinear frame.

FIG. 7 is an oblique view of the second rectilinear frame 120. The second rectilinear frame 120 has a second rectilinear frame main body 121 and two latching portions 122.

The second rectilinear frame main body 121 is formed in a cylindrical shape, and has an inner peripheral face 120S and an outer peripheral face 120T.

The two latching portions 122 are provided on the rear end face of the second rectilinear frame main body 121, and protrude toward the rear. The two latching portions 122 are formed at substantially symmetrical positions around the optical axis AX (see FIG. 3), that is, at positions that are separated by 120° to 180°. As will be discussed below, when the two latching portions 122 are latched to the third rectilinear frame 130, the relative rotation of the third rectilinear frame 130 with respect to the second rectilinear frame 120 is prevent. In this embodiment, one of the two latching portions 122 is formed longer in the peripheral direction than the other one.

The second rectilinear frame 120 has three rectilinear cam followers AB2, three rectilinear grooves a4, and a bayonet groove e2.

The three rectilinear cam followers AB2 are provided at the rear end of the outer peripheral face 120T, and are disposed at a substantially constant pitch in the peripheral direction. The three rectilinear cam followers AB2 engages with the three cam grooves b2 of the first rotary frame 210. Also, the three rectilinear cam followers AB2 pass through the three cam grooves b2 and engages with the three rectilinear grooves a2 of the first rectilinear frame 110.

The three rectilinear grooves a4 are formed in the inner peripheral face 120S in the optical axis direction. The three rectilinear grooves a4 are disposed at a substantially constant pitch in the peripheral direction.

The bayonet groove e2 is formed at the rear end of the inner peripheral face 120S in the peripheral direction. The bayonet groove e2 intersects the three rectilinear grooves a4.

5. Configuration of Second Rotary Frame 220

Figure 8:
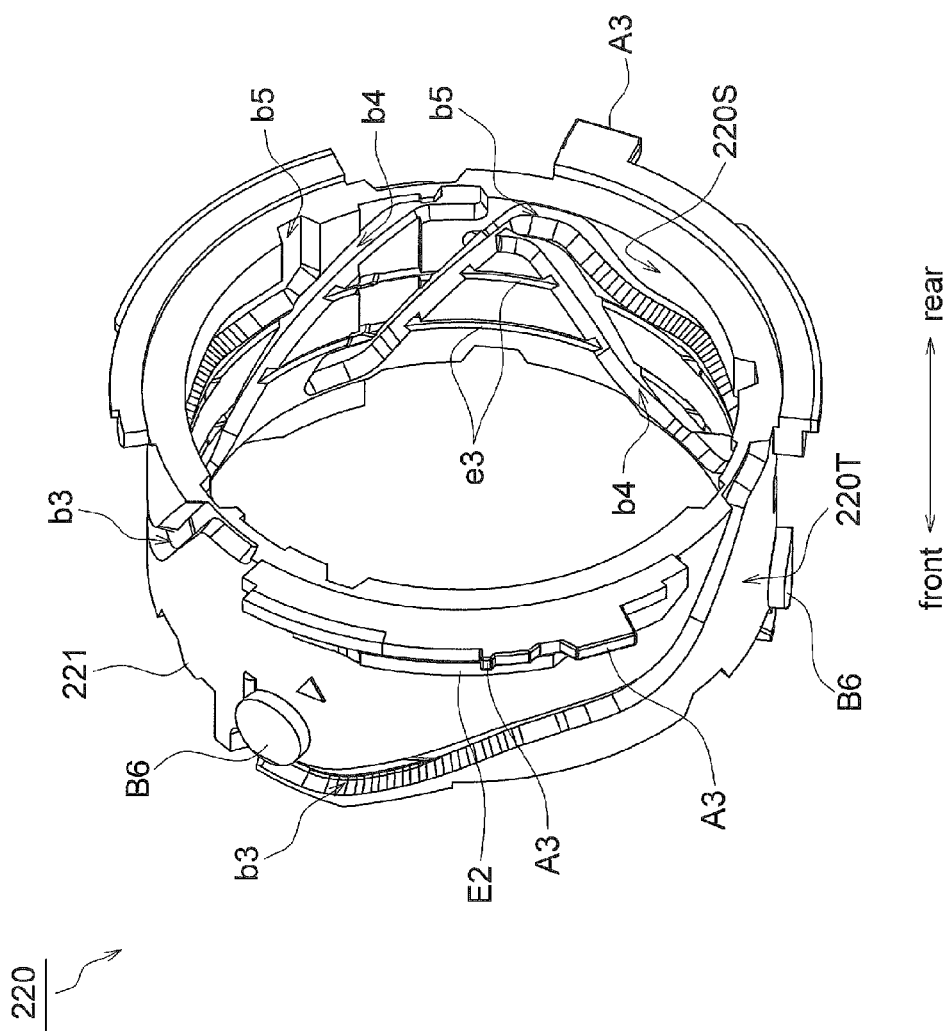
FIG. 8 is an oblique view of a second rotary frame.

FIG. 8 is an oblique view of the second rotary frame 220. The second rotary frame 220 has a second rotary frame main body 221, three rectilinear protrusions A3, three bayonet protrusions E2, two bayonet grooves e3, three cam grooves b3, three cam grooves b4, three cam grooves b5, and three cam followers B6. In FIG. 8, however, only two each of the cam grooves b3, the cam grooves b4, and the cam grooves b5 are shown.

The second rotary frame main body 221 is formed in a cylindrical shape, and has an inner peripheral face 220S and an outer peripheral face 220T.

The three rectilinear protrusions A3 are provided at the rear end of the outer peripheral face 220T, two of the three rectilinear protrusions A3 are close together in the peripheral direction, and the other one is separated by about 120° or more from the two rectilinear protrusions A3 that are close together. The three rectilinear protrusions A3 engages with the three rectilinear grooves a3 of the first rotary frame 210.

The three bayonet protrusions E2 are formed in the peripheral direction at the rear end of the outer peripheral face 220T. The three bayonet protrusions E2 are disposed in front of the three rectilinear protrusions A3. The bayonet protrusions E2 engages with the bayonet groove e2 of the second rectilinear frame 120. In this embodiment, the bayonet protrusions E2 and the bayonet groove e2 constitute a bayonet mechanism for engaging the second rotary frame 220 rotatably with the second rectilinear frame 120 and integrally in the optical axis direction.

The shape of the bayonet grooves e3 in a cross section including the optical axis is a trapezoidal shape in which the side on the outside in the radial direction is shorter, and the side on the inside in the radial direction is longer, and the bayonet grooves e3 are formed in the approximate center of the inner peripheral face 220S in the peripheral direction. The two bayonet grooves e3 are formed parallel to each other. The two bayonet grooves e3 intersect with the cam grooves b4 and the cam grooves b5. The radial direction depth of the two bayonet grooves e3 is shallower than the radial direction depth of the cam grooves b4 and the cam grooves b5.

The three cam grooves b3 are formed in the outer peripheral face 220T so as to intersect with the optical axis direction, and are disposed at a substantially constant pitch in the peripheral direction.

The cam grooves b4 and the cam grooves b5 are formed in the inner peripheral face 220S. The cam grooves b4 and the cam grooves b5 intersect each other. The radial depth of the cam grooves b4 is substantially the same as the cam grooves b5.

The three cam followers B6 are provided to the front end of the outer peripheral face 220T, and are disposed at a substantially constant pitch in the peripheral direction. In FIG. 8, however, only two of the cam followers B6 are shown.

6. Configuration of Third Rectilinear Frame 130

Figure 9A:
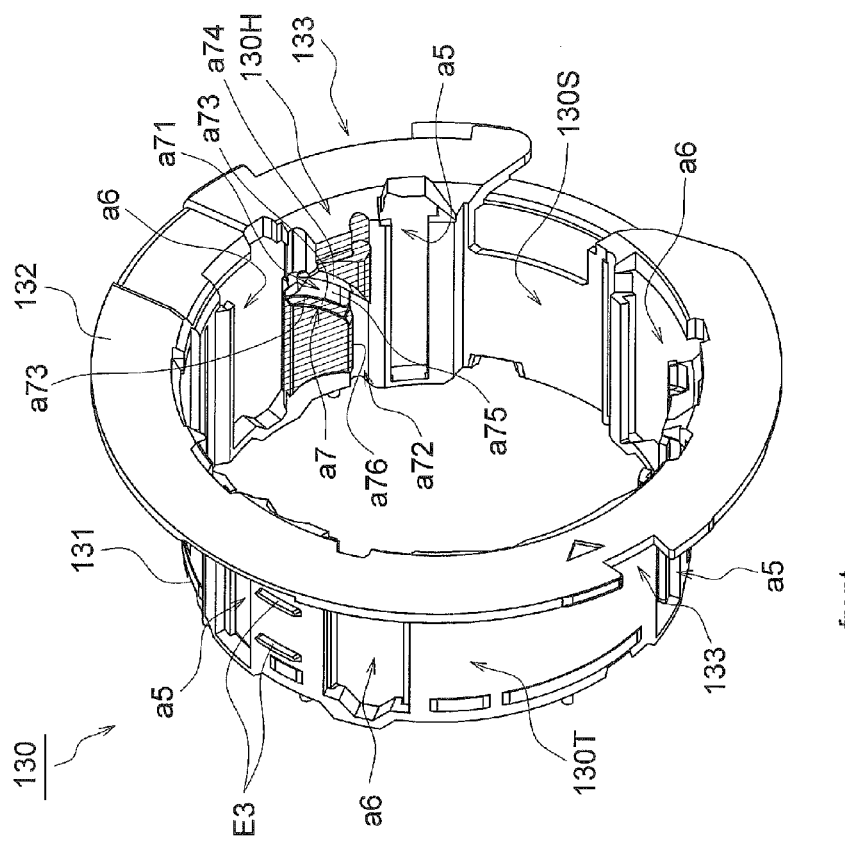
FIG. 9A is an oblique view of a third rectilinear frame.
Figure 9B:
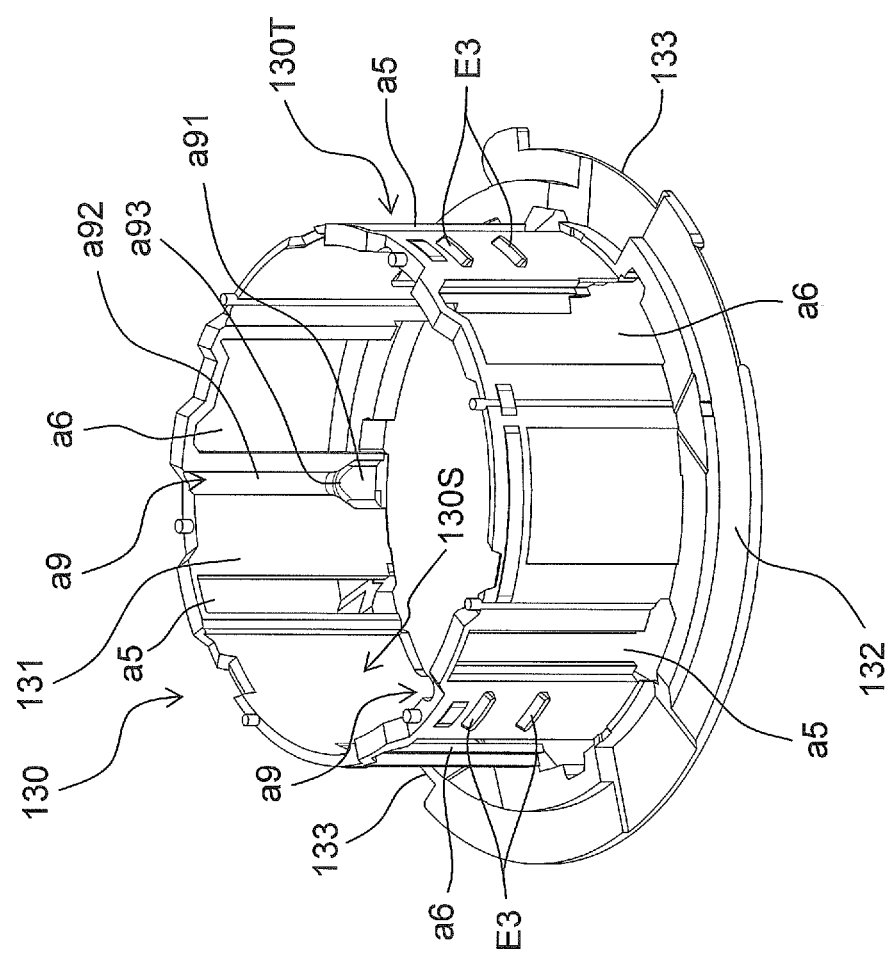
FIG. 9B is an oblique view of a third rectilinear frame.

FIGS. 9A and 9B are oblique views of the third rectilinear frame 130. The third rectilinear frame 130 has a third rectilinear frame main body 131, a flange 132, and two latching recesses 133.

The third rectilinear frame main body 131 is formed in a cylindrical shape, and has an inner peripheral face 130S and an outer peripheral face 130T.

The flange 132 is formed in an annular shape, and is provided on the rear end of the outer peripheral face 130T.

Figure 10:
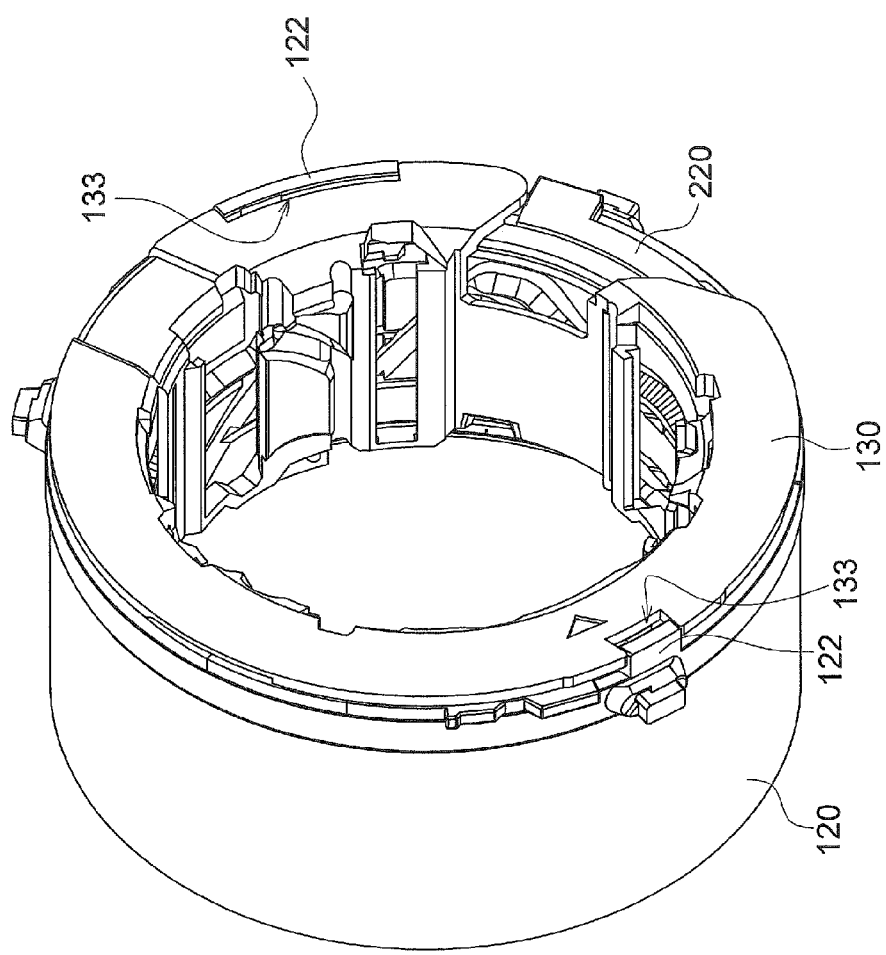
FIG. 10 is a simplified view of when the second rectilinear frame, the second rotary frame, and the third rectilinear frame have been assembled.

The two latching recesses 133 are cut-outs formed in the outer edge of the flange 132. The two latching recesses 133 are formed in substantially symmetrical positions around the optical axis AX (see FIG. 3), that is, at positions separated by 120° to 180°. FIG. 10 is a schematic diagram in which the second rectilinear frame 120, the second rotary frame 220, and the third rectilinear frame 130 have been put together. As shown in FIG. 10, when the two latching portions 122 of the second rectilinear frame 120 are latched to the two latching recesses 133 of the third rectilinear frame 130, relative rotation of the third rectilinear frame 130 with respect to the second rectilinear frame 120 is prevented. One of the two latching recesses 133 is formed longer in the peripheral direction than the other one, corresponding to the fact that one of the two latching portions 122 is formed longer in the peripheral direction than the other one. This increases the strength of the two latching recesses 133.

The third rectilinear frame 130 has six bayonet protrusions E3, three rectilinear grooves a5, and three rectilinear grooves a6. In FIG. 9A, however, only two of the bayonet protrusions E3 are shown, and in FIG. 9B, only four of the bayonet protrusions E3 are shown.

The shape of the six bayonet protrusions E3 in a cross section including the optical axis is a trapezoidal shape in which the side on the outside in the radial direction is shorter, and the side on the inside in the radial direction is longer. Also, the bayonet protrusions E3 are formed in the peripheral direction in the approximate center of the outer peripheral face 130T. Two of the bayonet protrusions E3 are formed parallel to each other at the same position in the peripheral direction. These two bayonet protrusions E3 form a set, and these sets are disposed at three places at a substantially constant pitch in the peripheral direction. In other words, three sets of the bayonet protrusions E3, that is, the six bayonet protrusions E3, are disposed on the third rectilinear frame 130. The six bayonet protrusions E3 engages with the two bayonet grooves e3 of the second rotary frame 220. In this embodiment, the bayonet protrusions E3 and the bayonet grooves e3 constitute a bayonet mechanism for rotatably engaging the third rectilinear frame 130 with the second rotary frame 220, and integrally engaging them in the optical axis direction.

The three rectilinear grooves a5 pass through the third rectilinear frame main body 131 from the inner peripheral face 130S to the outer peripheral face 130T. The three rectilinear grooves a5 extend in the optical axis direction, and are disposed at a substantially constant pitch in the peripheral direction.

The three rectilinear grooves a6 pass through the third rectilinear frame main body 131 from the inner peripheral face 130S to the outer peripheral face 130T. The three rectilinear grooves a6 extend in the optical axis direction, and are disposed at a substantially constant pitch in the peripheral direction.

In this embodiment, the three rectilinear grooves a5 and the three rectilinear grooves a6 are disposed alternately in the peripheral direction.

As shown in FIG. 9A, the third rectilinear frame 130 further has a guide groove a7 (an example of a first cam portion) formed in the inner peripheral face of the third rectilinear frame main body 131, and a reinforcing portion 130H (shaded part) formed near the guide groove a7.

The guide groove a7 guides a driven portion 411 (see FIG. 14A; discussed below) as a cam follower. The guide groove a7 and the driven portion 411 constitute a cam mechanism for moving a retracting lens frame 401. This cam mechanism changes the orientation of the retracting lens frame 401 when the third rectilinear frame 130 moves relative to the retracting lens frame 401 in the optical axis direction.

As shown in FIG. 9A, the guide groove a7 has a portion that is inclined to the optical axis direction (inclined part a71) and a portion is that parallel to the optical axis direction (parallel part a72). When the driven portion 411 is guided by this inclined part a71, the retracting lens frame 401 rotates around a retraction shaft 501b. The retracting lens frame 401 transitions between an image blur correction enabled position and a retracted position by rotating around the retraction shaft 501b. In the retracted position, the driven portion 411 is guided by the parallel part a72 of the guide groove a7, thereby the retracting lens frame 401 stops rotating around the retraction shaft 501b at the retracted position.

The retracting lens frame 401 is biased by a rotary spring 403 from the retracted position toward the image blur correction enabled position. More precisely, this biasing direction is a direction around the retraction shaft 501b, a direction perpendicular to the optical axis direction, and a direction in which the retracting lens frame 401 enters its imaging enabled state. Specifically, this biasing direction is a direction in which the optical axis direction of the third lens group L3 is aligned with the optical axis direction of the other lenses.

Therefore, when the guide groove a7 and the driven portion 411 cause the retracting lens frame 401 to rotate against the biasing force of the rotary spring 403, the driven portion 411 comes into contact with one side (one side face) of the guide groove a7. The guide groove a7 is formed in the form of a groove. Specifically, the guide groove a7 is made up of three faces. These three faces constitute a side face a73 on the front side in the optical axis direction, a side face a74 on the rear side in the optical axis direction, and a bottom face a75 that is parallel to the optical axis direction and connects the first two faces. The contact face of the guide groove a7 that comes into contact with the driven portion 411 is the side face a73 on the front side in the optical axis direction. Therefore, the retracting lens frame 401 can be rotated as long as the side face a73 on the front side in the optical axis direction is provided. In this case, the contact face at the position immediately after the completion of retraction is a contact face a76. After this, a positioning portion 412 of the retracting lens frame 401 that has been guided by a guide portion 322a is supported in a state of being in contact with a support portion 322b, and the retraction operation is complete.

However, because the guide groove a7 is formed in a grooved shape, that is, constitutes three faces, the position of the driven portion 411 is reliably maintained by the guide groove a7 even if the camera is dropped, subjected to an impact, etc., so the orientation of the retracting lens frame 401 can be kept stable. For the same reason, the parallel part a72 is also in a grooved shape, that is, constitutes three faces. Furthermore, even if the rotational load of the retracting lens frame 401 is increased over the rotational force of the rotary spring 403 due to the influence of wear through continuous use or of the adhesion of foreign matter in the guide groove a7, the retracting lens frame 401 can still be forcibly rotated.

The side face a73 on the front side in the optical axis direction and the side face a74 on the rear side in the optical axis direction of the guide groove a7 are formed in a tapered shape (that is, a sloped face shape) with respect to the direction perpendicular to the optical axis direction, so that there is no undercutting in the sliding direction of the mold during injection molding. The contact face of the driven portion 411 that engages with the guide groove a7 is also formed in a shape corresponding to the side face a73 on the front side in the optical axis direction and the side face a74 on the rear side in the optical axis direction. Specifically, the contact face of the driven portion 411 that engages with the guide groove a7 is formed in a tapered shape (that is, a sloped face shape) with respect to the direction perpendicular to the retraction shaft 501b, so that the side face a73 on the front side in the optical axis direction and the side face a74 on the rear side in the optical axis direction are substantially parallel to each other. The angle of the sloped face on the side face a73 on the front side in the optical axis direction is smaller than one on the side face a74 on the rear side in the optical axis direction. The angle of the sloped face is an angle to the direction perpendicular to the optical axis direction. The smaller is the angle of the sloped face to the direction perpendicular to the optical axis direction, the less torque loss is caused by the rotational load of the retracting lens frame 401 generated at the sloped face, and the less it becomes for the driven portion 411 to come loose from the guide groove a7. On the other hand, the larger is the angle of the sloped face to the direction perpendicular to the optical axis direction, the easier it becomes to avoid mold undercut during injection molding. Also, the larger is the angle of the sloped face to the direction perpendicular to the optical axis direction, the larger is the angle of the sloped face of the driven portion 411 opposite the sloped face with respect to the direction perpendicular to the retraction shaft 501b. The larger is the angle of the contact face of the driven portion 411 to the direction perpendicular to the retraction shaft 501b, the stronger the base of the driven portion 411 can be made. Consequently, damage through continued use, the input of dropping force, impact force, or the like, and so forth can be prevented.

In this disclosure, the angle of the sloped face of the side face a73 on the front side in the optical axis direction with respect to the direction perpendicular to the optical axis direction is small, and the angle of the sloped face of the side face a74 on the rear side in the optical axis direction with respect to the direction perpendicular to the optical axis direction is large. Also, the sloped face of the driven portion 411 corresponding to these sloped faces is formed so as to be substantially parallel to the faces of the guide groove a7. This reduces torque loss through rotational load of the retracting lens frame 401, and makes it less likely that the driven portion 411 comes loose from the guide groove a7. It also prevents damage through continued use, the input of dropping force, impact force, or the like, and so forth.

As discussed above, during normal operation, that is, when the camera is not dropped or otherwise subjected to impact, and there is no adhered foreign matter, worn parts, etc., only the side face a73 on the front side in the optical axis direction is in contact with the driven portion 411. Accordingly, the above effect can be obtained as long as at least the angle of the side face on the rear side in the optical axis direction with respect to the direction perpendicular to the optical axis is small.

Because the guide groove a7 that engages with the driven portion 411 is formed in the third rectilinear frame 130, rotation of the retracting lens frame 401 can be started earlier during the transition period between the imaging enabled state and the housed state. If the guide groove a7 is provided to the stationary portion of the imaging element holder or the like, the retracting lens frame 401 is usually away from the stationary portion in the optical axis direction. Accordingly, during the transition period between the imaging enabled state and the housed state, the guide groove a7 and the retracting lens frame 401 cannot be instantly engaged, and the rotation of the retracting lens frame 401 cannot be started right away.

In contrast, if the guide groove a7 is provided to the third rectilinear frame 130, during the transition period between the imaging enabled state and the housed state, the guide groove a7 and the driven portion 411 always is close enough to engage. Accordingly, if the guide groove a7 is provided to the third rectilinear frame 130, the rotation of the retracting lens frame 401 can be started right away during the transition period between the imaging enabled state and the housed state.

Also, because the driven portion 411 and the guide groove a7 are formed in the third rectilinear frame 130, this improves the rotational precision of the retracting lens frame 401. For example, if the guide groove a7 is provided to the stationary portion of the imaging element holder or the like, there is the risk that more parts are in between the driven portion 411 and the guide groove a7. The more of these parts there are, the worse is the relative positional accuracy between the driven portion 411 and the guide groove a7, and the less accurate is the relative rotation of the retracting lens frame 401 with respect to the retraction shaft 501b. In contrast, if the guide groove a7 is provided to the third rectilinear frame 130, there are relatively few parts in between the driven portion 411 and the guide groove a7, so the relative positional accuracy of the retracting lens frame 401 is increased.

Also, as discussed above, if the guide groove a7 is provided to the stationary portion of the imaging element holder or the like, there are more parts in between the driven portion 411 and the guide groove a7, so this adversely affects the relative rotational accuracy of the retracting lens frame 401 with respect to the retraction shaft 501b. Furthermore, if the retracting lens frame 401 is mounted to the OIS frame 400 so as to be rotatable around an axis parallel to the optical axis, there is a further loss of relative rotational accuracy between the driven portion 411 and the guide groove a7. To put this another way, if a retraction mechanism is constituted and the OIS frame 400 is mounted to the shutter frame 335 so as to operate in a plane perpendicular to the optical axis (that is, if an image blur correction mechanism is constituted), there is a further loss of relative rotational accuracy between the driven portion 411 and the guide groove a7. However, if the guide groove a7 is provided to the third rectilinear frame 130, there are relatively few parts in between the driven portion 411 and the guide groove a7, so there is better relative rotational accuracy of the retracting lens frame 401 with respect to the retraction shaft 501b.

Also, because the guide groove a7 that engages with the driven portion 411 is formed in the third rectilinear frame 130, the guide groove a7 can be easily constituted by three faces, namely, the side face a73 on the front side in the optical axis direction, the side face a74 on the rear side in the optical axis direction, and the bottom face a75 that is parallel to the optical axis and connects the above-mentioned two faces.

On the other hand, if the guide groove a7 is provided to the stationary portion of the imaging element holder or the like, the guide groove a7 has to be formed in the stationary portion of the imaging element holder. Here, if an attempt is made to form the three faces constituting the guide groove a7 in the stationary portion of the imaging element holder, then the stationary portion of the imaging element holder or the like end up being larger. Also, if the guide groove a7 is formed in a small space in order to avoid making the stationary portion of the imaging element holder larger, the guide groove a7 is not strong enough.

However, if the guide groove a7 is provided to the third rectilinear frame 130, since the third rectilinear frame 130 is cylindrical, it is easy to provide the three faces of the guide groove a7. Also, in this case there is no need to form the guide groove a7 in the stationary portion of the imaging element holder or the like, so there is no need to make the stationary portion of the imaging element holder larger. Also, in this case, since the portion where the guide groove a7 is formed is cylindrical, the strength of the guide groove a7 can also be improved.

Furthermore, because the guide groove a7 that engages with the driven portion 411 is formed in the third rectilinear frame 130, positioning can be performed more accurately within the plane perpendicular to the optical axis during retraction. If the guide groove a7 is provided to the third rectilinear frame 130, a mechanism for positioning the OIS frame 400 with respect to the third rectilinear frame 130 within the plane perpendicular to the optical axis is formed between it and the third rectilinear frame 130. Accordingly, there is better positioning accuracy of the retracting lens frame 401 and the OIS frame 400.

The reason why there is a need for a mechanism for positioning the OIS frame 400 with respect to the third rectilinear frame 130 will now be discussed. If the image blur correction mechanism causes the OIS frame 400 to move within the plane perpendicular to the optical axis, the rotational accuracy of the retracting lens frame 401 with respect to the OIS frame 400 decreases. Accordingly, during the retraction operation, the OIS frame 400 has to be stopped with respect to the third rectilinear frame 130. The reason why the rotational accuracy of the retracting lens frame 401 deteriorates when the OIS frame 400 moves is that the positional relation between the retraction shaft 501b installed on the OIS frame 400 and the guide groove a7 installed on the third rectilinear frame 130 ends up moving.

With the positioning mechanism in the example disclosed here, the position where the OIS frame 400 is positioned in the plane perpendicular to the optical axis is the optical axis center. In this case, the distance the OIS frame 400 moves during positioning within the plane perpendicular to the optical axis is relatively short. This allows the positioning mechanism to be smaller.

This is not the only option, and the position where the OIS frame 400 is positioned can also be set in the direction toward the guide groove a7, offset from the optical axis. In this case, since the retraction shaft 501b and the guide groove a7 move closer together, the speed increasing ratio at which the retracting lens frame 401 rotates can be set higher. Specifically, the ratio of the rotational angle of the lens center of the retracting lens frame 401 to the rotational angle of the driven portion 411, using the retraction shaft 501b as a reference, can be increased. This ensures the rotational angle necessary for retraction of the retracting lens frame 401 even though the guide groove a7 is relatively short.

This is not the only option, and the position where the OIS frame 400 is positioned can be set to the direction away from the guide groove a7, offset from the optical axis. In this case, since the retraction shaft 501b and the guide groove a7 move away from each other, the speed increasing ratio at which the retracting lens frame 401 rotates can be set lower. Specifically, the ratio of the rotational angle of the lens center of the retracting lens frame 401 to the rotational angle of the driven portion 411, using the retraction shaft 501b as a reference, can be decreased. This reduces the load exerted on the driven portion 411 during retraction, and prevents wear of the contact face.

This is not the only option, and the position where the OIS frame 400 is positioned can be set to the direction in which the retracting lens frame 401 retracts, offset from the optical axis. In this case, the retraction amount, that is, the rotational angle of the retracting lens frame 401 around the retraction shaft 501b, can be reduced by an amount corresponding to the offset. This ensures the rotational angle necessary for retraction of the retracting lens frame 401 even through the guide groove a7 is relatively short. In this case, since the pressure angle of the guide groove a7 can be reduced, the load exerted on the driven portion 411 during retraction can be reduced, and wear of the contact face can be prevented.

The reinforcing portion 130H is formed locally on the third rectilinear frame main body 131. The reinforcing portion 130H is formed on the inner peripheral face of the third rectilinear frame main body 131. More specifically, the reinforcing portion 130H is formed on the third rectilinear frame main body 131 so as to protrude toward the inside of the third rectilinear frame main body 131. Specifically, using the outer peripheral face of the third rectilinear frame main body 131 as a reference, the reinforcing portion 130H is formed so that the thickness of the reinforcing portion 130H increases toward the inner peripheral side from the thickness of the other portion. The "other portion" referred to here is the portion opposite the third lens support 420 of the retracting lens frame 401 in the housed state, on the inside in the radial direction of the third rectilinear frame main body 131, or is the portion opposite the actuator installed in the shutter frame 335. The reinforcing portion 130H is formed near the guide groove a7, such as adjacent to the guide groove a7.

The thickness of the reinforcing portion 130H is determined by the thickness of the guide groove a7. Specifically, the thickness of the reinforcing portion 130H is set so that the depth of the guide groove a7 (the radial direction dimension of the guide groove a7) fits in the reinforcing portion 130H. The depth of the guide groove a7 is determined by the size (height) of the driven portion 411 inserted into the guide groove a7. The depth of the guide groove a7 (the radial direction dimension of the guide groove a7) is set so as to accommodate the height of the driven portion 411 (the radial direction dimension of the driven portion 411).

The thickness of the third rectilinear frame main body 131 is preferably as thin as possible in order to reduce the outside diameter of the lens barrel 20. The thickness of the portion opposite the relatively large parts disposed on the inside in the radial direction of the third rectilinear frame main body 131 is preferably reduced. For example, in the housed state, the thickness of the portion opposite the third lens support 420 of the retracting lens frame 401 is preferably reduced. Also, the thickness of the portion opposite the actuators installed on the shutter frame 335 (such as the motor for driving the shutter vanes, the motor for aperture drive, the motor for driving the ND vanes, the coil for correcting image blur, and the magnet for correcting image blur) is preferably reduced.

However, the cam mechanism for moving the retracting lens frame 401, that is, the portion where the guide groove a7 and the driven portion 411 engage, needs to be strong, so a certain amount of thickness is necessary. If this portion having a certain thickness is formed on the inner peripheral face side of the third rectilinear frame main body 131, the outside diameter of the third rectilinear frame main body 131 can be kept from becoming larger. Specifically, an increase in the outside diameter of the lens barrel 20 can be suppressed.

With the shutter frame 335, the OIS frame 400, and the second lens group frame 320 that move in the optical axis direction on the radial direction inside of the third rectilinear frame 130, the portion opposite the reinforcing portion 130H is made thinner than the other portion in order to prevent interference. Specifically, this portion is made thinner so that the radial direction dimension becomes smaller.

As shown in FIG. 9B, the third rectilinear frame 130 has two shunting grooves a9 for restricting movement of the OIS frame 400 with respect to the shutter frame 335 or the third rectilinear frame 130. The two shunting grooves a9 are formed in the inner peripheral face 130S of the third rectilinear frame main body 131. The two shunting grooves a9 are formed in the third rectilinear frame main body 131 at a specific distance apart from each other in the peripheral direction on the inner peripheral face 130S. The two shunting grooves a9 are disposed at positions of approximately 120°, using the driven portion 411 as a reference, as seen from the optical axis direction. The two shunting grooves a9 and the guide groove a7 restrict movement of the OIS frame 400 in the direction perpendicular to the optical axis, with respect to the shutter frame 335 or the third rectilinear frame 130.

The two shunting grooves a9 are grooves extending in the optical axis direction. The shunting grooves a9 are formed so that the groove part is larger on the flange 132 side. More specifically, the shunting grooves a9 have three portions, such as a first groove a91, a second groove a92, and a third groove a93. With the first groove a91 and the second groove a92, the shape of their cross section perpendicular to the optical axis is circular, semi-elliptical, trapezoidal, rectangular, parabolic, or a combination of these.

The first groove a91 is a groove part formed on the flange 132 side, that is, the second groove a92 is a groove part formed on the subject side. The width and depth of the first groove a91 are greater than the width and depth of the second groove a92. The third groove a93 is in the form of a sloped face, a conical face, a curved face, or a shape that is a combination of these, so as to smoothly change from the width and depth of the first groove a91 to the width and depth of the second groove a92. When shunting protrusions 404 (see FIG. 15A) of the OIS frame 400 (discussed below) are disposed in the first grooves a91, the shunting protrusions 404 are movable inside the first grooves a91. Specifically, in this case the OIS frame 400 is movable within a plane perpendicular to the optical axis with respect to the third rectilinear frame 130 or the shutter frame 335.

The second groove a92 is a groove part extending in the optical axis direction from the first groove a91. When the shunting protrusions 404 (see FIG. 15A) of the OIS frame 400 (discussed below) are disposed in the second grooves a92, the OIS frame 400 is constricted in the radial direction and the peripheral direction with respect to the third rectilinear frame 130 or the shutter frame 335. Consequently, movement of the OIS frame 400 in a plane perpendicular to the optical axis is restricted with respect to the third rectilinear frame 130 or the shutter frame 335.

The third groove a93 is a groove part extending in the optical axis direction, and connects the first groove a91 and the second groove a92. When the shunting protrusions 404 (see FIG. 15A) of the OIS frame 400 (discussed below) are disposed in the third grooves a93, the OIS frame 400 transitions from a state of being movable within a plane perpendicular to the optical axis with respect to the third rectilinear frame 130 or the shutter frame 335, to a state of being gradually restricted in the radial direction and the peripheral direction.

Specifically, when the shunting protrusions 404 of the OIS frame 400 are disposed from the first grooves a91, via the third grooves a93, in the second grooves a92, this positions the OIS frame 400 in the plane perpendicular to the optical axis.

The mechanism for positioning the OIS frame 400 (positioning mechanism) is constituted by engagement of the shunting grooves a9 (a91, a92, and a93) of the third rectilinear frame 130 with the shunting protrusions 404 of the OIS frame 400, and by engagement of the guide groove a7 with the driven portion 411. About the timing of this engagement, when there is a change from the image blur correction enabled position to the retracted position, first the engagement of the guide groove a7 and the driven portion 411 begins. After this, the engagement of the guide groove a7 and the driven portion 411 begins. This prevent the OIS frame 400 from end up moving in the direction of escaping, when the retracting lens frame 401 starts to rotate in the retraction direction and a force is exerted on the driven portion 411 from the guide groove a7.

7. Configuration of First Lens Group Frame 310

Figure 11:
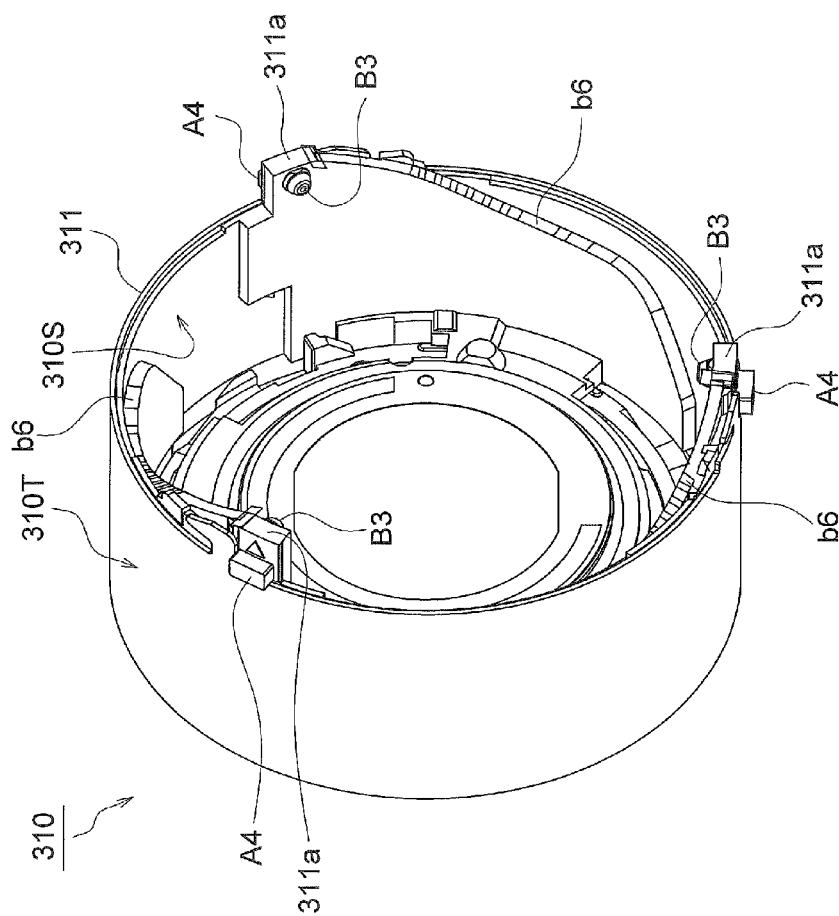
FIG. 11 is an oblique view of a first lens group frame.

FIG. 11 is an oblique view of the first lens group frame 310. The first lens group frame 310 has a first lens group frame main body 311, three rectilinear protrusions A4, and three cam followers B3.

The first lens group frame main body 311 is formed in a cylindrical shape, and has an inner peripheral face 310S and an outer peripheral face 310T. Three protrusions 311a that protrude toward the rear are formed on the first lens group frame main body 311.

The three rectilinear protrusions A4 are provided to the outer peripheral face 310T of the protrusions 311a, and are disposed at a substantially constant pitch in the peripheral direction. The three rectilinear protrusions A4 are engaged with the three rectilinear grooves a4 of the second rectilinear frame 120.

The three cam followers B3 are provided to the inner peripheral face 310S of the protrusions 311a, and are disposed at a substantially constant pitch in the peripheral direction. The three cam followers B3 are engaged with the three cam grooves b3 of the second rotary frame 220.

The three cams b6 are formed only at the wall-shaped contact faces. The three cams b6 are disposed at a substantially constant pitch in the peripheral direction on the inner peripheral face 310S so as to intersect the optical axis direction. The three cams b6 are engaged with the three cam follows B6 of the second rotary frame 220.

In this embodiment, the three rectilinear protrusions A4 and the three cam followers B3 are disposed substantially opposite each other. In other words, the protrusions 311a is disposed between each of the three rectilinear protrusions A4 and the three cam followers B3.

8. Configuration of Second Lens Group Frame 320

Figure 12A:
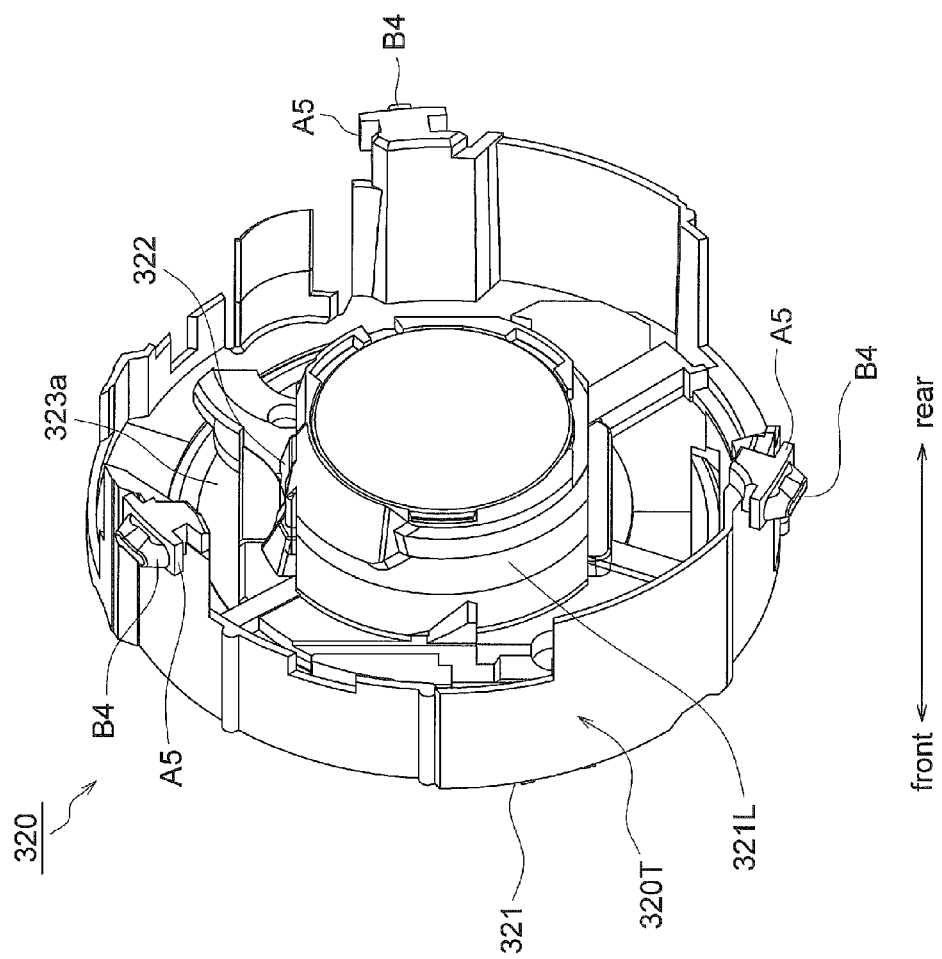
FIG. 12A is an oblique view of a second lens group frame.
Figure 12B:
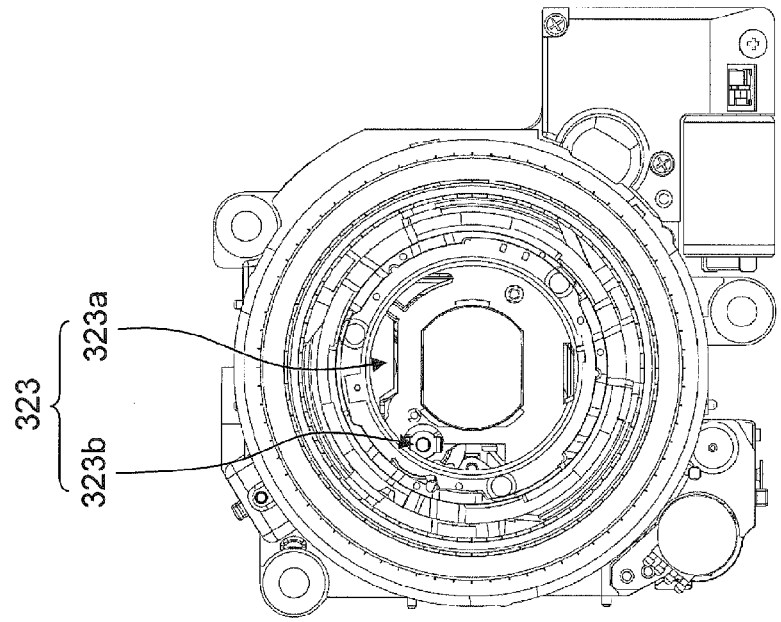
FIG. 12B is a view of the second lens group frame from the front.
Figure 12C:
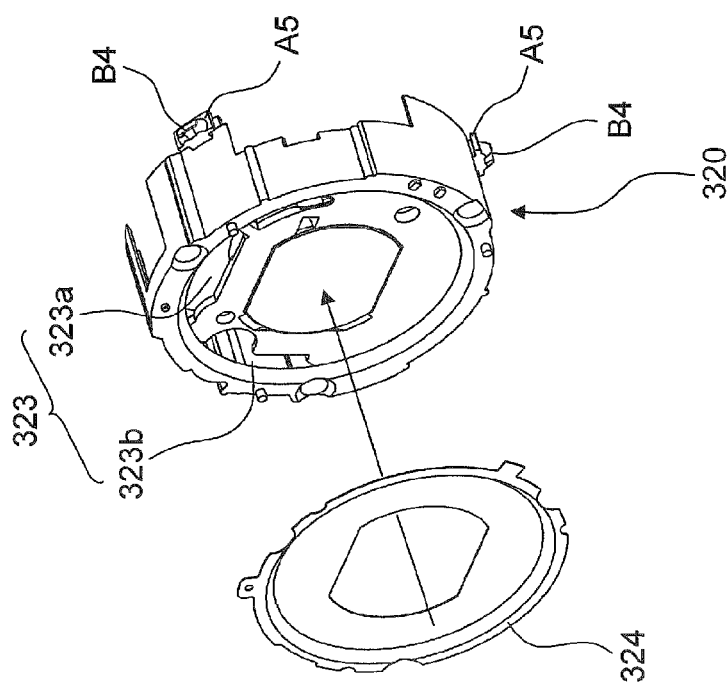
FIG. 12C is an oblique view of the relation between the second lens group frame and the sheet member.

FIG. 12A is an oblique view of the second lens group frame 320. FIG. 12B is a view of the second lens group frame 320 from the front. FIG. 12C is an oblique view of the relation between the second lens group frame 320 and the sheet member 324.

As shown in FIG. 12A, the second lens group frame 320 has a second lens group frame main body 321, a second lens support 321L for supporting the second lens group L2, a housing receptacle 322 (an example of a restrictor that restricts movement of the retracting lens frame 401; discussed below), a housing portion 323, three rectilinear protrusions A5, and three cam followers B4.

The second lens group frame main body 321 is formed in a cup shape, and has an outer peripheral face 320T.

The housing receptacle 322 is used to position the retracting lens frame 401 by restricting movement of the retracting lens frame 401, and coming into contact with the positioning portion 412 of the retracting lens frame 401, during the transition period between the imaging enabled state and the housed state. As shown in FIG. 12A, the housing receptacle 322 is formed integrally with the second lens group frame main body 321. More precisely, the housing receptacle 322 is formed integrally with the second lens group frame main body 321 on the outer peripheral part of the second lens support 321L (the portion supporting the second lens group L2). The housing receptacle 322 has the guide portion 322a that guides the retracting lens frame 401 to the retracted position by coming into contact with the positioning portion 412 of the retracting lens frame 401, and the support portion 322b that supports the retracting lens frame 401 at the retracted position (see FIG. 17A).

The guide portion 322a has a sloped face. The sloped face is formed so that the distance from the optical axis AX decreases as a position on the sloped face moves toward the imaging element side along the optical axis AX.

The cam mechanism constituted by the guide groove a7 and the driven portion 411 changes the orientation of the retracting lens frame 401, when the third rectilinear frame 130 moves relatively in the optical axis direction with respect to the retracting lens frame 401. After this, the retracting lens frame 401 is guided to the retracted position by contacting the positioning portion 412 of the retracting lens frame 401 with the guide portion 322a (sloped face).

The support portion 322b is a portion extending in the optical axis direction, and supports the retracting lens frame 401. As discussed above, the positioning portion 412 of the retracting lens frame 401 guided by the guide portion 322a is supported in a state of being in contact with the support portion 322b.

As shown in FIGS. 12A to 12C, the housing portion 323 is a portion for housing at least part of the OIS frame 400 and the retracting lens frame 401 in the retracted state. The housing portion 323 has a first housing portion 323b and a second housing portion 323a.

The second housing portion 323a is used to house a second linking portion 408 of the OIS frame 400 (discussed below). The second housing portion 323a is a hole provided on the front face side of the second lens group frame main body 321. The second housing portion 323a is provided above the second lens group L2.

In the second lens group L2, the upper and lower outer peripheral parts of the lens are cut in the flat. Specifically, the second lens group L2 is formed in an oval shape as seen in the optical axis direction. The upper and lower portions on the front face side of the second lens group frame main body 321 are wider than the other portion. Accordingly, the second lens group frame 320 has adequate strength even though a hole is provided on the front face side of the second lens group frame main body 321. The reason that the outer peripheral parts of the upper and lower portions of the lens in the second lens group L2 can be cut in the flat that is, the reason that the second lens group L2 can have an oval shape as seen in the optical axis direction, is that an imaging element 103 is formed in a rectangular shape. That is, since the imaging element 103 is rectangular in shape, the range of the light beams passing through the second lens group L2 becomes in the shape of a rectangular ring. Therefore, in the example disclosed here, the hole on the front face side of the second lens group frame main body 321 is provided above, but the same effect is obtained if it is provided below.

The second housing portion 323a is formed in a shape substantially similar to the outer shape of the second linking portion 408. Also, at least part of the second housing portion 323a and at least part of the second linking portion 408 overlap in the optical axis direction. This allows the size of the lens barrel 20 to be smaller in the optical axis direction in the housed state.

The first housing portion 323b is used to house the retraction shaft 501b, part of the retracting lens frame 401, part of the OIS frame 400, part of the shutter frame 335, an OIS rotary shaft 334, and a thrust spring 402. The first housing portion 323b is a hole provided on the front face side of the second lens group frame main body 321. The first housing portion 323b is formed in a shape corresponding to the parts to be housed.

As shown in FIG. 12B, the sheet member 324 is affixed to the front face of the second lens group frame 320. The sheet member 324 prevents light from leaking out of the hole in the front face of the second lens group frame 320 (including the housing portion 323), and also improves the aesthetics.

The three rectilinear protrusions A5 are formed on the rear end of the outer peripheral face 320T, and are disposed at a substantially constant pitch in the peripheral direction. The three rectilinear protrusions A5 are engaged with the three rectilinear grooves a5 of the third rectilinear frame 130.

The three cam followers B4 are formed on the three rectilinear protrusions A5, that is, on the outside in the radial direction. The three cam followers B4 are engaged with the three cam grooves b4 of the second rotary frame 220.

9. Configuration of Third Lens Group Frame 330

FIG. 13A shows the state when the third lens group frame 330 has been housed in the interior of the shutter frame 335. The configuration of the third lens group frame 330 will be described through reference to FIG. 13A.

The third lens group frame 330 (an OIS (optical image stabilizer) unit) mainly has the OIS frame 400 (an example of a support frame), the retracting lens frame 401, the thrust spring 402 (an example of a first biasing means), the rotary spring 403 (an example of a second biasing means, and an example of a biasing member), the third lens group L3 for image blur correction, and two magnets 521.

Figure 13B:
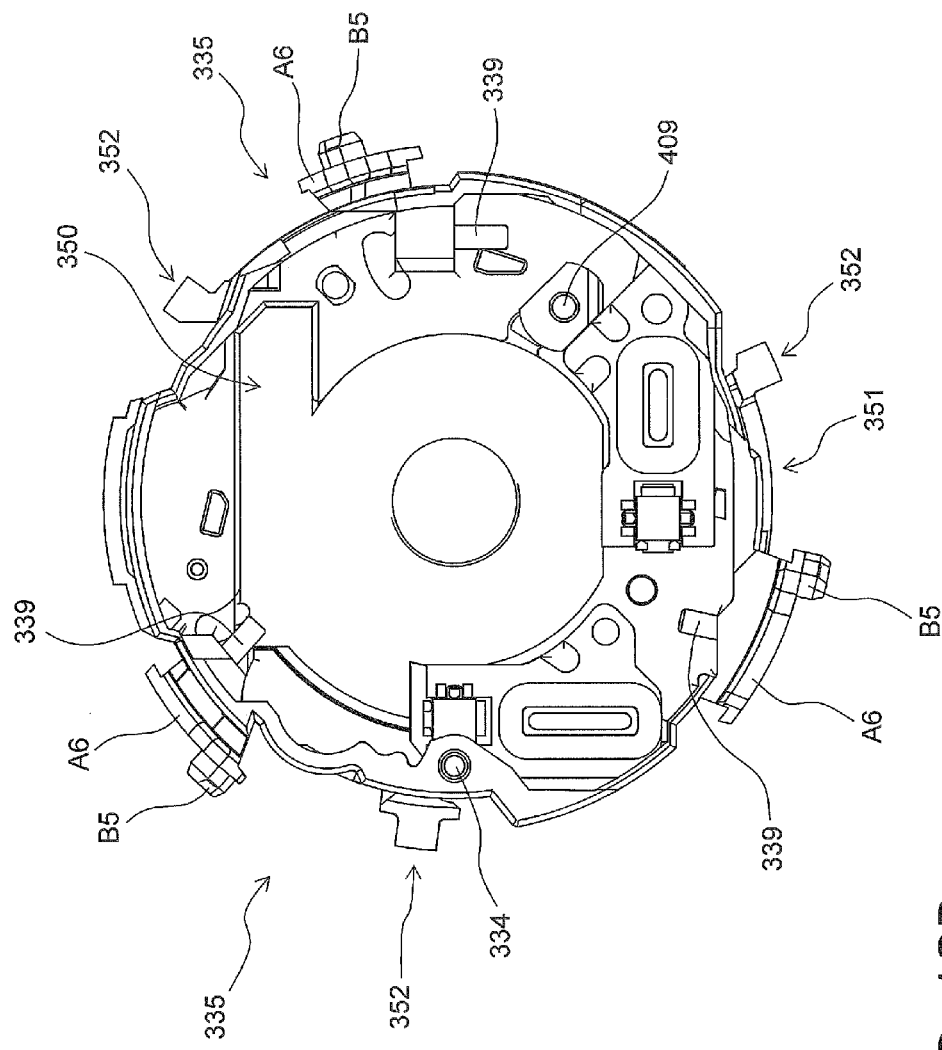
FIG. 13B is a diagram of the shutter frame as seen from the subject side.
Figure 14A:
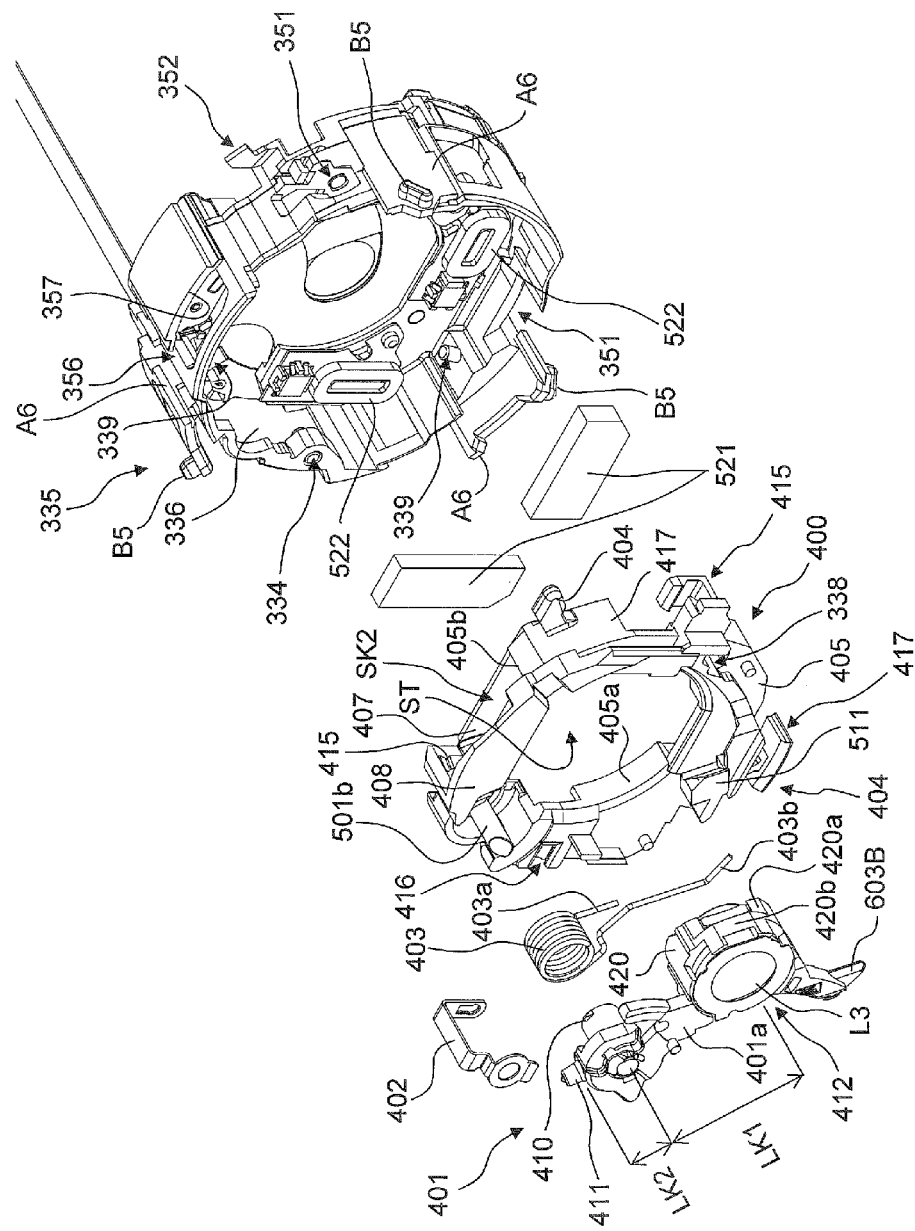
FIG. 14A is an oblique view of the shutter frame, an OIS frame, and the retracting lens frame.

As shown in FIGS. 13A and 14A, the OIS frame 400 is mounted to the shutter frame 335. The optical axis direction position of the OIS frame 400 with respect to the shutter frame 335 is maintained because three OIS shafts 339 that are press-fitted to the shutter frame 335 are inserted into optical axis direction maintenance portions 415 at three places on the OIS frame 400 (only two of the optical axis direction maintenance portions 415 are shown in FIG. 14A). As shown in FIG. 14A, the position of the OIS frame 400 in a direction perpendicular to the optical axis with respect to the shutter frame 335 is maintained because one OIS rotary shaft 334 press-fitted to the shutter frame 335 is inserted into a perpendicular direction maintenance portion 416 at one place on the OIS frame 400 in a direction perpendicular to the optical axis, and a perpendicular direction stopper pin 409 comes into contact with the peripheral wall of a movable range restrictor 338 of the OIS frame 400 (see FIG. 18B).

Figure 15A:
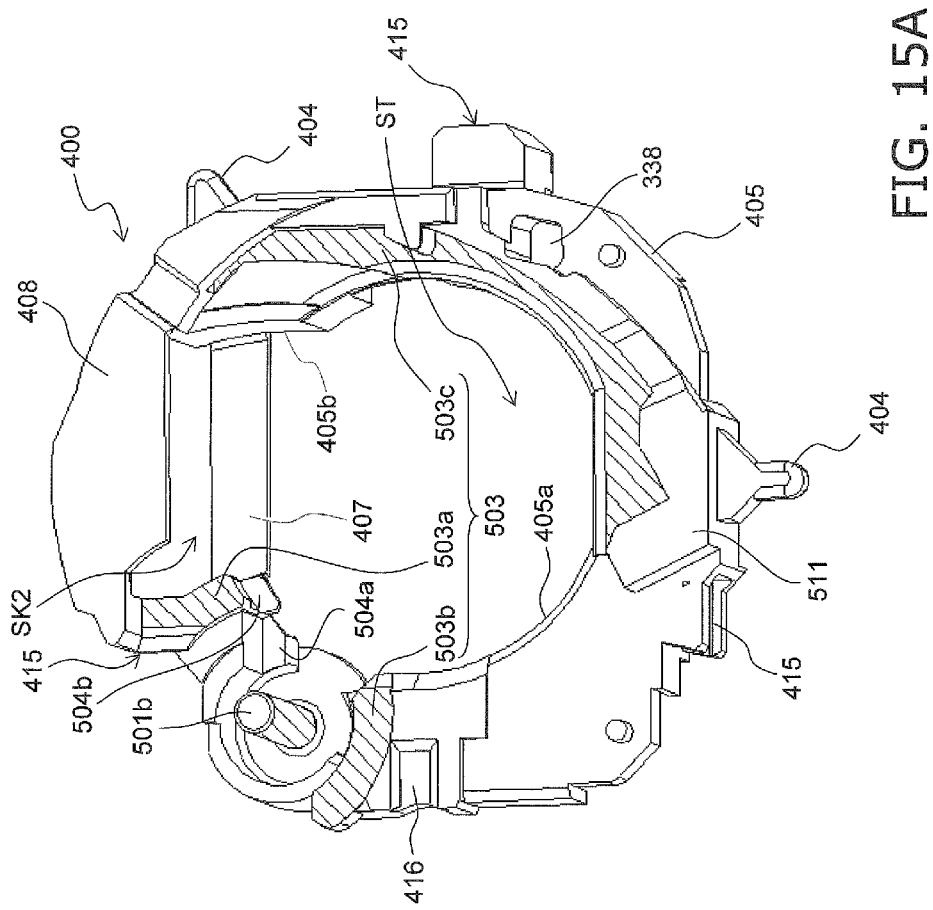
FIG. 15A is an oblique view of the OIS frame.

As shown in FIGS. 14A and 15A, a space ST is formed in the OIS frame 400 in order to house the third lens support 420 that supports the third lens group L3 supported by the retracting lens frame 401 in the imaging enabled state. When the retracting lens frame 401 has been retracted, the second lens support 321L of the second lens group frame 320 is housed in this space ST.

The OIS frame 400 also has a main body portion 405, a first linking portion 407, and the second linking portion 408. The main body portion 405 has a hole 405a (an example of a first region) and a retraction portion 405b (an example of a second region).

The hole 405a forms the above-mentioned space ST. The hole 405a is formed in the center of the main body portion 405. The third lens support 420 that supports the third lens group L3 in the imaging enabled state is disposed in the hole 405a. The hole 405a also houses the second lens support 321L of the second lens group frame 320 when retracted.

Part of the lower inner peripheral part of the hole 405a is formed in a straight line. Specifically, the hole 405a is formed in an oval shape or a D shape. The reason for this is that the upper and lower portions of the outer peripheral part of the second lens support 321L housed in the hole 405a when retracted are formed in a shape that is cut in the flat. Specifically, this is because part of the lower part of the second lens support 321L is formed in a straight line. In other words, the second lens support 321L is formed in an oval shape or a D shape when viewed in the optical axis direction. The hole 405a is formed so as to correspond to this shape of the second lens support 321L.

The reason why the upper and lower portions of the outer peripheral part of the second lens support 321L are formed in a shape that is cut in the flat, that is, in an oval shape or a D shape when viewed in the optical axis direction, is that the lens of the second lens group L2 is formed in the same shape. That is, the second lens support 321L is formed so as to correspond to the lens shape of the second lens group L2.

This ensures there is a region to dispose members under the OIS frame 400. The magnets 521, which are part of the image blur correction mechanism, are disposed in this region. Also, if the hole 405a is provided to the OIS frame 400, a decrease in the strength of the second lens group frame 320 can be reduced.

Since the imaging element 103 is formed in rectangular shape, the second lens group L2 is formed so that the upper and lower portions of the outer peripheral part of the lens have a shape that is cut in the flat, that is, an oval shape or a D shape when viewed in the optical axis direction. This is because the range of the light beams passing through the second lens group L2 is in the shape of a rectangular ring. Therefore, in the example disclosed here, the portion of the hole 405a of the OIS frame 400 formed in a straight line, that is, the straight part of the D shape, is provided below, but the same effect is obtained if it is provided above.

The retraction portion 405b is formed continuously with the hole 405a. The retraction portion 405b is formed on the outer peripheral part of the main body portion 405.

The first linking portion 407 serves to increase the strength of the main body portion 405. The first linking portion 407 is formed integrally with the main body portion 405. The first linking portion 407 is formed integrally with the main body portion 405 on one side of the retraction portion 405b in the optical axis direction.

More specifically, the first linking portion 407 spans the retraction portion 405b on the shutter frame 335 side of the main body portion 405, and is formed integrally with the main body portion 405. Also, the first linking portion 407 is disposed on the outside of the opening of the shutter frame 335 when viewed in the optical axis direction. Also, the first linking portion 407 is disposed on the outside of the second lens support 321L of the second lens group frame 320, that is, on the outside in the radial direction, when viewed in the optical axis direction. Therefore, since the first linking portion 407 and the second lens support 321L do not overlap in the optical axis direction when retracted, the second lens group frame 320 can be moved closer to the shutter frame 335 when retracted, and this results in a smaller lens barrel 20.

Figure 14B:
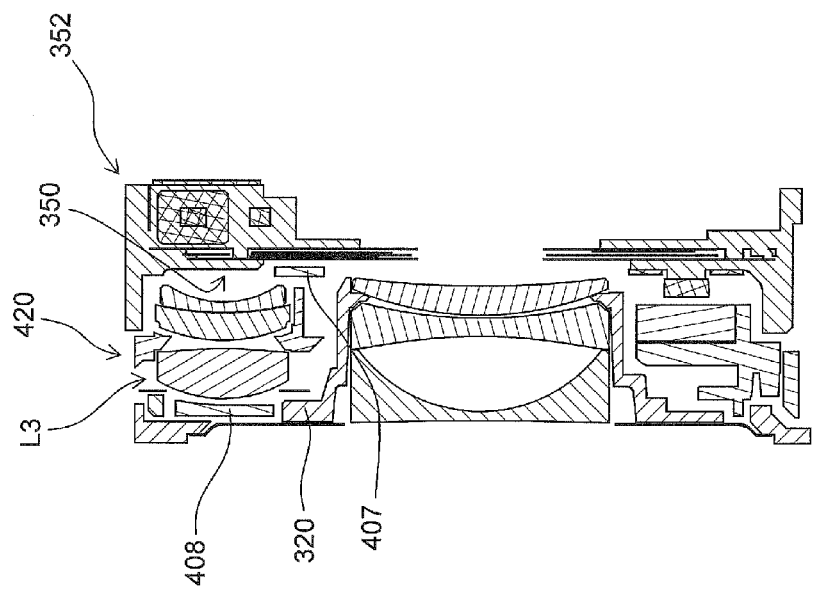
FIG. 14B is a cross section of the shutter frame, the OIS frame, the retracting lens frame, and the second lens group frame.

As shown in FIGS. 14B and 15A, the first linking portion 407 is formed on the main body portion 405 so that the maximum width of the first linking portion 407 in a direction perpendicular to the optical axis becomes less than the maximum width of the second linking portion 408 in a direction perpendicular to the optical axis.

As shown in FIG. 14B, the first linking portion 407 is formed on the main body portion 405 so that the maximum thickness of the first linking portion 407 in the optical axis direction is less than the maximum thickness of the second linking portion 408 in the optical axis direction.

Also, as shown in FIGS. 13B and 14B, the portion of the shutter frame 335 that is opposite the first linking portion 407 at the face of a shutter frame main body 336 on the front side in the optical axis direction is locally made thinner, and the first linking portion 407 goes into this thinner part 350. Specifically, at least part of the shutter frame 335 and at least part of the first linking portion 407 overlap in the optical axis direction. This allows the lens barrel 20 to be even smaller in the optical axis direction.

Also, the thinner part 350 is formed in the shutter frame main body 336 of the shutter frame 335 so that the clearance between the first linking portion 407 and the thinner part 350 in a direction perpendicular to the optical axis becomes greater than the clearance between the second linking portion 408 and the second housing portion 323a in a direction perpendicular to the optical axis.

In the imaging enabled state, the OIS frame 400 moves in a direction perpendicular to the optical axis with respect to the shutter frame 335 for image blur correction. The OIS frame 400 moves closer to the shutter frame 335 in the optical axis direction in the imaging enabled state, and the first linking portion 407 goes into the thinner part 350. However, in the imaging enabled state, the OIS frame 400 does not move closer to the front face of the second lens group frame main body 321, and the second linking portion 408 is not housed in the second housing portion 323a. A state in which the second linking portion 408 is housed in the second housing portion 323a occurs only in the retracted state. Therefore, the clearance between the first linking portion 407 and the thinner part 350 in a direction perpendicular to the optical axis must be set to at least the amount of movement of the OIS frame 400 in a direction perpendicular to the optical axis in order to prevent interference during image blur correction. On the other hand, the clearance between the second linking portion 408 and the second housing portion 323a in a direction perpendicular to the optical axis does not need to take into account the above-mentioned amount of movement. It is for this reason that the clearance is formed as discussed above.

The protrusions 404 (see FIG. 15A) used to position the OIS frame 400 substantially at an optical axis position protrude in the radial direction from the side faces of the OIS frame 400. These protrusions 404 are inserted into the side walls of the shutter frame main body 336, and therefore the side wall holes 351 are provided in the shutter frame main body 336 side walls. The OIS frame 400 comprises side walls 417 that substantially cover the side wall holes 351 in the shutter frame main body 336. This prevents light from leaking through the side wall holes 351 in the shutter frame main body 336.

As shown in FIG. 13B, three light blocking walls 352 that protrude in the radial direction are formed on the side faces of the shutter frame main body 336. The peripheral direction positions of the light blocking walls 352 correspond to the peripheral direction positions of the three rectilinear grooves a5 of the third rectilinear frame 130. The peripheral direction width of the three light blocking walls 352 is substantially the same as or less than the peripheral direction width of the three rectilinear grooves a5 of the third rectilinear frame 130. This prevents light from leaking out through the three rectilinear grooves a5 of the third rectilinear frame 130.

As shown in FIG. 15A, the OIS frame 400 has the shunting protrusions 404 that engage with the shunting grooves a9 of the third rectilinear frame 130. The shunting protrusions 404 are formed integrally with the main body portion 405 of the OIS frame 400. More specifically, the two shunting protrusions 404 are formed on the main body portion 405 so as to protrude outward from the outer peripheral part of the main body portion 405. Also, the two shunting protrusions 404 are formed integrally with the main body portion 405, spaced apart by a specific distance, around the outer peripheral part of the main body portion 405. The two shunting protrusions 404 are respectively fitted into and guided by the two shunting grooves a9 of the third rectilinear frame 130.

More specifically, when the OIS frame 400 moves closer to the third rectilinear frame 130 in a state in which the OIS frame 400 has been mounted to the shutter frame 335, the shunting protrusions 404 formed on the OIS frame 400 are introduced from the flange 132 side of the third rectilinear frame 130 into the first grooves a91 of the third rectilinear frame 130. In a state in which the shunting protrusions 404 are disposed in the first grooves a91, the OIS frame 400 is movable within a plane perpendicular to the third rectilinear frame 130 or the shutter frame 335.

Then, when the OIS frame 400 moves further in the optical axis direction on the inner peripheral side of the third rectilinear frame 130 in a state in which the OIS frame 400 has been mounted to the shutter frame 335, the shunting protrusions 404 are introduced into the third grooves a93. As a result, the OIS frame 400 gradually transitions from a state of being movable within a plane perpendicular to the optical axis with respect to the third rectilinear frame 130 or the shutter frame 335, to a state of being restricted in the radial direction and the peripheral direction.

When the shunting protrusions 404 are then introduced into the second grooves a92, the second grooves a92 press the shunting protrusions 404 in the direction of the optical axis center from the inner peripheral face 130S of the third rectilinear frame 130. Consequently, movement of the OIS frame 400 is restricted in a plane perpendicular to the optical axis with respect to the third rectilinear frame 130 or the shutter frame 335. This positions the OIS frame 400. The positioning of the OIS frame 400 in this embodiment is carried out before the retracting lens frame 401 begins to retract, but what is important is that the positioning be completed by the time the retraction operation is complete.

In a state in which the OIS frame 400 has been mounted to the shutter frame 335, the first linking portion 407 is disposed above the magnets 521 and a coil 522 (actuator) that are discussed below.

The second linking portion 408 is provided to increase the strength of the main body portion 405 and to block light to the imaging element side. That is, the second linking portion 408 is also used as a light blocking portion. The second linking portion 408 is formed integrally with the main body portion 405. As compared to the case that the first linking portion 407 and the second linking portion 408 are both provided and the case that just the first linking portion 407 or the second linking portion 408 is provided, the strength of the main body portion 405, which is decreased by providing the retraction portion 405b, can be increased. There also is less deterioration in accuracy during injection molding.

The second linking portion 408 is formed integrally with the main body portion 405 on the other side of the retraction portion 405b in the optical axis direction, that is, the opposite side from that of the first linking portion 407 in the optical axis direction.

More specifically, the second linking portion 408 is formed integrally with the main body portion 405 and spans the retraction portion 405b on the subject side of the main body portion 405. Also, the second linking portion 408 is disposed on the outside of the second lens group L2 when viewed in the optical axis direction.

As discussed above, the first linking portion 407 is disposed on the outside of the opening of the shutter frame 335 when viewed in the optical axis direction. Also, the radius of the second lens group L2 is greater than the radius of the opening in the shutter frame 335 in a direction perpendicular to the optical axis. Because of this, the inner peripheral part of the first linking portion 407 can be disposed more on the inside in the radial direction than the inner peripheral part of the second linking portion 408.

In the example disclosed here, when viewed in the optical axis direction, the inner peripheral part of the second linking portion 408 and the inner peripheral part of the first linking portion 407 are disposed more to the outside in the radial direction than the outside diameter of the second lens support 321L.

Also, the inner peripheral part of the second linking portion 408 is disposed more to the outside in the radial direction than the inner peripheral part of the first linking portion 407. This is because the outside diameter of the second lens support 321L, that is, the front side in the optical axis direction (the side opposite the second linking portion 408) is greater than the rear side in the optical axis direction (the side opposite the first linking portion 407). Thus, the inner peripheral part of the second linking portion 408 and the inner peripheral part of the first linking portion 407 are disposed so as to correspond to the outside diameter of the second lens support 321L.

In the end, the shape of the first linking portion 407 and the shape of the inner peripheral part of the second linking portion 408 should correspond to the external shape with the largest outside diameter out of all the frames disposed in the hole 405a (the second lens support 321L and the third lens support 420), either in the imaging enabled state or the retracted state. Specifically, the shape of the first linking portion 407 and the shape of the inner peripheral part of the second linking portion 408 should correspond to a shape that conforms to the external shape the member at the farthest distance from the optical axis. This allows the lens barrel 20 to be made smaller while ensuring good strength of the OIS frame 400 and maintaining good moldability.

Also, at least part of the portion where the second linking portion 408 is opposite the third lens group L3 is formed so as to correspond to a curved face that encompasses the region through which the third lens group L3 passes during the transition from imaging to retraction (including during imaging and during retraction), and follow this curved face (see FIG. 14B). In other words, the region of the second linking portion 408 that is not opposite the curved face of the third lens group L3 during the transition is formed thicker. On the other hand, the region of the second linking portion 408 that is opposite the curved face of the third lens group L3 during the transition is formed thinner.

This allows the lens barrel 20 to be made smaller while ensuring good strength of the OIS frame 400 and maintaining good moldability. Of course, the shape may be further thinned so that there is no undercut during sliding of the mold, and so as to encompass the curved face of the third lens group L3, according to the sliding direction of the mold during injection molding. The same effect is obtained in this case as well.

The second linking portion 408 is provided at a position a specific distance away from the main body portion 405. The second linking portion 408 is also provided at a position a specific distance away from the first linking portion 407.

When the retracting lens frame 401 is in its retracted state (housed state), the third lens support 420 that supports the third lens group L3 is disposed on the retraction portion 405b between the first linking portion 407 and the second linking portion 408.

The OIS frame 400 is movable in a plane perpendicular to the optical axis. More specifically, the magnets 521 are fixed to the OIS frame 400, and the coil 522 is fixed to the shutter frame 335 at a position opposite the magnets 521. In this state, when power is supplied from a camera circuit (not shown) to the coil 522 of the shutter frame 335, current flows to the coil 522 and a magnetic field is generated. This magnetic field drives the magnets 521 of the OIS frame 400, and this drive force causes the OIS frame 400 to move within a plane perpendicular to the optical axis.

As shown in FIG. 15A, the OIS frame 400 further has three rail portions 503. The three rail portions 503 (503a to 503c) are formed on the main body portion 405. The rail portions 503 are formed on one face of the substantially disk-shaped main body portion 405. The rail portions 503 are formed on the main body portion 405 at positions opposite a contact face 603 formed on the retracting lens frame 401 (the first contact face 603A discussed below).

The rail portions 503 are formed on the portion of the main body portion 405 excluding the range where the third lens group L3 supported by the retracting lens frame 401 moves. Furthermore, the rail portions 503 are formed in a shape corresponding to the path over which the contact face 603 (first contact face 603A; discussed below) moves when the lens barrel 20 transitions from the imaging enabled state to the retracted state.

Figure 15B:
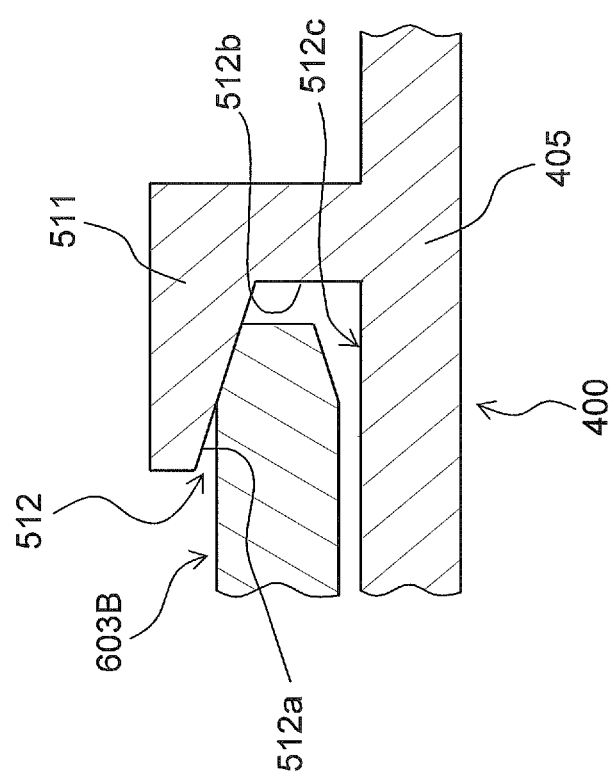
FIG. 15B is a detail cross section of the state when the retracting lens frame has been engaged with an anti-rotation portion of the OIS frame.

As shown in FIGS. 15A and 15B, the OIS frame 400 further has an anti-rotation portion 511. The anti-rotation portion 511 is used to position the retracting lens frame 401 in the imaging enabled state. The anti-rotation portion 511 is formed integrally with the outer peripheral part of the main body portion 405.

As shown in FIG. 15B, a recess 512 is formed in the anti-rotation portion 511. A second contact face 603B of the retracting lens frame 401 (discussed below) comes into contact with one of two side walls 512a of the recess 512.

More specifically, the side walls 512a are formed at positions a specific distance away from the surface of the main body portion 405. These side walls 512a are sloped so that they move closer to the opposite side wall (the surface of the main body portion 405) as they move toward the bottom of the recess 512. This sloping pushes the second contact face 603B of the retracting lens frame 401 toward the OIS frame 400, and presses the second contact face 603B of the retracting lens frame 401 against the contact face 512c of the OIS frame 400.

As shown in FIG. 14A, the retracting lens frame 401 is supported by the OIS frame 400 so as to be movable around the retraction shaft 501b, which is substantially parallel to the optical axis. The retracting lens frame 401 supports the third lens group L3 used to image blur correction with the third lens support 420. The third lens group L3 is made up of one or more lenses.

The term "retraction shaft" as used below will sometimes be used in the sense of "the axis of the retraction shaft."

As shown in FIG. 14A, the retracting lens frame 401 has a main body portion 401a, a bearing 410, the driven portion 411, the positioning portion 412 (see FIGS. 17A and 19), the third lens support 420, and an engagement portion 413. The bearing 410 is formed integrally with the main body portion 401a.

Figure 16A:
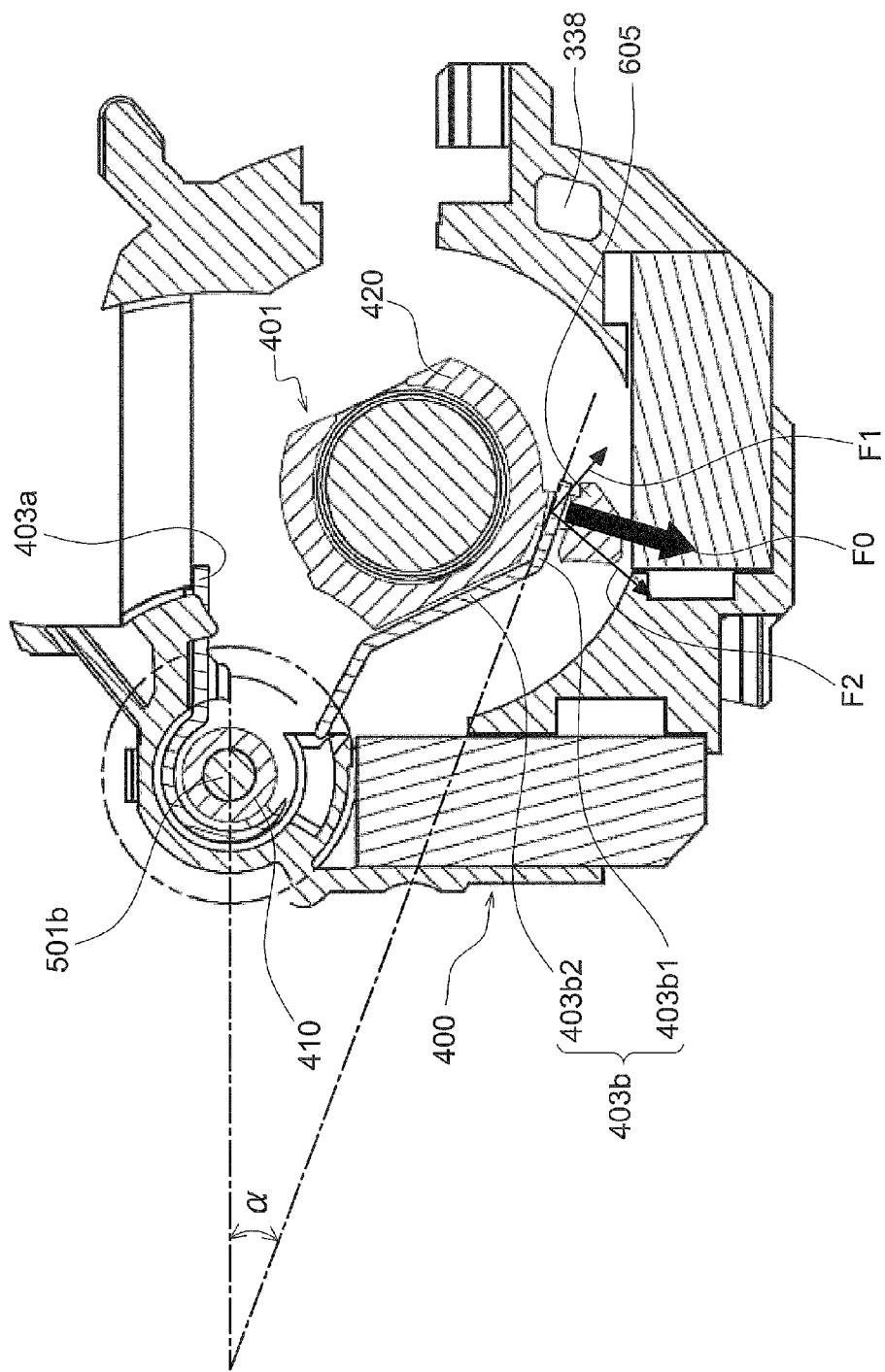
FIG. 16A is a cross section of the state when a rotary spring biases the retracting lens frame to the OIS frame.
Figure 16B:
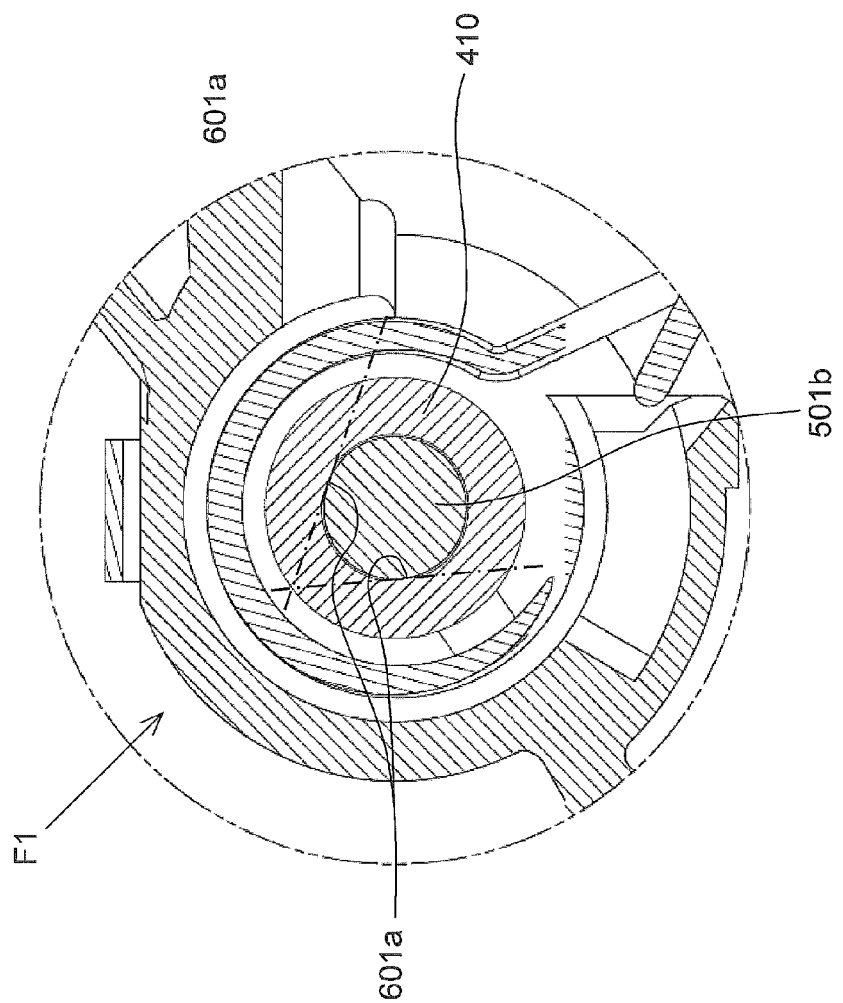
FIG. 16B is a detail cross section of the contact state between a retraction shaft and a contact face.

As shown in FIGS. 14A and 15A, the bearing 410 is rotatably mounted to the support shaft 501b (retraction shaft) provided to the OIS frame 400. As shown in FIGS. 16A and 16B, a hole into which the retraction shaft 501b is inserted is formed in the bearing 410. At least two contact faces 601a that come into contact with the retraction shaft 501b are formed in the hole of the bearing 410. In other words, the two contact faces 601a are formed in the inner peripheral face of the bearing 410.

The two contact faces 601a are formed on the inner peripheral face of the bearing 410 on the proximal end side of the retraction shaft 501b, that is, on the opening side of the bearing 410 (hole). The two contact faces 601a are formed on the inner peripheral face of the bearing 410 so as to be in a mutually non-parallel relation. More specifically, when the bearing 410 (hole) is viewed in the depth direction, the two contact faces 601a are formed on the inner peripheral face of the bearing 410 so as to form an angle.

As shown in FIG. 16B, the two contact faces 601a (hereinafter referred to as V-faces) come into contact with the outer peripheral face of the retraction shaft 501b. More specifically, the retracting lens frame 401 is biased by the biasing force F0 of the rotary spring 403 (see FIG. 16A), and the component force F1 of this biasing force F0 causes the V-faces 601a of the bearing 410 to come into contact with the outer peripheral face of the retraction shaft 501b.

As discussed below, in this embodiment, the other end 403b of the rotary spring 403 is bent. When the other end 403b of the rotary spring 403 is thus formed, the component force F1, that is, the force at which the contact faces 601a of the bearing 410 are brought into contact with the outer peripheral face of the retraction shaft 501b, can be increased over when the other end 403b of the rotary spring 403 is formed in a straight line.

This allows the retraction shaft 501b to be reliably positioned with respect to the bearing 410 of the retracting lens frame 401. More precisely, accuracy with respect to eccentricity of the retraction shaft 501b can be increased. The component forces of the biasing force F0 in FIG. 16A are F1 and F2.

Figure 19:
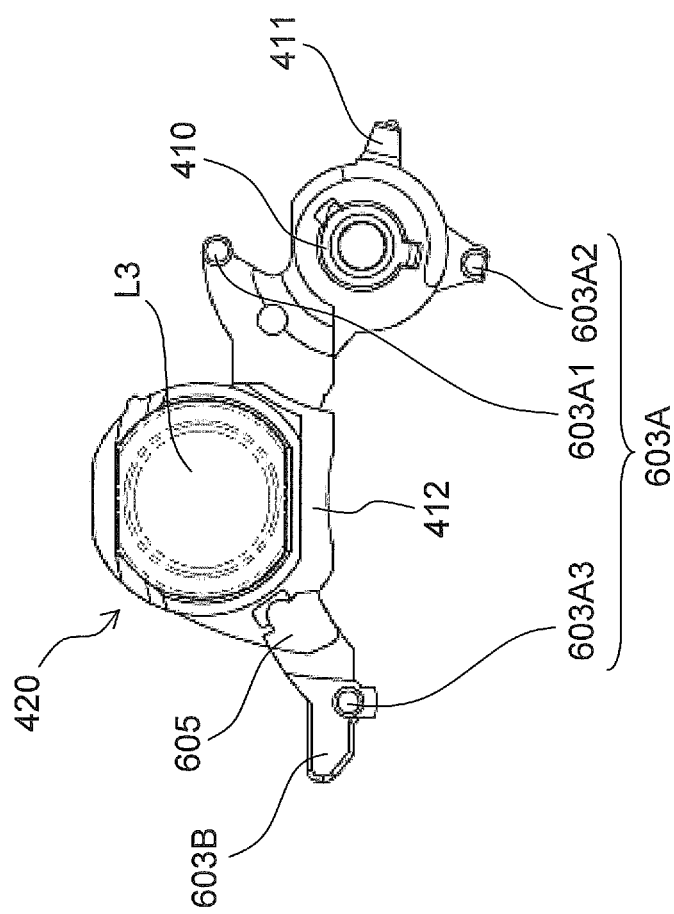
FIG. 19 is a diagram of the retracting lens frame as seen from an imaging element side.

The driven portion 411 is a portion that is driven against the biasing force of the rotary spring 403 (discussed below)

during the transition period between the imaging enabled state and the housed state. As shown in FIGS. 14A and 19, the driven portion 411 is formed integrally and protrudes outward from the main body portion 401a. The driven portion 411 engages with the guide groove a7 formed in the inner peripheral face of the third rectilinear frame 130. More precisely, the driven portion 411 engages with the guide groove a7 of the third rectilinear frame 130 via an opening SK1 (discussed below) in the shutter frame 335. The driven portion 411 moves relatively in the optical axis direction with respect to the retracting lens frame 401, and is thereby guided in the guide groove a7 of the third rectilinear frame 130. This changes the orientation of the retracting lens frame 401 between the imaging enabled state and the retracted state.

The positioning portion 412 is formed on a portion (the third lens support 420) of the retracting lens frame 401 that supports the third lens group L3. The positioning portion 412 is positioned by the housing receptacle 322 of the second lens group frame 320 during the transition period between the imaging enabled state and the housed state.

The positioning portion 412 is formed so that the distance between the positioning portion 412 and the retraction shaft 501b becomes greater than the distance between the driven portion 411 and the retraction shaft 501b. More precisely, as shown in FIG. 14A, the positioning portion 412 is formed so that the distance LK1 between the axis of the retraction shaft 501b and the position where the positioning portion 412 comes into contact with the housing receptacle 322 becomes greater than the distance LK2 between the axis of the retraction shaft 501b and the proximal end of the driven portion 411.

Figure 17A:
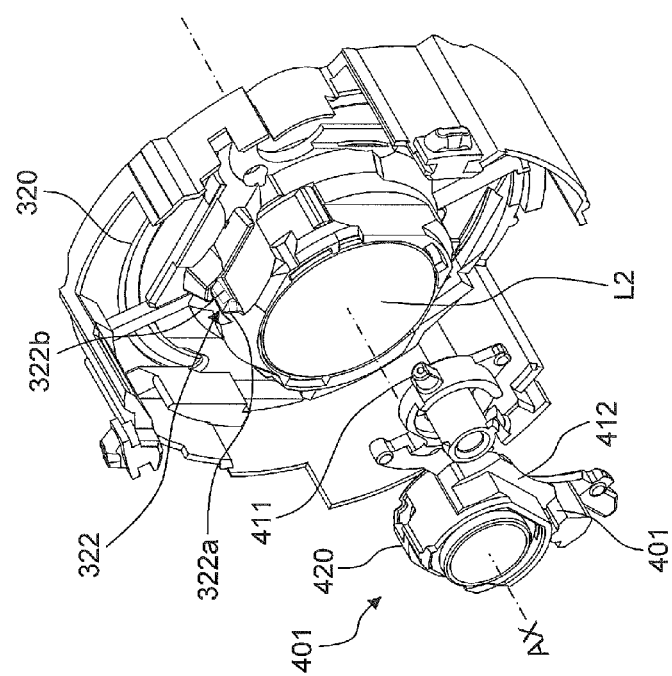
FIG. 17A is an oblique view of the relation between the second lens group frame and the retracting lens frame (imaging enabled state)
Figure 17B:
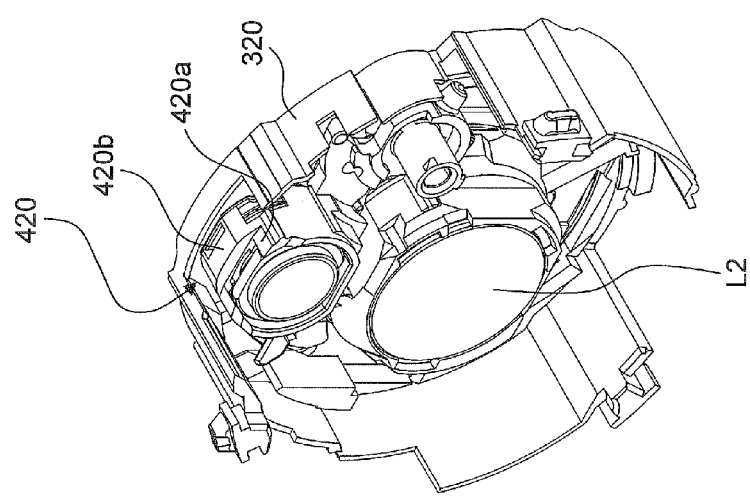
FIG. 17B is an oblique view of the relation between the second lens group frame and the retracting lens frame (retracted state)

As shown in FIGS. 14A, 17A, and 17B, the third lens support 420 is a portion that supports the third lens group L3. The third lens support 420 is in the form of a cylinder. The third lens group L3 is mounted on the inside of the third lens support 420.

As shown in FIG. 17B, the third lens support 420 has a cut-out 420a, which is a portion with no wall on the outside of the third lens group L3. The cut-out 420a is provided to the outer peripheral part of the third lens support 420. More specifically, the cut-out 420a is a portion that is partially cut away from the outer peripheral part of the third lens support 420. More precisely, in the cut-out 420a, the side of the outer peripheral part of the third lens support 420 that is away from the optical axis in the imaging enabled state, when the retracting lens frame 401 is in the retracted state, is cut away. The cut-out 420a is disposed opposite a light blocking portion 357 (see FIG. 14A) of the shutter frame 335 (discussed below) during the transition period between the imaging enabled state and the housed state.

Figure 18A:
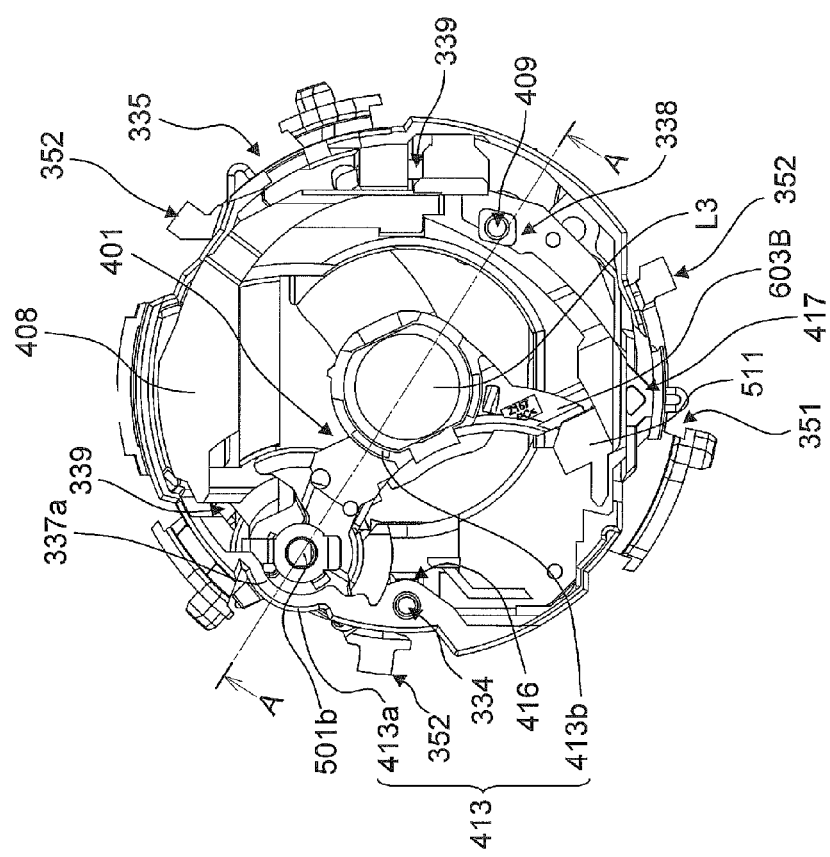
FIG. 18A is a diagram of the relation between the shutter frame and the retracting lens frame (imaging enabled state)
Figure 18B:
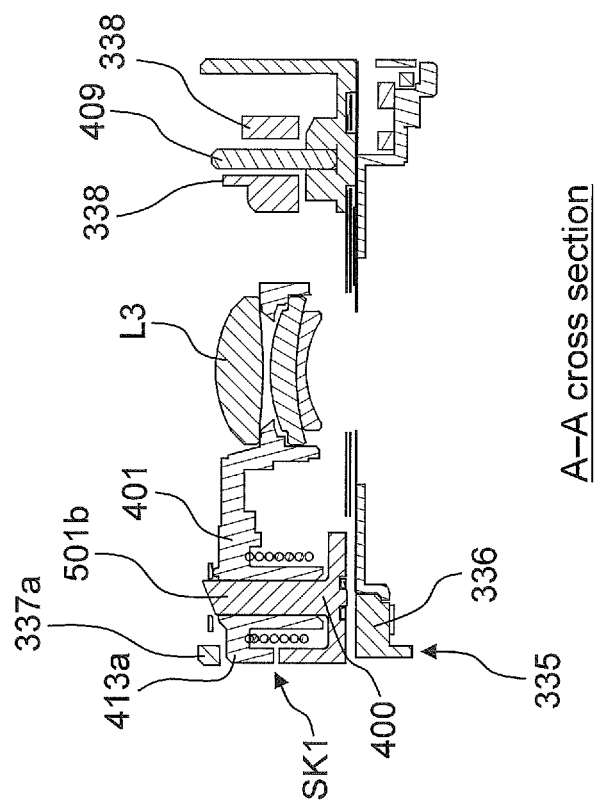
FIG. 18B is a cross section of the relation between the shutter frame and the retracting lens frame (imaging enabled state)
Figure 18C:
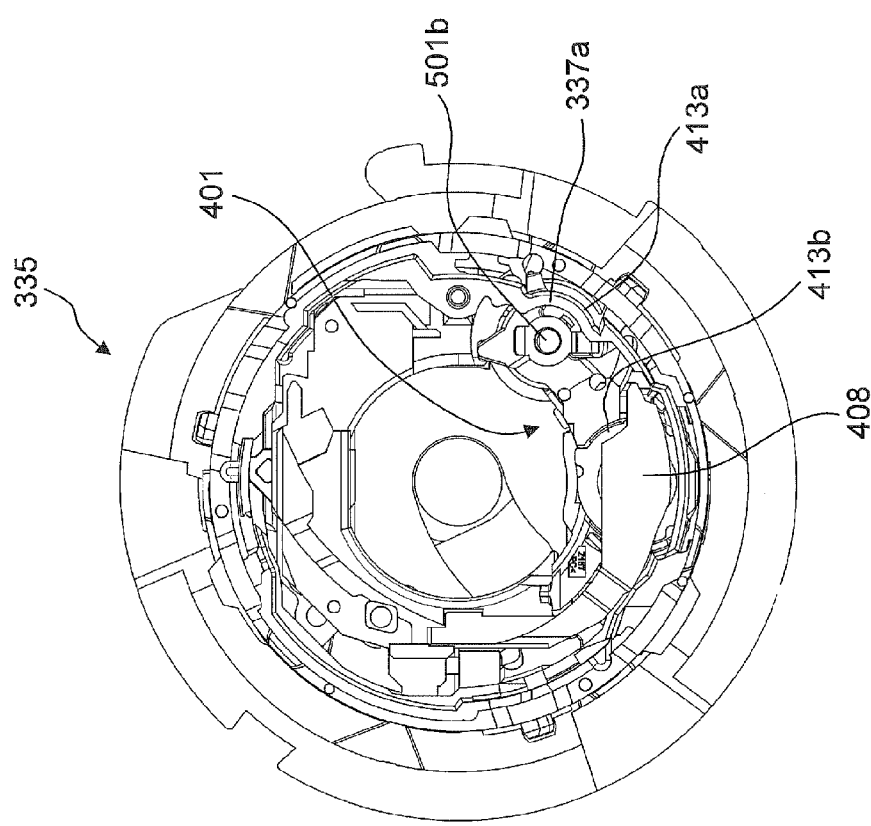
FIG. 18C is a diagram of the relation between the shutter frame and the retracting lens frame (retracted state)

As shown in FIGS. 14A and 18C, the third lens support 420 is disposed between the second linking portion 408 and the face on the front side in the optical axis direction of the shutter frame main body 336 of the shutter frame 335 during the transition period between the imaging enabled state and the housed state. Also, the third lens support 420 is disposed between the second linking portion 408 and the first linking portion 407 when it has entered the thinner part 350 of the face on the front side in the optical axis direction of the shutter frame main body 336. At least part of the shutter frame 335 overlaps at least part of the first linking portion 407 in the optical axis direction. This allows the lens barrel 20 to be smaller in the optical axis direction in its housed state.

As shown in FIGS. 18A to 18C, a first engagement portion 413a is a portion capable of engaging with a first restrictor 337a of the shutter frame 335 (discussed below). Also, a second engagement portion 413b is a portion capable of engaging with the second linking portion 408 of the OIS frame 400 (discussed below). The engagement portions here constitute the first engagement portion 413a that engages with the first restrictor 337a (discussed below), and the second engagement portion 413b that engages with the second linking portion 408, which acts as a restrictor during the transition period between the imaging enabled state and the housed state.

As shown in FIGS. 18A and 18B, the first engagement portion 413a is formed near the retraction shaft 501b. As shown in FIG. 18B, the first engagement portion 413a is disposed between the first restrictor 337a and the OIS frame 400. The second engagement portion 413b is formed on the third lens support 420 that supports the third lens group L3. The second engagement portion 413b is disposed opposite the second linking portion 408 formed on the OIS frame 400, during the transition period between the imaging enabled state and the housed state.

As shown in FIG. 19, the retracting lens frame 401 further has the plurality of contact portions 603 (603A and 603B). The contact portions 603 are formed integrally with the main body portion 401a of the retracting lens frame 401. The contact portions 603 are made up of three first contact portions 603A (603A1, 603A2, and 603A3) and a second contact portion 603B.

The three first contact portions 603A and the second contact portion 603B are formed integrally with the main body portion 401a at a different position from the bearing 410. In other words, the three first contact portions 603A and the second contact portion 603B are formed on the main body portion 401a at a different position from the retraction shaft 501b supported by the bearing 410. Also, the three first contact portions 603A and the second contact portion 603B are formed on the main body portion 401a at a different position from the retraction shaft 501b so as to be capable of contact with the OIS frame 400.

More precisely, the two contact portions 603A1 and 603A2 out of the three first contact portions 603A are formed on the main body portion 401a near the retraction shaft 501b. The two contact portions 603A1 and 603A2 are formed on the main body portion 401a so that the retraction shaft 501b is located between the two contact portions 603A1 and 603A2. The other first contact portion 603A3 besides these two contact portions 603A1 and 603A2, and the second contact portion 603B are formed on the main body portion 401a at a position that is away from the retraction shaft 501b.

The three first contact portions 603A (603A1, 603A2, and 603A3) shown in FIG. 19 are able to come into contact with the OIS frame 400. Specifically, when the three first contact portions 603A come into contact with the OIS frame 400, movement of the retracting lens frame 401 in the optical axis direction is restricted.

More precisely, when the three first contact portions 603A come into contact with the rail portions 503 of the OIS frame 400 (see FIG. 15A), movement of the retracting lens frame 401 in the optical axis direction is restricted. More specifically, when the lens barrel 20 is in its imaging enabled state, the three first contact portions 603A1, 603A2, and 603A3 come into contact with the rail portions 503a, 503b, and 503c of the OIS frame 400. The first contact portion 603A1 comes into contact with the rail portion 503a, the first contact portion 603A2 comes into contact with the rail portion 503b, and the first contact portion 603A3 comes into contact with the rail portion 503c.

When the three first contact portions 603A thus hit the rail portions 503 of the OIS frame 400, this restricts movement of the retracting lens frame 401 in the optical axis direction.

The second contact portion 603B shown in FIG. 19 is used to position the retracting lens frame 401 on the OIS frame 400 in the imaging enabled state. The second contact portion 603B comes into contact with the anti-rotation portion 511 of the OIS frame 400 in the imaging enabled state. The outer peripheral part of the second contact portion 603B is formed so as to mate with the anti-rotation portion 511 of the OIS frame 400. For example, the outer peripheral part of the second contact portion 603B is formed in a tapered shape (see FIG. 15B). When the second contact portion 603B is fitted into the recess 512 of the anti-rotation portion 511 of the OIS frame 400, the retracting lens frame 401 can be reliably positioned in the imaging enabled state.

As shown in FIG. 14A, the thrust spring 402 is a spring that biases the retracting lens frame 401 in the optical axis direction with respect to the OIS frame 400. The thrust spring 402 is formed in an approximate C shape. One end of the thrust spring 402 is mounted to the OIS frame 400, and the other end of the thrust spring 402 is mounted to the retracting lens frame 401. Consequently, the retracting lens frame 401 and the OIS frame 400 are clamped by the thrust spring 402 in the optical axis direction.

As shown in FIG. 14A, the rotary spring 403 is a spring that biases the retracting lens frame 401 around a retraction shaft 510, that is, in a direction perpendicular to the optical axis. The rotary spring 403 is supported by the OIS frame 400. The rotary spring 403 is a torsion coil spring, for example. The coil portion of the rotary spring 403 is disposed on the outer periphery of the bearing 410.

One end 403a of the rotary spring 403 is clamped by latching portions 504a and 504b (see FIG. 15A) formed on the OIS frame 400. As shown in FIG. 16A, the other end 403b of the rotary spring 403 is mounted in a groove 605 formed in the retracting lens frame 401. The other end 403b of the rotary spring 403 is bent in two stages.

As shown in FIG. 16A, the other end 403b of the rotary spring 403 has a first bent part 403b1 formed on the distal end side, and a second bent part 403b2 formed in the middle. The first bent part 403b1 and the second bent part 403b2 are bent so as to follow the outer shape of the third lens support 420 of the retracting lens frame 401. In this case, the first bent part 403b1 is mounted in the groove 605 formed in the retracting lens frame 401.

As shown in FIG. 16A, the first bent part 403b1 and the second bent part 403b2 are bent so that a specific angle α is formed by a specific straight line (horizontal line) passing through the axis of the retraction shaft 501b, and the first bent part 403b1 of the other end 403b of the rotary spring 403.

Thus forming the other end 403b of the rotary spring 403 increases the force (component force F1) at which the contact faces 601a of the bearing 410 come into contact with the outer peripheral face of the retraction shaft 501b, as discussed above. This allows the retraction shaft 501b to be reliably positioned with respect to the bearing 410 of the retracting lens frame 401.

Because the rotary spring 403 biases the retracting lens frame 401 as discussed above, the second contact portion 603B of the retracting lens frame 401 comes into contact with the anti-rotation portion 511 of the OIS frame 400 (see FIGS. 13A and 15B). The OIS frame 400 is positioned when the bearing 410 is mounted to the retraction shaft 501b of the OIS frame 400, and the second contact portion 603B comes into contact with the anti-rotation portion 511 of the OIS frame 400.

As shown in FIGS. 17A and 17B, the position of the retracting lens frame 401 can be changed from a correction enabled position in which the third lens group L3 executes image blur correction (first orientation), to a retracted position in which the third lens group L3 has been retracted from the optical axis (second orientation). The retracting lens frame 401 supports the third lens group L3, which is made up of at least one lens.

As shown in FIG. 17A, when the retracting lens frame 401 is in the correction enabled position, the center of the second lens group L2 and the center of the third lens group L3 are located on the optical axis AX.

When the retracting lens frame 401 begins to retract, the retracting lens frame 401 and the second lens support 321L of the second lens frame 320 move closer together while the retracting lens frame 401 rotates. This causes the positioning portion 412 of the retracting lens frame 401 to come into contact with the guide portion 322a of the second lens frame 320. The positioning portion 412 then moves over the guide portion 322a and reaches the support portion 322b, and is supported by the support portion 322b. Thus, the retracting lens frame 401 is supported by the second lens frame 320.

FIG. 17B shows this state. That is, as shown in FIG. 17B, when the retracting lens frame 401 moves to the retracted position, the retracting lens frame 401 comes into contact with the support portion 322b of the second lens group frame 320, and is housed in the space of the second lens group frame 320, that is, in the space between the second lens support 321L and the outer peripheral face 320T (see FIG. 12A). More specifically, the retracting lens frame 401 is supported and housed in a state of being in contact with the support portion 322b of the second lens frame 320 within the space on the outside in the radial direction of the second lens group L2.

10. Configuration of Shutter Frame 335

The configuration of the shutter frame 335 will now be described through reference to FIGS. 13A, 14A, and 18A to 18C. As shown in FIG. 13A, the shutter frame 335 has the shutter frame main body 336, three rectilinear protrusions A6, and the three cam followers B5. Also, as shown in FIG. 14A, the shutter frame 335 has an opening 356, the light blocking portion 357, and the first restrictor 337a.

The shutter frame main body 336 is formed in a cylindrical shape, and has an outer peripheral face 335T.

The three rectilinear protrusions A6 are formed on the outer peripheral face 335T, and are disposed at a substantially constant pitch in the peripheral direction. The three rectilinear protrusions A6 are engaged with the three rectilinear grooves a6 of the third rectilinear frame 130.

The three cam followers B5 are provided to the front end of the three rectilinear protrusions A6. The three cam followers B5 are engaged with the three cam grooves b5 of the second rotary frame 220.

The opening 356 is a portion that houses a part 420b of the third lens support 420 during the transition period between the imaging enabled state and the housed state. As shown in FIG. 14A, the part 420b of the third lens support 420 is the portion adjacent to the cut-out 420a during the transition period between the imaging enabled state and the housed state. More precisely, the light blocking portion 357 is provided to the opening 356 in order to block light rays.

As shown in FIGS. 18A to 18C, the restrictor is a portion that can restrict movement of the retracting lens frame 401 in the optical axis direction. The restrictor has a first restrictor 337a formed near the retraction shaft 501b, and a second linking portion 408 that acts as a second restrictor and is formed at a position that is away from the retraction shaft 501b.

The first restrictor 337a is formed integrally with the shutter frame main body 336 on the front side (the subject side) of the first engagement portion 413a. More specifically, the first restrictor 337a spans the space SK1 (see FIG. 18B) that houses the members near the retraction shaft 501b, on the front side (the subject side) of the first engagement portion 413a. The first restrictor 337a restricts movement of the retracting lens frame 401 in the optical axis direction near the retraction shaft 501b, in the imaging enabled state and the retracted state.

The second linking portion 408 is formed integrally with the OIS frame 400. More specifically, when the retracting lens frame 401 is in the retracted state, the second linking portion 408 spans the space SK2 on the front side (the subject side) of the space SK2 (see FIG. 14A) that houses the third lens group L3. The second linking portion 408 restricts movement of the retracting lens frame 401 in the optical axis direction near the third lens group L3 in the retracted state.

During normal operation, that is, when no strong force is acting on the retracting lens frame 401, such as during an imaging operation, or when the power is switched on or off, the retracting lens frame 401 is clamped to the OIS frame 400 by the thrust spring 402, and its position is restricted in the optical axis direction. Therefore, the first restrictor 337a and the second linking portion 408 do not individually come into contact with the first engagement portion 413a and the second engagement portion 413b. However, if a strong force (such as when the camera is dropped) is exerted in the optical axis direction, the retracting lens frame 401 moves in the optical axis direction with respect to the OIS frame 400 against the force of the thrust spring 402.

When a strong force (such as when the camera is dropped) is exerted in the optical axis direction, the retracting lens frame 401 moves in the optical axis direction with respect to the OIS frame 400, and the first restrictor 337a comes into contact with the first engagement portion 413a. Accordingly, the thrust spring 402 can always be operated in its elastic range. Here, the engagement of a contact portion 414 with an anti-rotation portion 511 contributes to keeping the thrust spring 402 in its elastic range.

When a strong force (such as when the camera is dropped) is exerted in the optical axis direction in the retracted state, the retracting lens frame 401 moves in the optical axis direction with respect to the OIS frame 400, and the first restrictor 337a and the second linking portion 408 individually come into contact with the first engagement portion 413a and the second engagement portion 413b. Consequently, the thrust spring 402 can always be operated in its elastic range.

11. Engagement of Frames

Figure 20:
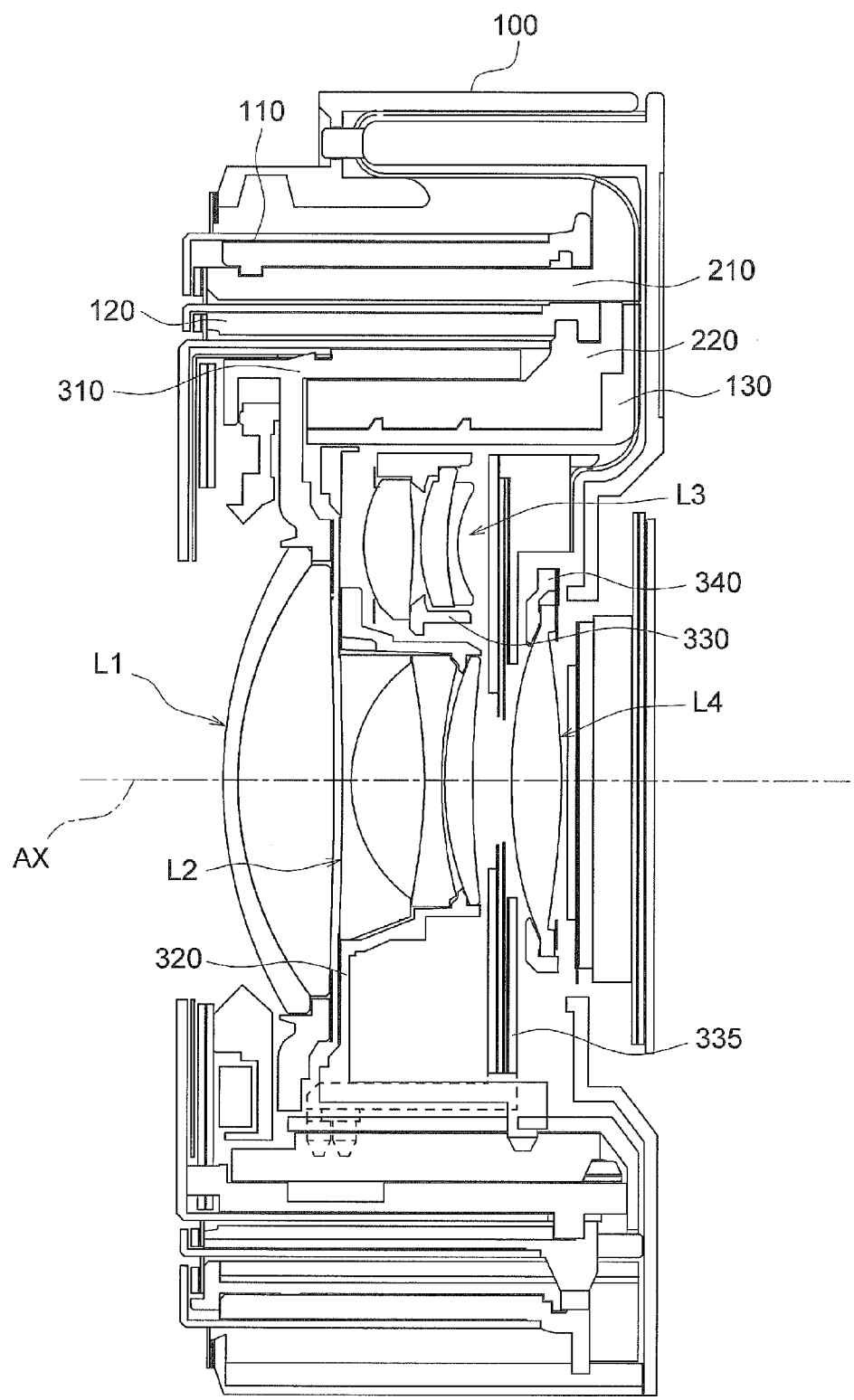
FIG. 20 is a simplified cross section of the lens barrel (retracted state)
Figure 21:
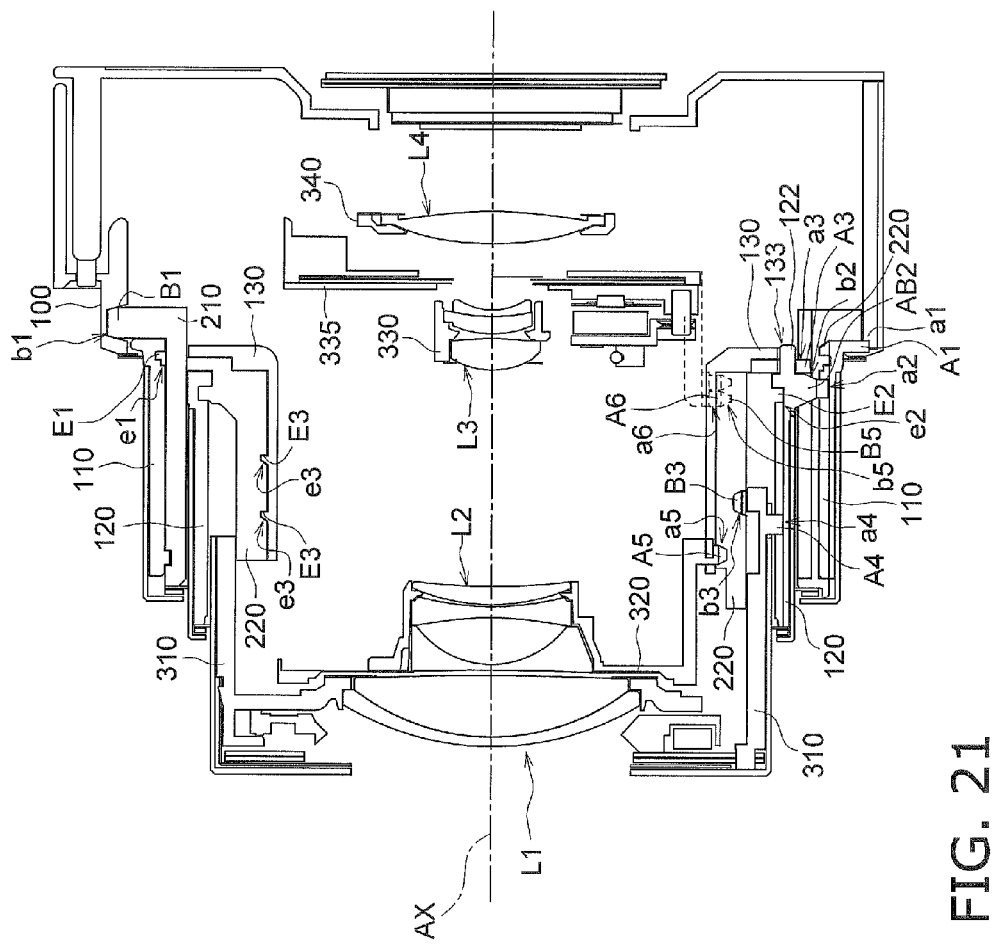
FIG. 21 is a simplified cross section of the lens barrel (wide angle state)
Figure 22:
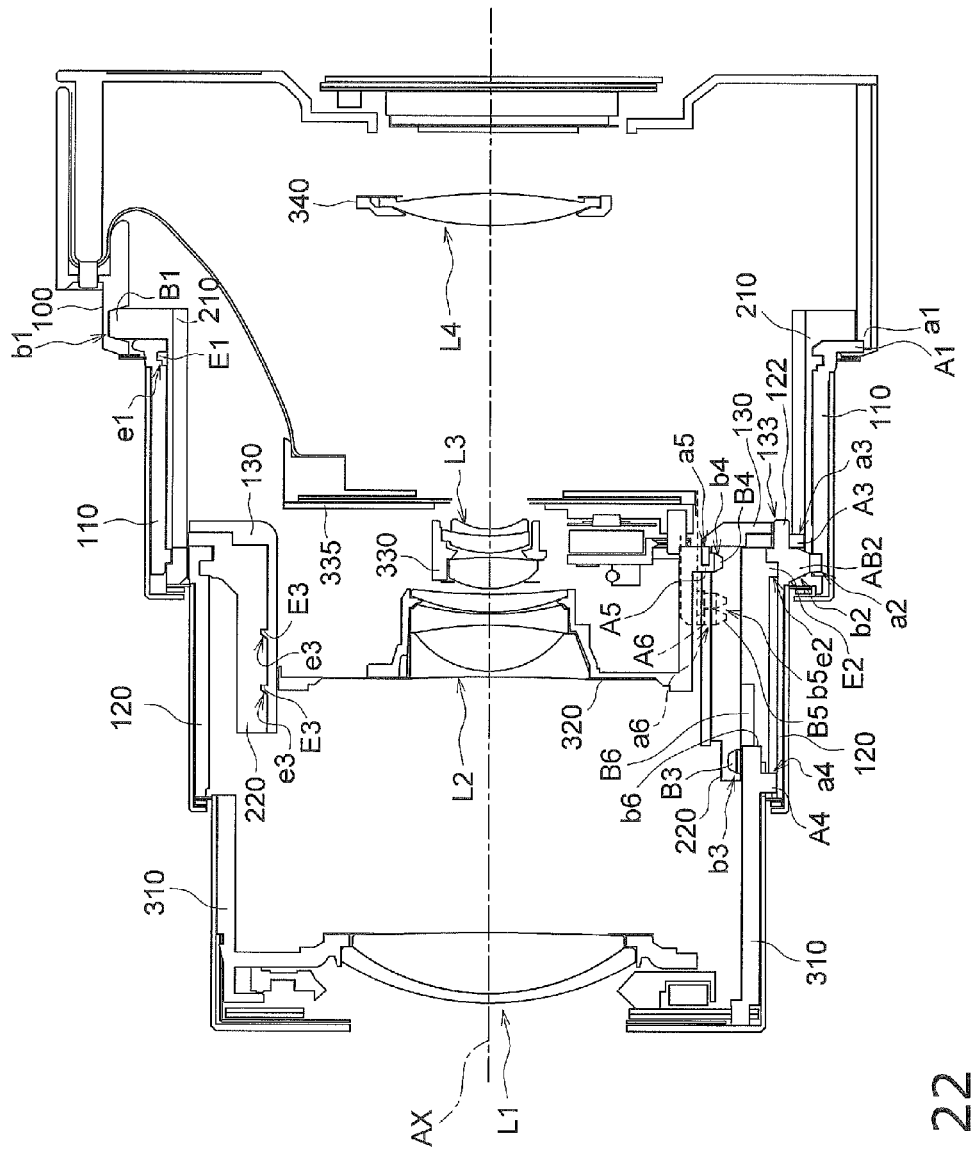
FIG. 22 is a simplified cross section of the lens barrel (telephoto state)

FIGS. 20 to 22 are cross sections of the lens barrel 20. Noted that FIGS. 20 to 22 are schematics that combine a plurality of cross sections passing through the optical axis AX. The lens barrel 20 is shown in its retracted state in FIG. 20, in its wide angle state in FIG. 21, and in its telephoto state in FIG. 22. In this embodiment, the "imaging enabled state" of the digital camera 1 means a state from the wide angle state to the telephoto state of the lens barrel 20.

The gear portion 212 of the first rotary frame 210 meshes with the zoom gear 242 (not shown). The cam followers B1 of the first rotary frame 210 are engaged with the cam grooves b1 of the stationary frame 100. Therefore, the first rotary frame 210 is movable in the optical axis direction while rotating in the peripheral direction under the drive force of the zoom motor 241.

The rectilinear protrusions A1 of the first rectilinear frame 110 are engaged with the rectilinear grooves a1 of the stationary frame 100. The bayonet protrusions E1 of the first rotary frame 210 are engaged with the bayonet groove e1 of the first rectilinear frame 110. Therefore, the first rectilinear frame 110 is movable rectilinearly in the optical axis direction along with the first rotary frame 210.

The rectilinear cam followers AB2 of the second rectilinear frame 120 are inserted into the cam grooves b2 of the first rotary frame 210, and are engaged with the rectilinear grooves a2 of the first rectilinear frame 110. Therefore, the second rectilinear frame 120 is movable rectilinearly in the optical axis direction according to the rotation of the first rotary frame 210.

The rectilinear protrusions A3 of the second rotary frame 220 are engaged with the rectilinear grooves a3 of the first rotary frame 210. The bayonet protrusions E2 of the second rotary frame 220 are engaged with the bayonet groove e2 of the second rectilinear frame 120. Therefore, the second rotary frame 220 is movable in the optical axis direction along with the second rectilinear frame 120 while rotating in the peripheral direction along with the first rotary frame 210.

The latching portions 122 of the second rectilinear frame 120 are latched to the latching recesses 133 of the third rectilinear frame 130. The bayonet protrusions E3 of the third rectilinear frame 130 are engaged with the bayonet grooves e3 of the second rotary frame 220. The spacing of at least two of the rectilinear protrusions A3 of the second rotary frame 220 is approximately 120° or more, the spacing of the two latching portions 122 of the second rectilinear frame 120 is approximately 120° or more, and the relative rotational angle during these during zoom drive is approximately 120° or less. Accordingly, the latching portions 122 and the rectilinear protrusions A3 are disposed at the same positions in the radial direction and the optical axis direction, but are disposed at different positions in the rotational angle direction, that is, the peripheral direction, and the third rectilinear frame 130 is movable rectilinearly in the optical axis direction along with the second rectilinear frame 120 without interfering with the rotation of the second rotary frame 220.

One of the two latching portions 122 is formed longer in the peripheral direction than the other one, and one of the latching recesses 133 is formed longer in the peripheral direction than the other one as well, but the third rectilinear frame 130 is preferably made longer in the peripheral direction in the range that it does not interfere with the rotation of the second rotary frame 220.

The spacing of at least two of the three rectilinear protrusions A3 of the second rotary frame 220 is approximately 150°, the spacing of the two latching portions 122 of the second rectilinear frame 120 is approximately 150°, and the relative rotational angle during these during zoom drive is approximately 150° or less. Therefore, the third rectilinear frame 130 does not interfere with the rotation of the second rotary frame 220. The same applies to the other angles.

The rectilinear protrusions A4 of the first lens group frame 310 are engaged with the rectilinear grooves a4 of the second rectilinear frame 120. Also, the cam followers B3 of the first lens group frame 310 are engaged with the cam grooves b3 of the second rotary frame 220. Therefore, the first lens group frame 310 is movable rectilinearly in the optical axis direction according to the rotation of the second rotary frame 220.

The cams b6 of the first lens group frame 310 engage with the cam followers B6 of the second rotary frame 220. The first lens group frame 310 and the second rotary frame 220 are engaged by two cam mechanisms, such as the cam mechanism b3 and the cam followers B3, and the cams b6 and the cam followers B6. This prevents damage or dislocation of the frames in the event that an external force is exerted from the subject side in the optical axis direction when the camera is dropped, etc.

The rectilinear protrusions A5 of the second lens group frame 320 are engaged with the rectilinear grooves a5 of the third rectilinear frame 130. Also, the cam followers B4 of the second lens group frame 320 are engaged with the cam grooves b4 of the second rotary frame 220. Therefore, the second lens group frame 320 is movable rectilinearly in the optical axis direction according to the rotation of the second rotary frame 220.

The rectilinear protrusions A6 of the shutter frame 335 are engaged with the rectilinear grooves a6 of the third rectilinear frame 130. Also, the cam followers B5 of the shutter frame 335 are engaged with the cam grooves b5 of the second rotary frame 220. Therefore, the shutter frame 335 is movable rectilinearly in the optical axis direction according to the rotation of the second rotary frame 220.

The third lens group frame 330 is mounted to the shutter frame 335, and when the shutter frame 335 moves rectilinearly in the optical axis direction with respect to the third rectilinear frame 130, the retracting lens frame 401 of the third lens group frame 330 is rotated by a retraction mechanism (the guide groove a7 of the third rectilinear frame 130 and the driven portion 411 of the retracting lens frame 401). Consequently, in a transition from the retracted state to the imaging enabled state, the retracting lens frame 401 moves from its retracted position to a correction enabled position. Also, in a transition from the imaging enabled state to the retracted state, the retracting lens frame 401 moves from the correction enabled position to the retracted position. When the retracting lens frame 401 is disposed in the correction enabled position, the third lens group L3 is movable within a plane perpendicular to the optical axis. That is, image blur correction is possible in this state.

Thus, the lens group frames 310, 320, and 335 and the first to third rectilinear frames 110 to 130 move rectilinearly by the rotation of the first rotary frame 210 and the second rotary frame 220 under the Method for Assembling the Lens Barrel 20

The method for assembling the lens barrel 20 will now be described.

First, the third rectilinear frame 130 is inserted from the rear of the second rotary frame 220. The third rectilinear frame 130 is then rotated in the peripheral direction to set the telephoto state.

Next, the second lens group frame 320 is inserted from the rear of the third rectilinear frame 130.

Next, the retracting lens frame 401 is inserted from the front of the OIS frame 400, and the retracting lens frame 401 is rotatably attached to the OIS frame 400.

Next, the OIS frame 400 is inserted from the front of the shutter frame 335.

Next, the shutter frame 335 is inserted from the rear of the third rectilinear frame 130. The second rotary frame 220 is then rotated in the peripheral direction to set the retracted state.

Next, the second rotary frame 220 is inserted from the rear of the first lens group frame 310.

Next, the second rectilinear frame 120 covers the first lens group frame 31 from the front of the first lens group frame 310.

Next, the first rotary frame 210 is inserted from the rear of the first rectilinear frame 110. The second rectilinear frame 120 is then inserted from the rear of the first rotary frame 210.

Next, the first rectilinear frame 110 is inserted from the rear of the stationary frame 100.

Finally, the first rotary frame 210 is rotated with respect to the stationary frame 100 to set the retracted state.

Operation and Orientation of Retraction Lens Frame

The operation and orientation of the retraction lens frame will now be described in detail.

When the lens barrel 20 transitions from the imaging enabled state to the retracted state, the retracting lens frame 401 is moved by a retraction mechanism (the guide groove a7 of the third rectilinear frame 130 and the driven portion 411 of the retracting lens frame 401) from the correction enabled position to the retracted position. Specifically, the retraction mechanism changes the orientation of the retracting lens frame 401 from an imaging enabled state to a retracted state. When the lens barrel 20 transitions from the retracted state to the imaging enabled state, the above operation is performed in reverse to change the orientation of the retracting lens frame 401 between the imaging enabled state and the retracted state.

The retraction mechanism will now be described in detail. The cam mechanism, which operates based on engagement of the cam followers B5 and the cam grooves b5 of the second rotary frame 220, causes the shutter frame 335 to move rectilinearly in the optical axis direction according to the rotation of the second rotary frame 220. The retracting lens frame 401 integrally engages with the shutter frame 335 as discussed below, and the above-mentioned cam mechanism causes it to move relatively in the optical axis direction with respect to the third rectilinear frame 130 from the imaging enabled state to the retracted state. In the process of transitioning from the imaging enabled state to the retracted state, the driven portion 411 engages with the driven portion 411 and moves along the path of the guide groove a7. The guide groove a7 is a cam groove formed in the inner face of the third rectilinear frame 130. The driven portion 411 is a cam follower. As shown in FIG. 9A, a portion (the sloped part a71) that is sloped with respect to the optical axis and a portion (the parallel part a72) that is parallel to the optical axis are formed on the guide groove a7. When the driven portion 411 moves along this sloped part a71, the retracting lens frame 401 rotates around the retraction shaft 501b. The retracting lens frame 401 transitions between an image blur correction position and a retracted position by rotating around the retraction shaft 501b.

The retracting lens frame 401 integrally engages with the OIS frame 400 in the optical axis direction, and the OIS frame 400 integrally engages with the shutter frame 335 in the optical axis direction. Accordingly, the movement of the retracting lens frame 401 with respect to the third rectilinear frame 130 in the optical axis direction is the same as the movement of the shutter frame 335 with respect to the third rectilinear frame 130 in the optical axis direction. The rectilinear protrusions A6 of the shutter frame 335 are engaged with the rectilinear grooves a6 of the third rectilinear frame 130. Also, the cam followers B5 of the shutter frame 335 are engaged with the cam grooves b5 of the second rotary frame 220. Therefore, the shutter frame 335 is movable rectilinearly in the optical axis direction according to the rotation of the second rotary frame 220.

The OIS frame 400 supported by the shutter frame 335 is positioned in a direction perpendicular to the optical axis by the third rectilinear frame 130 before the retracting lens frame 401 begins to retract. For example, if a transition from the imaging enabled state to the housed state (that is, the retracted state) is performed, when the shutter frame 335 moves rectilinearly in the optical axis direction, the shunting protrusions 404 of the OIS frame 400 supported by the shutter frame 335 are mated with the shunting grooves a9 of the third rectilinear frame 130 from the flange 132 side of the third rectilinear frame 130. When the shutter frame 335 then moves rectilinearly further in the optical axis direction, the shunting protrusions 404 are pressed by the shunting grooves a9, and the OIS frame 400 is restricted with respect to the shutter frame 335. Thus, the positioning of the OIS frame 400 in a direction perpendicular to the optical axis is executed before the retracting lens frame 401 begins its retraction operation.

When the retracting lens frame 401 supported by the shutter frame 335 moves from the image blur correction enabled position (that is the imaging enabled position) to the retracted position, the retracting lens frame 401 is rotated by a retraction mechanism constituting the driven portion 411 of the retracting lens frame 401 and the guide groove a7 of the third rectilinear frame main body 131, on the inside of the third rectilinear frame main body 131. During this time, the retracting lens frame 401 and the second lens support 321L of the second lens frame 320 move closer together in the optical axis direction. In a state of having been placed on the shutter frame 335, the retracting lens frame 401 is moved in the optical axis direction by the cam mechanism operated by engagement of the cam followers B5 and the cam grooves b5 of the second rotary frame 220, and the second lens frame 320 is moved in the optical axis direction by the cam mechanism operated by engagement of the cam followers B4 and the cam grooves b4 of the second rotary frame 220. The retracting lens frame 401 and the second lens frame 320 move closer together based on the difference in the paths of the cam grooves b5 and the cam grooves b4. The positioning portion 412 of the retracting lens frame 401 is then guided by the guide portion 322a of the second lens frame 320 and comes into contact with the support portion 322b (see FIG. 17A). Consequently, in a state that the retracting lens frame has come into contact with the support portion 322b of the second lens frame 320, the retracting lens frame 401 is housed in the space of the second lens frame 320, that is, in the space between the second lens support 321L and the outer peripheral face 320T. More specifically, the retracting lens frame 401 is supported and housed in a state of being in contact with the support portion 322b of the second lens frame 320 within the space on the outside in the radial direction of the second lens group L2.

At this point, the second linking portion 408 of the OIS frame 400 is housed in the second housing portion 323a of the second lens frame 320, and the retraction shaft 501b, part of the retracting lens frame 401, part of the OIS frame 400, part of the shutter frame 335, the OIS rotary shaft 334, and the thrust spring 402 are housed in the first housing portion 323b of the second lens frame 320 (see FIGS. 12A to 12C).

Also, at this point, the first linking portion 407 of the OIS frame 400 is housed in the thinner part 350 of the face of the shutter frame main body 336 on the front side in the optical axis direction.

As shown in FIG. 17B, in this state, the second lens support 321L of the second lens frame 320 is housed in the space ST of the OIS frame 400 (see FIG. 14A).

Also, in this state, one end of the thrust spring 402 is mounted to the OIS frame 400, and the other end of the thrust spring 402 is mounted to the retracting lens frame 401. Consequently, the retracting lens frame 401 and the OIS frame 400 are clamped and positioned in the optical axis direction by the thrust spring 402.

Also, in this state, the third lens support 420 of the retracting lens frame 401 is disposed between the first linking portion 407 and the second linking portion 408. Also, the first engagement portion 413a (first engagement portion) near the drive axis of the retracting lens frame 401 is disposed between the first restrictor 337a and the OIS frame 400. Consequently, as discussed above, movement of the retracting lens frame 401 in the optical axis direction can be restricted in the event that a powerful force (such as when the camera is dropped) is exerted in the optical axis direction.

Also, in this state, the cut-out 420a formed in the third lens support 420 of the retracting lens frame 401 is disposed opposite the light blocking portion 357 of the shutter frame 335. Also, the opening 356 in the shutter frame 335 houses the part 420b of the third lens support 420.

Meanwhile, when the lens barrel is in the imaging enabled state, the bearing 410 of the retracting lens frame 401 is mated with the retraction shaft 501b of the OIS frame 400, and the contact portion 414 of the retracting lens frame 401 comes into contact with the anti-rotation portion 511 of the OIS frame 400, thereby the retracting lens frame 401 is positioned with respect to the OIS frame 400 (see FIG. 13A).

Also, in this state, one end of the thrust spring 402 is mounted to the OIS frame 400, and the other end of the thrust spring 402 is mounted to the retracting lens frame 401. Consequently, the retracting lens frame 401 and the OIS frame 400 are clamped and positioned by the thrust spring 402 in the optical axis direction.

Also, in this state, image blur correction on the OIS frame 400 can be accomplished by using the third lens group L3 of the retracting lens frame 401.

Also, in this state, the first engagement portion 413a (first engagement portion) near the drive axis of the retracting lens frame 401 is disposed between the first restrictor 337a and the OIS frame 400. Consequently, as discussed above, movement of the retracting lens frame 401 in the optical axis direction can be restricted in the event that a powerful force (such as when the camera is dropped) is exerted in the optical axis direction.

Action and Effect (1) This lens barrel 20 comprises the second lens group L2, the OIS frame 400, and the retracting lens frame 401. The retracting lens frame 401 is configured to support the third lens group L3, and during the transition period between the imaging enabled state and the housed state, a position of the optical axis of the third lens group L3 is configured to change from a position on the optical axis of the second lens group L2 to a position that is outside the optical axis of the second lens group L2. The OIS frame 400 includes the main body portion 405, the first linking portion 407, and the second linking portion 408. The main body portion 405 includes the hole 405a and the retraction portion 405b. The hole 405a is configured to dispose the third lens group L3 on the optical axis in the imaging enabled state. The retraction portion 405b is formed contiguous with the hole 405a. The retraction portion 405b is configured to disposed the third lens group L3 in the housed state. The first linking portion 407 is provided to the main body portion 405 on one side of the retraction portion 405b in the optical axis direction. The second linking portion 408 is provided to the main body portion 405 on the other side of the retraction portion 405b in the optical axis direction. The retracting lens frame 401 is disposed between the first linking portion 407 and the second linking portion 408 in the housed state.

With this lens barrel 20, even though the hole 405a and the retraction portion 405b are provided to the OIS frame 400, since the first linking portion 407 and the second linking portion 408 span the retraction portion 405b, so the strength of the OIS frame 400 can be increased. Specifically, the strength of the lens barrel 20 can be increased. This also reduces deterioration of accuracy during injection molding.

Also, with this lens barrel 20, the third lens group L3 is moved by the retracting lens frame 401 from the hole 405a to the retraction portion 405b, and is disposed between the first linking portion 407 and the second linking portion 408. Thus, the third lens group L3 is always maintained in a state of being disposed in the hole 405a and the retraction portion 405b, so the lens barrel 20 can be made smaller in the optical axis direction.

Also, with this lens barrel 20, the first linking portion 407 and the second linking portion 408 span the hole 405a in the optical axis direction. More specifically, the first linking portion 407 and the second linking portion 408 are formed so as to be opposite each other ahead of and behind the hole 405a in the optical axis direction, without increasing the outside diameter of the OIS frame 400. Consequently, the lens barrel 20 can be smaller in the radial direction even though the first linking portion 407 and the second linking portion 408 are provided to the OIS frame 400 in order to increase the strength of the OIS frame 400.

(2) This lens barrel 20 further comprises the shutter frame 335, which is disposed on one side of the OIS frame 400 in the optical axis direction. The thinner part 350 is formed on the shutter frame 335 for housing the first linking portion 407.

With this lens barrel 20, in the housed state, the first linking portion 407 of the OIS frame 400 is housed in the thinner part 350 of the shutter frame 335. More specifically, the portion of the shutter frame 335 that is opposite the first linking portion 407 at the face of the 335 on the front side in the optical axis direction is partially made thinner. The first linking portion 407 is inserted into this thinner part. Specifically, at least part of the shutter frame 335 and at least part of the first linking portion 407 overlap in the optical axis direction. This allows the lens barrel 20 to be smaller in the optical axis direction.

(3) With this lens barrel 20, the shutter frame 335 supports the OIS frame 400 movably in a plane perpendicular to the optical axis.

With this lens barrel 20, the OIS frame is supported by the shutter frame 335. Specifically, image blur correction is performed by vibrating the OIS frame 400 in a state in which it is supported by the shutter frame 335. In this case, if the rigidity of the OIS frame 400 is low, there is the risk that deformation or the like occur in the OIS frame 400, which can end up lowering the accuracy of image blur correction. With this lens barrel 20, however, since the strength of the OIS frame 400 is increased by the first linking portion 407 and the second linking portion 408 (at two places), the OIS frame 400 can operate stably and good accuracy can be ensured in image blur correction.

(4) This lens barrel 20 further comprises the second lens frame 320. The second lens frame 320 is disposed on the other side of the OIS frame 400 in the optical axis direction, and is configured to move in the optical axis direction with respect to the OIS frame 400. The second housing portion 323a is formed in the second lens frame 320. The second lens frame 320 is configured to house the second linking portion 408.

With this lens barrel 20, in the housed state, the second linking portion 408 of the OIS frame 400 is housed in the housing portion 323 of the second lens frame 320. Specifically, at least part of the second lens frame 320 and at least part of the second linking portion 408 overlap in the optical axis direction. This allows the lens barrel 20 to be even smaller in the optical axis direction.

(5) This lens barrel 20 further comprises the sheet member 324, which is disposed on the other side of the second lens frame 320 in the optical axis direction. The second housing portion 323a passes through in the optical axis direction. The sheet member 324 is configured to cover the second housing portion 323a on the other side in the optical axis direction.

With this lens barrel 20, the sheet member 324 covers the second housing portion 323a, which passes through in the optical axis direction, on the other side in the optical axis direction. Consequently, even though a hole (namely, the second housing portion 323a) is formed in the front face of the second lens frame 320, light from this second housing portion 323a can be blocked, and a good outer appearance can be ensured.

(6) This lens barrel 20 further comprises the shutter frame 335, which is disposed on one side of the OIS frame 400 in the optical axis direction. The first linking portion 407 is provided on the shutter frame 335 side. The second linking portion 408 is provided on the side away from the shutter frame 335 (the second lens group L2 side). The maximum width of the first linking portion 407 in a direction perpendicular to the optical axis is less than the maximum width of the second linking portion 408 in a direction perpendicular to the optical axis. Consequently, the OIS frame 400 can be moved with respect to the shutter frame 335 without the first linking portion 407 interfering with the shutter frame 335.

(7) This lens barrel 20 further comprises the shutter frame 335, which is disposed on one side of the OIS frame 400 in the optical axis direction. The first linking portion 407 is provided on the shutter frame 335 side. The second linking portion 408 is provided on the side away from the shutter frame 335 (the second lens group L2 side). The maximum width of the first linking portion 407 in the optical axis direction is less than the maximum thickness of the second linking portion 408 in the optical axis direction. Consequently, the OIS frame 400 can be moved with respect to the shutter frame 335 without the first linking portion 407 interfering with the shutter frame 335.

(8) With this lens barrel 20, at least part on a portion where the second linking portion 408 is opposite the curved face of the third lens group L3, is formed so as to correspond to a curved face that encompasses the region through which the third lens group L3 passes during transition from imaging to retraction (including during imaging and retraction). This allows the lens barrel 20 to be made smaller.

OTHER EMBODIMENTS (A) In the above embodiment, the lens barrel 20 had a three-stage telescoping design made up of the first rectilinear frame 110, the second rectilinear frame 120, and the first lens group frame 310, but this is not the only option. The lens barrel 20 may instead have a two-stage telescoping design made up of the first rectilinear frame 110 and the second rectilinear frame 120. In this case, the lens barrel 20 need not comprise the second rotary frame 220 or the third rectilinear frame 130. The lens barrel 20 may also have a four-stage or higher telescoping design.

(B) In the above embodiment, the cam grooves b were formed on one of two frames, and the cam followers B were formed on the other frame, but this is not the only option. The cam followers B may be formed on one of two frames, and the cam grooves b formed on the other frame. Also, the cam grooves b and the cam followers B may be formed on each of two frames.

(C) In the above embodiment, the rectilinear grooves a were formed on one of two frames, and the rectilinear protrusions A were formed on the other frame, but this is not the only option. The rectilinear protrusions A may be formed on one of two frames, and the rectilinear grooves a formed on the other frame. Also, the rectilinear grooves a and the rectilinear protrusions A may be formed on each of two frames.

(D) In the above embodiment, the bayonet grooves e were formed on one of two frames, and the bayonet protrusions E were formed on the other frame, but this is not the only option. The bayonet protrusions E may be formed on one of two frames, and the bayonet grooves e formed on the other frame. Also, the bayonet grooves e and the bayonet protrusions E may be formed on each of two frames.

(E) In the above embodiment, the third lens group frame 330 was retracted toward the second lens group frame 320 in the retracted state, but this is not the only option. The third lens group frame 330 may be disposed to the rear of the second lens group frame 320 in the retracted state.

Figure 23A:
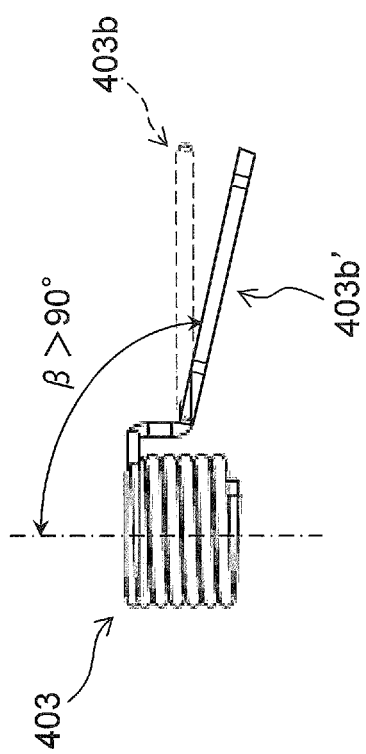
FIG. 23A is a side view of the rotary spring pertaining to another embodiment.

(F) In the above embodiment, as shown by the broken line in FIG. 23A, the other end 403b of the rotary spring 403 is formed so as to extend away from the axis KJ of the coil part at a position of 90 degrees with reference to the axis KJ of the coil portion of the rotary spring 403 (the axis of the coil part, the axis of the retraction shaft 501b). Instead, as shown by the solid line in FIG. 23A, the other end 403b' of the rotary spring 403 may be formed so as to extend away from the axis KJ of the coil part at a position of 90 degrees with reference to the axis KJ of the coil part.

Figure 23B:
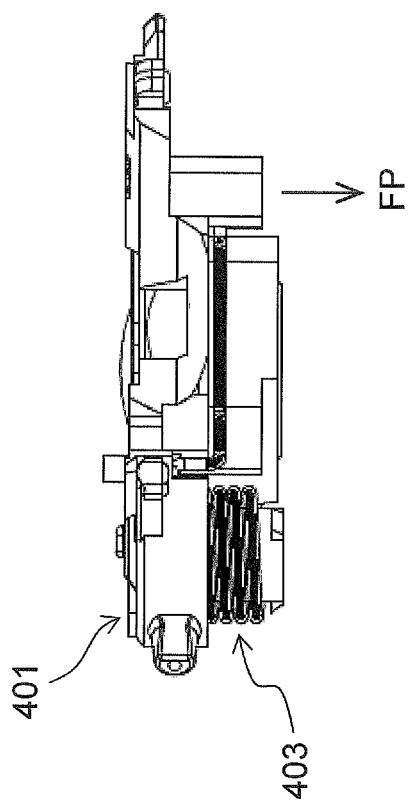
FIG. 23B is a side view of the state when the rotary spring pertaining to another embodiment has been mounted to the retracting lens frame.

In this case, just as in the above embodiment, if the rotary spring 403 is mounted to the OIS frame 400 and the retracting lens frame 401, the force FP at which the retracting lens frame 401 is pressed against the OIS frame 400 can be generated, as shown in FIG. 23B. This allows the three first contact portions 603A (603A1, 603A2, and 603A3) of the retracting lens frame 401 to be reliably brought into contact by the OIS frame 400.

(G) In the above embodiment, an example was given in which, when the second rotary frame 220 (third frame body) rotated, the shutter frame 335 and the OIS frame 400 moved in the optical axis direction with respect to the third rectilinear frame 130 (first frame body) via the third rectilinear frame 130 (first frame body).

Instead, the first and second frame bodies may be configured to be capable of relative rotation, and the second and third frame bodies may be configured to be incapable of relative rotation. In this case, the through-groove of the first frame body extends in the optical axis direction and the peripheral direction.

With this configuration, when the first frame body rotates, the second frame body (such as the shutter frame 335 and/or the OIS frame 400) and the retracting lens frame moved in the direction of the guide grove of the third frame body, such as the optical axis direction. Also, at this point the retracting lens frame 401 moves in a direction perpendicular to the optical axis, with respect to the second frame body.

Thus, even when the lens barrel 20 is configured so that the second frame body, such as the shutter frame 335 and/or the OIS frame 400, moves in the optical axis direction with respect to the third frame body, the driven portion 411 and the guide groove a7 can be provided, and the retracting lens frame 401 can be operated, just as in the above embodiment. This gives the same effect as above.

Figure 24:
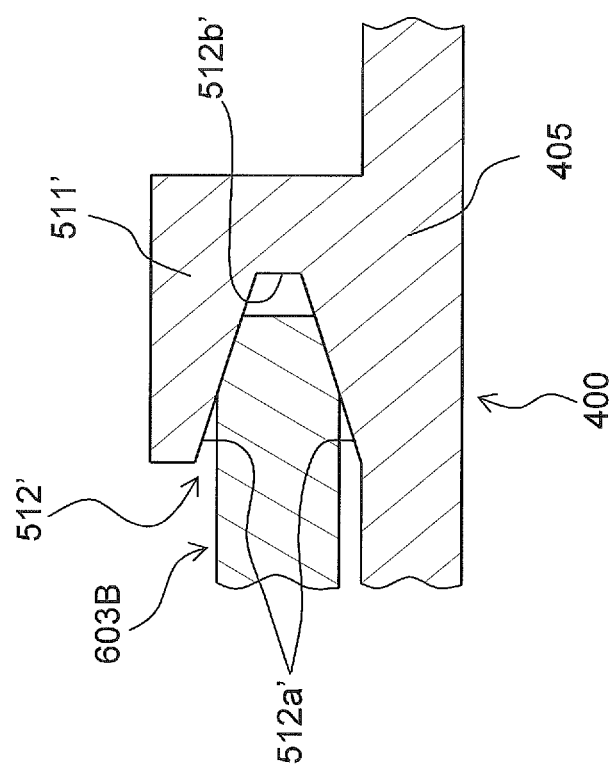
FIG. 24 is a detail cross section of the state when the retracting lens frame has been engaged with the anti-rotation portion of the OIS frame.

(H) In the above embodiment, an example was given in which the anti-rotation portion 511 of the OIS frame 400 was formed in a concave shape, and the upper face of the second contact portion 603B of the retracting lens frame 401 came into contact with the recess 512. Instead, as shown in FIG. 24, the second contact portion 603B of the retracting lens frame 401 may come into contact with two side faces 512a' of a recess 512' of an anti-rotation portion 511'. In this case, the two side faces 512a' of the recess 512' are formed so as to move closer together toward the bottom 512b' of the recess 512'. Consequently, the two side faces 512a' of the recess 512' are inclined and opposite each other. More specifically, the two side faces 512a' of the recess 512' are formed so as to move closer together toward the bottom 512b' of the recess 512'. Consequently, the retracting lens frame 401 can be more reliably positioned with respect to the OIS frame 400.

(I) In the above embodiment, an example was given in which the OIS frame 400 was supported on the shutter frame 335 by the one OIS rotary shaft 334 and the three OIS shafts 339. Instead, a spherical body, such as a ball, may be sandwiched between the OIS frame 400 and the shutter frame 335, and the OIS frame 400 may be biased to the shutter frame 335 side by elastic force (such as spring force), so as to be supported on the shutter frame 335. Here again, the movement of the OIS frame 400 with respect to the shutter frame 335 is the same as in the above embodiment, and the movement of the retracting lens frame 401 with respect to the OIS frame 400 is also the same as in the above embodiment. Therefore, the same effect as above can be obtained.

(J) In the above embodiment, an example was given in which the retracting lens frame 401 moved around a retraction shaft that was substantially parallel to the optical axis, with respect to the OIS frame 400 during the transition period between the imaging enabled state and the housed state. Instead, the movement may be around an axis that is different from the optical axis, such as around an axis that is perpendicular to the optical axis, or an axis that is inclined by a specific angle to the optical axis. Here again, the positional relation between the OIS frame 400 and the shutter frame 335 can be the same as in the above embodiment. Therefore, the same effect as above can be obtained.

(K) In the above embodiment, an example was given in which the retracting lens frame 401 moved around a retraction shaft that was substantially parallel to the optical axis, with respect to the OIS frame 400 during the transition period between the imaging enabled state and the housed state. Instead, the retracting lens frame 401 may be moved by a known link mechanism, such as parallel movement, rather than rotating. Here again, the positional relation between the OIS frame 400 and the shutter frame 335 can be the same as in the above embodiment. Therefore, the same effect as above can be obtained.

GENERAL INTERPRETATION OF TERMS

In understanding the scope of the present disclosure, the term "comprising" and its derivatives, as used herein, are intended to be open ended terms that specify the presence of the stated features, elements, portions, groups, integers, and/or steps, but do not exclude the presence of other unstated features, elements, portions, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a portion, section, or part of a device implies the existence of other unclaimed or unmentioned portions, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various portions can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The technology disclosed herein can be widely applied to lens barrels.

What is claimed is:

1. A lens barrel, comprising:
a first lens including a first optical axis;
a second lens including a second optical axis;
a support frame;
a retracting lens frame configured to support the second lens and move with respect to the support frame such that a position of the second optical axis changes from a position on the first optical axis to a position outside the first optical axis during a transition period between an imaging enabled state and a housed state;
a retraction shaft configured to be substantially parallel to the first optical axis and rotatably support the retracting lens frame with respect to the support frame; and
a first frame body disposed on one side of the support frame in a first optical axis direction and including a first housing portion, the first housing portion configured to house the retraction shaft.

2. The lens barrel according to claim 1, wherein
the support frame includes:
a main body portion including a first region and a second region, the first region configured to dispose the second lens on the first optical axis in the imaging enabled state, the second region configured to dispose the second lens in the housed state and formed continuously with the first region, and
a first linking portion provided to the main body portion on one side of the second region in the first optical axis direction; and wherein
at least a part of the retracting lens frame is configured to overlap with the first linking portion in the housed state when viewed from the first optical axis direction.

3. The lens barrel according to claim 2, wherein
the first frame body further includes a second housing portion, the second housing portion configured to house the first linking portion.

4. The lens barrel according to claim 3, wherein
each of at least a part of the first housing portion and at least a part of the second housing portion includes a pass-through portion, the pass-through portion configured to pass through the first frame body in the first optical axis direction.

5. The lens barrel according to claim 4, further comprising:
a sheet member disposed on the one side of the first frame body in the first optical axis direction, wherein
the sheet member configured to cover at least a part of the pass-through portion.

6. The lens barrel according to claim 2, wherein
at least a part on a portion where the first linking portion opposes a curved face of the second lens, is formed so as to correspond to the curved face of the second lens.

7. The lens barrel according to claim 2, wherein:
the support frame further includes a second linking portion, the second linking portion provided to the main body portion on the other side of the second region in the first optical axis direction; and
at least a part of the retracting lens frame is disposed between the first linking portion and the second linking portion in the housed state.

8. The lens barrel according to claim 7, further comprising:
a second frame body disposed on the other side of the support frame in the first optical axis direction; wherein
the second frame body includes a third housing portion, the third housing portion configured to house the second linking portion.

9. The lens barrel according to claim 1, further comprising:
a second frame body disposed on the other side of the support frame in the first optical axis direction.

10. The lens barrel according to claim 9, wherein
the second frame body is configured to support the support frame movably in a plane that is perpendicular to the first optical axis.

* * * * *